US012748566B2

(12) United States Patent
Dureau et al.

(10) Patent No.: US 12,748,566 B2
(45) Date of Patent: Sep. 29, 2026

(54) CONCURRENCY RULES FOR NETWORK MICROPHONE DEVICES HAVING MULTIPLE VOICE ASSISTANT SERVICES

(71) Applicant: Sonos, Inc., Goleta, CA (US)

(72) Inventors: Joseph Dureau, Paris (FR); Luis R. Vega Zayas, Arlington, MA (US)

(73) Assignee: Sonos, Inc., Goleta, CA (US)

( * ) Notice: Subject to any disclaimer, the term of this patent is extended or adjusted under 35 U.S.C. 154(b) by 55 days.

(21) Appl. No.: 18/007,415

(22) PCT Filed: Sep. 25, 2021

(86) PCT No.: PCT/US2021/071598
§ 371 (c)(1),
(2) Date: Jan. 30, 2023

(87) PCT Pub. No.: WO2022/067345
PCT Pub. Date: Mar. 31, 2022

(65) Prior Publication Data

US 2023/0289132 A1 Sep. 14, 2023

Related U.S. Application Data

(60) Provisional application No. 63/198,045, filed on Sep. 25, 2020.

(51) Int. Cl.
*G06F 3/16* (2006.01)
*G06F 1/3206* (2019.01)
*H04R 3/00* (2006.01)

(52) U.S. Cl.
CPC ............ *G06F 3/167* (2013.01); *G06F 1/3206* (2013.01); *G06F 3/165* (2013.01); *H04R 3/005* (2013.01)

(58) Field of Classification Search
CPC ........ G06F 3/167; G06F 1/3206; G06F 3/165; H04R 3/005
See application file for complete search history.

(56) References Cited

U.S. PATENT DOCUMENTS 999,715 A 8/1911 Gundersen
4,741,038 A 4/1988 Elko et al.
(Continued)

FOREIGN PATENT DOCUMENTS

AU 2017100486 A4 6/2017
AU 2017100581 A4 6/2017
(Continued)

OTHER PUBLICATIONS

US 9,299,346 B1, 03/2016, Hart et al. (withdrawn)
(Continued)

*Primary Examiner* — James T Tsai
(74) *Attorney, Agent, or Firm* — Fortem IP LLP

(57) ABSTRACT

Systems and methods for managing concurrent voice assistants are disclosed. A network microphone device is associated with a first voice assistant service (VAS). The device receives a request to associate with a second VAS different than the first. The device accesses a concurrency rules engine to determine concurrency restrictions. If the rules engine indicates concurrency is prohibited, concurrency can be restricted by (i) disassociating the network microphone device and the first VAS, and associating the network microphone device with the second VAS; or (ii) precluding associating the network microphone device with the second VAS and maintaining association with the first VAS.

23 Claims, 15 Drawing Sheets

(56) References Cited

U.S. PATENT DOCUMENTS

| | | | |
|---|---|---|---|
| 4,941,187 | A | 7/1990 | Slater |
| 4,974,213 | A | 11/1990 | Siwecki |
| 5,036,538 | A | 7/1991 | Oken et al. |
| 5,440,644 | A | 8/1995 | Farinelli et al. |
| 5,588,065 | A | 12/1996 | Tanaka et al. |
| 5,717,768 | A | 2/1998 | Laroche |
| 5,740,260 | A | 4/1998 | Odom |
| 5,761,320 | A | 6/1998 | Farinelli et al. |
| 5,857,172 | A | 1/1999 | Rozak |
| 5,923,902 | A | 7/1999 | Inagaki |
| 5,949,414 | A | 9/1999 | Namikata et al. |
| 6,032,202 | A | 2/2000 | Lea et al. |
| 6,070,140 | A | 5/2000 | Tran |
| 6,088,459 | A | 7/2000 | Hobelsberger |
| 6,219,645 | B1 | 4/2001 | Byers |
| 6,256,554 | B1 | 7/2001 | DiLorenzo |
| 6,301,603 | B1 | 10/2001 | Maher et al. |
| 6,311,157 | B1 | 10/2001 | Strong |
| 6,366,886 | B1 | 4/2002 | Dragosh et al. |
| 6,404,811 | B1 | 6/2002 | Cvetko et al. |
| 6,408,078 | B1 | 6/2002 | Hobelsberger |
| 6,469,633 | B1 | 10/2002 | Wachter |
| 6,522,886 | B1 | 2/2003 | Youngs et al. |
| 6,594,347 | B1 | 7/2003 | Calder et al. |
| 6,594,630 | B1 | 7/2003 | Zlokarnik et al. |
| 6,611,537 | B1 | 8/2003 | Edens et al. |
| 6,611,604 | B1 | 8/2003 | Irby et al. |
| 6,631,410 | B1 | 10/2003 | Kowalski et al. |
| 6,757,517 | B2 | 6/2004 | Chang |
| 6,778,869 | B2 | 8/2004 | Champion |
| 6,937,977 | B2 | 8/2005 | Gerson |
| 7,099,821 | B2 | 8/2006 | Visser et al. |
| 7,103,542 | B2 | 9/2006 | Doyle |
| 7,130,608 | B2 | 10/2006 | Hollstrom et al. |
| 7,130,616 | B2 | 10/2006 | Janik |
| 7,143,939 | B2 | 12/2006 | Henzerling |
| 7,174,299 | B2 | 2/2007 | Fujii et al. |
| 7,228,275 | B1 | 6/2007 | Endo et al. |
| 7,236,773 | B2 | 6/2007 | Thomas |
| 7,295,548 | B2 | 11/2007 | Blank et al. |
| 7,356,471 | B2 | 4/2008 | Ito et al. |
| 7,383,297 | B1 | 6/2008 | Atsmon et al. |
| 7,391,791 | B2 | 6/2008 | Balassanian et al. |
| 7,483,538 | B2 | 1/2009 | McCarty et al. |
| 7,516,068 | B1 | 4/2009 | Clark |
| 7,571,014 | B1 | 8/2009 | Lambourne et al. |
| 7,577,757 | B2 | 8/2009 | Carter et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,661,107 | B1 | 2/2010 | Van et al. |
| 7,702,508 | B2 | 4/2010 | Bennett |
| 7,705,565 | B2 | 4/2010 | Patino et al. |
| 7,792,311 | B1 | 9/2010 | Holmgren et al. |
| 7,853,341 | B2 | 12/2010 | McCarty et al. |
| 7,961,892 | B2 | 6/2011 | Fedigan |
| 7,987,294 | B2 | 7/2011 | Bryce et al. |
| 8,014,423 | B2 | 9/2011 | Thaler et al. |
| 8,019,076 | B1 | 9/2011 | Lambert |
| 8,032,383 | B1 | 10/2011 | Bhardwaj et al. |
| 8,041,565 | B1 | 10/2011 | Bhardwaj et al. |
| 8,045,952 | B2 | 10/2011 | Qureshey et al. |
| 8,073,125 | B2 | 12/2011 | Zhang et al. |
| 8,073,681 | B2 | 12/2011 | Baldwin et al. |
| 8,085,947 | B2 | 12/2011 | Haulick et al. |
| 8,103,009 | B2 | 1/2012 | McCarty et al. |
| 8,136,040 | B2 | 3/2012 | Fleming |
| 8,165,867 | B1 | 4/2012 | Fish |
| 8,233,632 | B1 | 7/2012 | Macdonald et al. |
| 8,234,395 | B2 | 7/2012 | Millington |
| 8,239,206 | B1 | 8/2012 | LeBeau et al. |
| 8,255,224 | B2 | 8/2012 | Singleton et al. |
| 8,284,982 | B2 | 10/2012 | Bailey |
| 8,290,603 | B1 | 10/2012 | Lambourne |
| 8,325,909 | B2 | 12/2012 | Tashev et al. |
| 8,340,975 | B1 | 12/2012 | Rosenberger |
| 8,364,481 | B2 | 1/2013 | Strope et al. |
| 8,385,557 | B2 | 2/2013 | Tashev et al. |
| 8,386,261 | B2 | 2/2013 | Mellott et al. |
| 8,386,523 | B2 | 2/2013 | Mody et al. |
| 8,423,893 | B2 | 4/2013 | Ramsay et al. |
| 8,428,758 | B2 | 4/2013 | Naik et al. |
| 8,453,058 | B1 | 5/2013 | Coccaro et al. |
| 8,473,618 | B2 | 6/2013 | Spear et al. |
| 8,483,853 | B1 | 7/2013 | Lambourne |
| 8,484,025 | B1 | 7/2013 | Moreno et al. |
| 8,588,849 | B2 | 11/2013 | Patterson et al. |
| 8,594,320 | B2 | 11/2013 | Faller |
| 8,600,443 | B2 | 12/2013 | Kawaguchi et al. |
| 8,620,232 | B2 | 12/2013 | Helsloot |
| 8,639,214 | B1 | 1/2014 | Fujisaki |
| 8,676,273 | B1 | 3/2014 | Fujisaki |
| 8,710,970 | B2 | 4/2014 | Oelrich et al. |
| 8,719,039 | B1 | 5/2014 | Sharifi |
| 8,738,925 | B1 | 5/2014 | Park et al. |
| 8,762,156 | B2 | 6/2014 | Chen |
| 8,768,712 | B1 | 7/2014 | Sharifi |
| 8,775,191 | B1 | 7/2014 | Sharifi et al. |
| 8,831,761 | B2 | 9/2014 | Kemp et al. |
| 8,831,957 | B2 | 9/2014 | Taubman et al. |
| 8,848,879 | B1 | 9/2014 | Coughlan et al. |
| 8,861,756 | B2 | 10/2014 | Zhu et al. |
| 8,874,448 | B1 | 10/2014 | Kauffmann et al. |
| 8,898,063 | B1 | 11/2014 | Sykes et al. |
| 8,938,394 | B1 | 1/2015 | Faaborg et al. |
| 8,942,252 | B2 | 1/2015 | Balassanian et al. |
| 8,983,383 | B1 | 3/2015 | Haskin |
| 8,983,844 | B1 | 3/2015 | Thomas et al. |
| 9,002,024 | B2 | 4/2015 | Nakadai et al. |
| 9,015,049 | B2 | 4/2015 | Baldwin et al. |
| 9,042,556 | B2 | 5/2015 | Kallai et al. |
| 9,047,857 | B1 | 6/2015 | Barton |
| 9,060,224 | B1 | 6/2015 | List |
| 9,070,367 | B1 | 6/2015 | Hoffmeister et al. |
| 9,088,336 | B2 | 7/2015 | Mani et al. |
| 9,094,539 | B1 | 7/2015 | Noble |
| 9,098,467 | B1 | 8/2015 | Blanksteen et al. |
| 9,124,650 | B2 | 9/2015 | Maharajh et al. |
| 9,124,711 | B2 | 9/2015 | Park et al. |
| 9,148,742 | B1 | 9/2015 | Koulomzin et al. |
| 9,183,845 | B1 | 11/2015 | Gopalakrishnan et al. |
| 9,190,043 | B2 | 11/2015 | Krisch et al. |
| 9,208,785 | B2 | 12/2015 | Ben-David et al. |
| 9,215,545 | B2 | 12/2015 | Dublin et al. |
| 9,245,527 | B2 | 1/2016 | Lindahl |
| 9,251,793 | B2 | 2/2016 | Lebeau et al. |
| 9,253,572 | B2 | 2/2016 | Beddingfield, Sr. et al. |
| 9,262,612 | B2 | 2/2016 | Cheyer |
| 9,263,042 | B1 | 2/2016 | Sharifi |
| 9,275,637 | B1 | 3/2016 | Salvador et al. |
| 9,288,597 | B2 | 3/2016 | Carlsson et al. |
| 9,300,266 | B2 | 3/2016 | Grokop |
| 9,304,736 | B1 | 4/2016 | Whiteley et al. |
| 9,307,321 | B1 | 4/2016 | Unruh |
| 9,313,317 | B1 | 4/2016 | Lebeau et al. |
| 9,318,107 | B1 | 4/2016 | Sharifi |
| 9,319,816 | B1 | 4/2016 | Narayanan |
| 9,324,322 | B1 | 4/2016 | Torok et al. |
| 9,335,819 | B1 | 5/2016 | Jaeger et al. |
| 9,354,687 | B2 | 5/2016 | Bansal et al. |
| 9,361,878 | B2 | 6/2016 | Boukadakis |
| 9,361,885 | B2 | 6/2016 | Ganong, III et al. |
| 9,368,105 | B1 | 6/2016 | Freed et al. |
| 9,373,329 | B2 | 6/2016 | Strope et al. |
| 9,374,634 | B2 | 6/2016 | Macours |
| 9,386,154 | B2 | 7/2016 | Baciu et al. |
| 9,390,708 | B1 | 7/2016 | Hoffmeister |
| 9,401,058 | B2 | 7/2016 | De La Fuente et al. |
| 9,412,392 | B2 | 8/2016 | Lindahl et al. |
| 9,426,567 | B2 | 8/2016 | Lee et al. |
| 9,431,021 | B1 | 8/2016 | Scalise et al. |
| 9,443,516 | B2 | 9/2016 | Katuri et al. |
| 9,443,527 | B1 | 9/2016 | Watanabe et al. |
| 9,472,201 | B1 | 10/2016 | Sleator |

(56) References Cited

U.S. PATENT DOCUMENTS 9,472,203 B1 10/2016 Ayrapetian et al.
9,484,030 B1 11/2016 Meaney et al.
9,489,948 B1 11/2016 Chu et al.
9,491,033 B1 11/2016 Soyannwo et al.
9,494,683 B1 11/2016 Sadek
9,509,269 B1 11/2016 Rosenberg
9,510,101 B1 11/2016 Polleros
9,514,476 B2 12/2016 Kay et al.
9,514,747 B1 12/2016 Bisani et al.
9,514,752 B2 12/2016 Sharifi
9,516,081 B2 12/2016 Tebbs et al.
9,532,139 B1 12/2016 Lu et al.
9,536,541 B2 1/2017 Chen et al.
9,542,941 B1 1/2017 Weksler et al.
9,548,053 B1 1/2017 Basye et al.
9,548,066 B2 1/2017 Jain et al.
9,552,816 B2 1/2017 Vanlund et al.
9,554,210 B1 1/2017 Ayrapetian et al.
9,558,755 B1 1/2017 Laroche et al.
9,560,441 B1 1/2017 McDonough, Jr. et al.
9,576,591 B2 2/2017 Kim et al.
9,601,116 B2 3/2017 Casado et al.
9,615,170 B2 4/2017 Kirsch et al.
9,615,171 B1 4/2017 O'Neill et al.
9,626,695 B2 4/2017 Balasubramanian et al.
9,632,748 B2 4/2017 Faaborg et al.
9,633,186 B2 4/2017 Ingrassia, Jr. et al.
9,633,368 B2 4/2017 Greenzeiger et al.
9,633,660 B2 4/2017 Haughay et al.
9,633,661 B1 4/2017 Typrin et al.
9,633,671 B2 4/2017 Giacobello et al.
9,633,674 B2 4/2017 Sinha et al.
9,640,179 B1 5/2017 Hart et al.
9,640,183 B2 5/2017 Jung et al.
9,640,194 B1 5/2017 Nemala et al.
9,641,919 B1 5/2017 Poole et al.
9,646,614 B2 5/2017 Bellegarda et al.
9,648,564 B1 5/2017 Cui et al.
9,653,060 B1 5/2017 Hilmes et al.
9,653,075 B1 5/2017 Chen et al.
9,659,555 B1 5/2017 Hilmes et al.
9,672,812 B1 6/2017 Watanabe et al.
9,672,821 B2 6/2017 Krishnaswamy et al.
9,674,587 B2 6/2017 Triplett et al.
9,685,171 B1 6/2017 Yang
9,691,378 B1 6/2017 Meyers et al.
9,691,379 B1 6/2017 Mathias et al.
9,691,384 B1 6/2017 Wang et al.
9,697,826 B2 7/2017 Sainath et al.
9,697,828 B1 7/2017 Prasad et al.
9,698,999 B2 7/2017 Mutagi et al.
9,704,478 B1 7/2017 Vitaladevuni et al.
9,706,320 B2 7/2017 Starobin et al.
9,721,566 B2 8/2017 Newendorp et al.
9,721,568 B1 8/2017 Polansky et al.
9,721,570 B1 8/2017 Beal et al.
9,728,188 B1 8/2017 Rosen et al.
9,734,822 B1 8/2017 Sundaram et al.
9,736,578 B2 8/2017 Iyengar et al.
9,743,204 B1 8/2017 Welch et al.
9,743,207 B1 8/2017 Hartung
9,747,011 B2 8/2017 Lewis et al.
9,747,899 B2 8/2017 Pogue et al.
9,747,920 B2 8/2017 Ayrapetian et al.
9,747,926 B2 8/2017 Sharifi et al.
9,749,738 B1 8/2017 Adsumilli et al.
9,749,760 B2 8/2017 Lambourne
9,754,605 B1 9/2017 Chhetri
9,756,422 B2 9/2017 Paquier et al.
9,762,967 B2 9/2017 Clarke et al.
9,767,786 B2 9/2017 Starobin et al.
9,769,420 B1 9/2017 Moses
9,779,725 B2 10/2017 Sun et al.
9,779,732 B2 10/2017 Lee et al.
9,779,734 B2 10/2017 Lee
9,779,735 B2 10/2017 Civelli et al.
9,781,532 B2 10/2017 Sheen
9,799,330 B2 10/2017 Nemala et al.
9,805,733 B2 10/2017 Park
9,811,314 B2 11/2017 Plagge et al.
9,812,128 B2 11/2017 Mixter et al.
9,813,810 B1 11/2017 Nongpiur
9,813,812 B2 11/2017 Berthelsen et al.
9,818,407 B1 11/2017 Secker-Walker et al.
9,820,036 B1 11/2017 Tritschler et al.
9,820,039 B2 11/2017 Lang
9,826,306 B2 11/2017 Lang
9,865,259 B1 1/2018 Typrin et al.
9,865,264 B2 1/2018 Gelfenbeyn et al.
9,875,740 B1 1/2018 Kumar et al.
9,881,616 B2 1/2018 Beckley et al.
9,898,250 B1 2/2018 Williams et al.
9,899,021 B1 2/2018 Vitaladevuni et al.
9,900,723 B1 2/2018 Choisel et al.
9,916,839 B1 3/2018 Scalise et al.
9,947,316 B2 4/2018 Millington et al.
9,947,333 B1 4/2018 David
9,972,318 B1 5/2018 Kelly et al.
9,972,343 B1 5/2018 Thorson et al.
9,973,849 B1 5/2018 Zhang et al.
9,979,560 B2 5/2018 Kim et al.
9,992,642 B1 6/2018 Rapp et al.
10,013,381 B2 7/2018 Mayman et al.
10,013,995 B1 7/2018 Lashkari et al.
10,025,447 B1 7/2018 Dixit et al.
10,026,401 B1 7/2018 Mutagi et al.
10,028,069 B1 7/2018 Lang
10,038,419 B1 7/2018 Elliot et al.
10,048,930 B1 8/2018 Vega et al.
10,049,675 B2 8/2018 Haughay
10,051,366 B1 8/2018 Buoni et al.
10,051,600 B1 8/2018 Zhong et al.
10,057,698 B2 8/2018 Drinkwater et al.
RE47,049 E 9/2018 Zhu et al.
10,068,573 B1 9/2018 Aykac et al.
10,074,369 B2 9/2018 Devaraj et al.
10,074,371 B1 9/2018 Wang et al.
10,079,015 B1 9/2018 Lockhart et al.
10,089,981 B1 10/2018 Elangovan et al.
10,108,393 B2 10/2018 Millington et al.
10,115,400 B2 10/2018 Wilberding
10,116,748 B2 10/2018 Farmer et al.
10,127,911 B2 11/2018 Kim et al.
10,134,388 B1 11/2018 Lilly
10,134,398 B2 11/2018 Sharifi
10,134,399 B2 11/2018 Lang et al.
10,136,204 B1 11/2018 Poole et al.
10,152,969 B2 * 12/2018 Reilly ..................... G10L 15/02
10,157,042 B1 12/2018 Jayakumar et al.
10,181,323 B2 1/2019 Beckhardt et al.
10,186,265 B1 1/2019 Lockhart et al.
10,186,266 B1 1/2019 Devaraj et al.
10,186,276 B2 1/2019 Dewasurendra et al.
10,192,546 B1 1/2019 Piersol et al.
10,204,624 B1 2/2019 Knudson et al.
10,224,056 B1 3/2019 Torok et al.
10,225,651 B2 3/2019 Lang
10,229,680 B1 3/2019 Gillespie et al.
10,241,754 B1 3/2019 Kadarundalagi Raghuram Doss et al.
10,248,376 B2 * 4/2019 Keyser-Allen ......... H04R 27/00
10,249,205 B2 4/2019 Hammersley et al.
10,276,161 B2 4/2019 Hughes et al.
10,297,256 B2 5/2019 Reilly et al.
10,304,440 B1 5/2019 Panchapagesan et al.
10,304,475 B1 5/2019 Wang et al.
10,318,236 B1 6/2019 Pal et al.
10,332,508 B1 6/2019 Hoffmeister
10,339,917 B2 7/2019 Aleksic et al.
10,339,957 B1 7/2019 Chenier et al.
10,346,122 B1 7/2019 Morgan
10,354,650 B2 7/2019 Gruenstein et al.
10,354,658 B2 7/2019 Wilberding
10,365,887 B1 7/2019 Mulherkar

(56) References Cited

U.S. PATENT DOCUMENTS 10,365,889 B2 7/2019 Plagge et al.
10,366,688 B2 7/2019 Gunn et al.
10,366,699 B1 7/2019 Dharia et al.
10,374,816 B1 8/2019 Leblang et al.
10,381,001 B2 8/2019 Gunn et al.
10,381,002 B2 8/2019 Gunn et al.
10,381,003 B2 8/2019 Wakisaka et al.
10,388,272 B1 8/2019 Thomson et al.
10,424,296 B2 9/2019 Penilla et al.
10,433,058 B1 10/2019 Torgerson et al.
10,445,057 B2 10/2019 Vega et al.
10,445,365 B2 10/2019 Luke et al.
10,469,966 B2 11/2019 Lambourne
10,499,146 B2 12/2019 Lang et al.
10,510,340 B1 12/2019 Fu et al.
10,511,904 B2 12/2019 Buoni et al.
10,515,625 B1 12/2019 Metallinou et al.
10,522,146 B1 12/2019 Tushinskiy
10,546,583 B2 1/2020 White et al.
10,565,998 B2 2/2020 Wilberding
10,565,999 B2 2/2020 Wilberding
10,573,312 B1 2/2020 Thomson et al.
10,573,321 B1 2/2020 Smith et al.
10,580,405 B1 3/2020 Wang et al.
10,586,534 B1 3/2020 Argyropoulos et al.
10,586,540 B1 3/2020 Smith et al.
10,593,328 B1 3/2020 Wang et al.
10,593,330 B2 3/2020 Sharifi
10,599,287 B2 3/2020 Kumar et al.
10,600,406 B1 3/2020 Shapiro et al.
10,602,268 B1 3/2020 Soto
10,614,807 B2 4/2020 Beckhardt et al.
10,621,981 B2 4/2020 Sereshki
10,622,009 B1 4/2020 Zhang et al.
10,623,811 B1 4/2020 Cwik
10,624,612 B2 4/2020 Sumi et al.
10,643,609 B1 5/2020 Pogue et al.
10,645,130 B2 5/2020 Corbin et al.
10,672,383 B1 6/2020 Thomson et al.
10,679,625 B1 6/2020 Lockhart et al.
10,681,460 B2 6/2020 Woo et al.
10,685,669 B1 6/2020 Lan et al.
10,694,608 B2 6/2020 Baker et al.
10,699,711 B2 6/2020 Reilly
10,706,843 B1 7/2020 Elangovan et al.
10,712,997 B2 7/2020 Wilberding et al.
10,720,173 B2 7/2020 Freeman et al.
10,728,196 B2 7/2020 Wang
10,735,870 B2 8/2020 Ballande et al.
10,740,065 B2 8/2020 Jarvis et al.
10,746,840 B1 8/2020 Barton et al.
10,748,531 B2 8/2020 Kim
10,762,896 B1 9/2020 Yavagal et al.
10,777,189 B1 9/2020 Fu et al.
10,777,203 B1 9/2020 Pasko
10,789,041 B2 9/2020 Kim et al.
10,797,667 B2 10/2020 Fish et al.
10,824,682 B2 11/2020 Alvares et al.
10,825,471 B2 11/2020 Walley et al.
10,837,667 B2 11/2020 Nelson et al.
10,847,137 B1 11/2020 Mandal et al.
10,847,143 B2 11/2020 Millington et al.
10,847,149 B1 11/2020 Mok et al.
10,847,164 B2 11/2020 Wilberding
10,848,885 B2 11/2020 Lambourne
RE48,371 E 12/2020 Zhu et al.
10,867,596 B2 12/2020 Yoneda et al.
10,867,604 B2 12/2020 Smith et al.
10,871,943 B1 12/2020 D'Amato et al.
10,878,811 B2 12/2020 Smith et al.
10,878,826 B2 12/2020 Li et al.
10,897,679 B2 1/2021 Lambourne
10,911,596 B1 2/2021 Do et al.
10,943,598 B2 3/2021 Singh et al.
10,964,314 B2 3/2021 Jazi et al.
10,971,158 B1 4/2021 Patangay et al.
11,024,311 B2 6/2021 Mixter et al.
11,025,569 B2 6/2021 Lind et al.
11,050,615 B2 6/2021 Mathews et al.
11,062,705 B2 7/2021 Watanabe et al.
11,100,923 B2 8/2021 Fainberg et al.
11,127,405 B1 9/2021 Antos et al.
11,137,979 B2 10/2021 Plagge
11,138,969 B2 10/2021 D'Amato
11,159,878 B1 10/2021 Chatlani et al.
11,172,328 B2 11/2021 Soto et al.
11,172,329 B2 11/2021 Soto et al.
11,175,880 B2 11/2021 Liu et al.
11,184,704 B2 11/2021 Jarvis et al.
11,206,052 B1 12/2021 Park et al.
11,212,612 B2 12/2021 Lang et al.
11,264,019 B2 3/2022 Bhattacharya et al.
11,277,512 B1 3/2022 Leeds et al.
11,315,556 B2 4/2022 Smith et al.
11,354,092 B2 6/2022 D'Amato et al.
11,361,763 B1 6/2022 Maas et al.
11,373,645 B1 6/2022 Mathew et al.
11,388,532 B2 7/2022 Lambourne
11,411,763 B2 8/2022 Mackay et al.
11,445,301 B2 9/2022 Park et al.
11,514,898 B2 11/2022 Millington
11,531,520 B2 12/2022 Wilberding
11,700,139 B2 * 7/2023 Drake ................ H04L 12/2816
704/275
2001/0003173 A1 6/2001 Lim
2001/0042107 A1 11/2001 Palm
2002/0022453 A1 2/2002 Balog et al.
2002/0026442 A1 2/2002 Lipscomb et al.
2002/0034280 A1 3/2002 Infosino
2002/0046023 A1 4/2002 Fujii et al.
2002/0054685 A1 5/2002 Avendano et al.
2002/0055950 A1 5/2002 Witteman
2002/0072816 A1 6/2002 Shdema et al.
2002/0116196 A1 8/2002 Tran
2002/0124097 A1 9/2002 Isely et al.
2002/0143532 A1 10/2002 McLean et al.
2003/0015354 A1 1/2003 Edwards et al.
2003/0038848 A1 2/2003 Lee et al.
2003/0040908 A1 2/2003 Yang et al.
2003/0070182 A1 4/2003 Pierre et al.
2003/0070869 A1 4/2003 Hlibowicki
2003/0072462 A1 4/2003 Hlibowicki
2003/0095672 A1 5/2003 Hobelsberger
2003/0097482 A1 5/2003 DeHart et al.
2003/0130850 A1 7/2003 Badt et al.
2003/0157951 A1 8/2003 Hasty, Jr.
2003/0235244 A1 12/2003 Pessoa et al.
2004/0024478 A1 2/2004 Hans et al.
2004/0093219 A1 5/2004 Shin et al.
2004/0105566 A1 6/2004 Matsunaga et al.
2004/0127241 A1 7/2004 Shostak
2004/0128135 A1 7/2004 Anastasakos et al.
2004/0153321 A1 8/2004 Chung et al.
2004/0161082 A1 8/2004 Brown et al.
2004/0234088 A1 11/2004 McCarty et al.
2005/0031131 A1 2/2005 Browning et al.
2005/0031132 A1 2/2005 Browning et al.
2005/0031133 A1 2/2005 Browning et al.
2005/0031134 A1 2/2005 Leske
2005/0031137 A1 2/2005 Browning et al.
2005/0031138 A1 2/2005 Browning et al.
2005/0031139 A1 2/2005 Browning et al.
2005/0031140 A1 2/2005 Browning
2005/0033582 A1 2/2005 Gadd et al.
2005/0047606 A1 3/2005 Lee et al.
2005/0077843 A1 4/2005 Benditt
2005/0164664 A1 7/2005 DiFonzo et al.
2005/0195988 A1 9/2005 Tashev et al.
2005/0201254 A1 9/2005 Looney et al.
2005/0207584 A1 9/2005 Bright
2005/0235334 A1 10/2005 Togashi et al.
2005/0254662 A1 11/2005 Blank et al.
2005/0268234 A1 12/2005 Rossi et al.
2005/0283330 A1 12/2005 Laraia et al.

(56) References Cited

U.S. PATENT DOCUMENTS

| | | | |
|---|---|---|---|
| 2005/0283475 | A1 | 12/2005 | Beranek et al. |
| 2006/0004834 | A1 | 1/2006 | Pyhalammi et al. |
| 2006/0023945 | A1 | 2/2006 | King et al. |
| 2006/0041431 | A1 | 2/2006 | Maes |
| 2006/0093128 | A1 | 5/2006 | Oxford |
| 2006/0104451 | A1 | 5/2006 | Browning et al. |
| 2006/0147058 | A1 | 7/2006 | Wang |
| 2006/0190269 | A1 | 8/2006 | Tessel et al. |
| 2006/0190968 | A1 | 8/2006 | Jung et al. |
| 2006/0247913 | A1 | 11/2006 | Huerta et al. |
| 2006/0262943 | A1 | 11/2006 | Oxford |
| 2007/0018844 | A1 | 1/2007 | Sutardja |
| 2007/0019815 | A1 | 1/2007 | Asada et al. |
| 2007/0033043 | A1 | 2/2007 | Hyakumoto |
| 2007/0038461 | A1 | 2/2007 | Abbott et al. |
| 2007/0038999 | A1 | 2/2007 | Millington |
| 2007/0060054 | A1 | 3/2007 | Romesburg |
| 2007/0071206 | A1 | 3/2007 | Gainsboro et al. |
| 2007/0071255 | A1 | 3/2007 | Schobben |
| 2007/0076131 | A1 | 4/2007 | Li et al. |
| 2007/0076906 | A1 | 4/2007 | Takagi et al. |
| 2007/0140058 | A1 | 6/2007 | McIntosh et al. |
| 2007/0140521 | A1 | 6/2007 | Mitobe et al. |
| 2007/0142944 | A1 | 6/2007 | Goldberg et al. |
| 2007/0147651 | A1 | 6/2007 | Mitobe et al. |
| 2007/0201639 | A1 | 8/2007 | Park et al. |
| 2007/0254604 | A1 | 11/2007 | Kim |
| 2007/0286426 | A1 | 12/2007 | Xiang et al. |
| 2008/0008333 | A1 | 1/2008 | Nishikawa et al. |
| 2008/0031466 | A1 | 2/2008 | Buck et al. |
| 2008/0037814 | A1 | 2/2008 | Shau |
| 2008/0090537 | A1 | 4/2008 | Sutardja |
| 2008/0090617 | A1 | 4/2008 | Sutardja |
| 2008/0144858 | A1 | 6/2008 | Khawand et al. |
| 2008/0146289 | A1 | 6/2008 | Korneluk et al. |
| 2008/0160977 | A1 | 7/2008 | Ahmaniemi et al. |
| 2008/0182518 | A1 | 7/2008 | Lo |
| 2008/0192946 | A1 | 8/2008 | Faller |
| 2008/0207115 | A1 | 8/2008 | Lee et al. |
| 2008/0208594 | A1 | 8/2008 | Cross et al. |
| 2008/0221897 | A1 | 9/2008 | Cerra et al. |
| 2008/0247530 | A1 | 10/2008 | Barton et al. |
| 2008/0248797 | A1 | 10/2008 | Freeman et al. |
| 2008/0291896 | A1 | 11/2008 | Tuubel et al. |
| 2008/0291916 | A1 | 11/2008 | Xiong et al. |
| 2008/0301729 | A1 | 12/2008 | Broos et al. |
| 2009/0003620 | A1 | 1/2009 | McKillop et al. |
| 2009/0005893 | A1 | 1/2009 | Sugii et al. |
| 2009/0010445 | A1 | 1/2009 | Matsuo |
| 2009/0013255 | A1 | 1/2009 | Yuschik et al. |
| 2009/0018828 | A1 | 1/2009 | Nakadai et al. |
| 2009/0043206 | A1 | 2/2009 | Towfiq et al. |
| 2009/0046866 | A1 | 2/2009 | Feng et al. |
| 2009/0052688 | A1 | 2/2009 | Ishibashi et al. |
| 2009/0076821 | A1 | 3/2009 | Brenner et al. |
| 2009/0113053 | A1 | 4/2009 | Van Wie et al. |
| 2009/0153289 | A1 | 6/2009 | Hope et al. |
| 2009/0191854 | A1 | 7/2009 | Beason |
| 2009/0197524 | A1 | 8/2009 | Haff et al. |
| 2009/0214048 | A1 | 8/2009 | Stokes, III et al. |
| 2009/0220107 | A1 | 9/2009 | Every et al. |
| 2009/0228919 | A1 | 9/2009 | Zott et al. |
| 2009/0238377 | A1 | 9/2009 | Ramakrishnan et al. |
| 2009/0238386 | A1 | 9/2009 | Usher et al. |
| 2009/0248397 | A1 | 10/2009 | Garcia et al. |
| 2009/0249222 | A1 | 10/2009 | Schmidt et al. |
| 2009/0264072 | A1 | 10/2009 | Dai |
| 2009/0299745 | A1 | 12/2009 | Kennewick et al. |
| 2009/0323907 | A1 | 12/2009 | Gupta et al. |
| 2009/0323924 | A1 | 12/2009 | Tashev et al. |
| 2009/0326949 | A1 | 12/2009 | Douthitt et al. |
| 2010/0014690 | A1 | 1/2010 | Wolff et al. |
| 2010/0023638 | A1 | 1/2010 | Bowman |
| 2010/0035593 | A1 | 2/2010 | Franco et al. |
| 2010/0041443 | A1 | 2/2010 | Yokota |
| 2010/0070276 | A1 | 3/2010 | Wasserblat et al. |
| 2010/0070922 | A1 | 3/2010 | DeMaio et al. |
| 2010/0075723 | A1 | 3/2010 | Min et al. |
| 2010/0088100 | A1 | 4/2010 | Lindahl |
| 2010/0092004 | A1 | 4/2010 | Kuze |
| 2010/0161335 | A1 | 6/2010 | Whynot |
| 2010/0172516 | A1 | 7/2010 | Lastrucci |
| 2010/0178873 | A1 | 7/2010 | Lee et al. |
| 2010/0179806 | A1 | 7/2010 | Zhang et al. |
| 2010/0179874 | A1 | 7/2010 | Higgins et al. |
| 2010/0185448 | A1 | 7/2010 | Meisel |
| 2010/0211199 | A1 | 8/2010 | Naik et al. |
| 2010/0260348 | A1 | 10/2010 | Bhow et al. |
| 2010/0278351 | A1 | 11/2010 | Fozunbal et al. |
| 2010/0299639 | A1 | 11/2010 | Ramsay et al. |
| 2010/0329472 | A1 | 12/2010 | Nakadai et al. |
| 2010/0332236 | A1 | 12/2010 | Tan |
| 2011/0019833 | A1 | 1/2011 | Kuech et al. |
| 2011/0033059 | A1 | 2/2011 | Bhaskar et al. |
| 2011/0035580 | A1 | 2/2011 | Wang et al. |
| 2011/0044461 | A1 | 2/2011 | Kuech et al. |
| 2011/0044489 | A1 | 2/2011 | Saiki et al. |
| 2011/0046952 | A1 | 2/2011 | Koshinaka |
| 2011/0066634 | A1 | 3/2011 | Phillips et al. |
| 2011/0091055 | A1 | 4/2011 | Leblanc |
| 2011/0103615 | A1 | 5/2011 | Sun |
| 2011/0131032 | A1 | 6/2011 | Yang et al. |
| 2011/0145581 | A1 | 6/2011 | Malhotra et al. |
| 2011/0170707 | A1 | 7/2011 | Yamada et al. |
| 2011/0176687 | A1 | 7/2011 | Birkenes |
| 2011/0182436 | A1 | 7/2011 | Murgia et al. |
| 2011/0202924 | A1 | 8/2011 | Banguero et al. |
| 2011/0218656 | A1 | 9/2011 | Bishop et al. |
| 2011/0267985 | A1 | 11/2011 | Wilkinson et al. |
| 2011/0276333 | A1 | 11/2011 | Wang et al. |
| 2011/0280422 | A1 | 11/2011 | Neumeyer et al. |
| 2011/0285808 | A1 | 11/2011 | Feng et al. |
| 2011/0289506 | A1 | 11/2011 | Trivi et al. |
| 2011/0299706 | A1 | 12/2011 | Sakai |
| 2012/0009906 | A1 | 1/2012 | Patterson et al. |
| 2012/0020485 | A1 | 1/2012 | Visser et al. |
| 2012/0020486 | A1 | 1/2012 | Fried et al. |
| 2012/0022863 | A1 | 1/2012 | Cho et al. |
| 2012/0022864 | A1 | 1/2012 | Leman et al. |
| 2012/0027218 | A1 | 2/2012 | Every et al. |
| 2012/0076308 | A1 | 3/2012 | Kuech et al. |
| 2012/0078635 | A1 | 3/2012 | Rothkopf et al. |
| 2012/0086568 | A1 | 4/2012 | Scott et al. |
| 2012/0123268 | A1 | 5/2012 | Tanaka et al. |
| 2012/0128160 | A1 | 5/2012 | Kim et al. |
| 2012/0131125 | A1 | 5/2012 | Seidel et al. |
| 2012/0148075 | A1 | 6/2012 | Goh et al. |
| 2012/0162540 | A1 | 6/2012 | Ouchi et al. |
| 2012/0163603 | A1 | 6/2012 | Abe et al. |
| 2012/0177215 | A1 | 7/2012 | Bose et al. |
| 2012/0183149 | A1 | 7/2012 | Hiroe |
| 2012/0224457 | A1 | 9/2012 | Kim et al. |
| 2012/0224715 | A1 | 9/2012 | Kikkeri |
| 2012/0237047 | A1 | 9/2012 | Neal et al. |
| 2012/0245941 | A1 | 9/2012 | Cheyer |
| 2012/0265528 | A1 | 10/2012 | Gruber et al. |
| 2012/0288100 | A1 | 11/2012 | Cho |
| 2012/0297284 | A1 | 11/2012 | Matthews, III et al. |
| 2012/0308044 | A1 | 12/2012 | Vander et al. |
| 2012/0308046 | A1 | 12/2012 | Muza |
| 2013/0006453 | A1 | 1/2013 | Wang et al. |
| 2013/0024018 | A1 | 1/2013 | Chang et al. |
| 2013/0034241 | A1 | 2/2013 | Pandey et al. |
| 2013/0039527 | A1 | 2/2013 | Jensen et al. |
| 2013/0051755 | A1 | 2/2013 | Brown et al. |
| 2013/0058492 | A1 | 3/2013 | Silzle et al. |
| 2013/0066453 | A1 | 3/2013 | Seefeldt |
| 2013/0073293 | A1 | 3/2013 | Jang et al. |
| 2013/0080146 | A1 | 3/2013 | Kato et al. |
| 2013/0080167 | A1 | 3/2013 | Mozer |
| 2013/0080171 | A1 | 3/2013 | Mozer et al. |
| 2013/0124211 | A1 | 5/2013 | Mcdonough |
| 2013/0129100 | A1 | 5/2013 | Sorensen |
| 2013/0148821 | A1 | 6/2013 | Sorensen |

(56) References Cited

U.S. PATENT DOCUMENTS

| | | | |
|---|---|---|---|
| 2013/0170647 | A1 | 7/2013 | Reilly et al. |
| 2013/0179173 | A1 | 7/2013 | Lee et al. |
| 2013/0183944 | A1 | 7/2013 | Mozer et al. |
| 2013/0185639 | A1 | 7/2013 | Lim |
| 2013/0191119 | A1 | 7/2013 | Sugiyama |
| 2013/0191122 | A1 | 7/2013 | Mason |
| 2013/0198298 | A1 | 8/2013 | Li et al. |
| 2013/0211826 | A1 | 8/2013 | Mannby |
| 2013/0216056 | A1 | 8/2013 | Thyssen |
| 2013/0230184 | A1 | 9/2013 | Kuech et al. |
| 2013/0238326 | A1 | 9/2013 | Kim et al. |
| 2013/0262101 | A1 | 10/2013 | Srinivasan |
| 2013/0283169 | A1 | 10/2013 | Van Wie |
| 2013/0289994 | A1 | 10/2013 | Newman et al. |
| 2013/0294611 | A1 | 11/2013 | Yoo et al. |
| 2013/0301840 | A1 | 11/2013 | Yemdji et al. |
| 2013/0315420 | A1 | 11/2013 | You |
| 2013/0317635 | A1 | 11/2013 | Bates et al. |
| 2013/0322462 | A1 | 12/2013 | Poulsen |
| 2013/0322634 | A1 | 12/2013 | Bennett et al. |
| 2013/0322665 | A1 | 12/2013 | Bennett et al. |
| 2013/0324031 | A1 | 12/2013 | Loureiro |
| 2013/0329896 | A1 | 12/2013 | Krishnaswamy et al. |
| 2013/0331970 | A1 | 12/2013 | Beckhardt et al. |
| 2013/0332165 | A1 | 12/2013 | Beckley et al. |
| 2013/0336499 | A1 | 12/2013 | Beckhardt et al. |
| 2013/0339028 | A1 | 12/2013 | Rosner et al. |
| 2013/0343567 | A1 | 12/2013 | Triplett et al. |
| 2014/0003611 | A1 | 1/2014 | Mohammad et al. |
| 2014/0003625 | A1 | 1/2014 | Sheen et al. |
| 2014/0003635 | A1 | 1/2014 | Mohammad et al. |
| 2014/0005813 | A1 | 1/2014 | Reimann |
| 2014/0006026 | A1 | 1/2014 | Lamb et al. |
| 2014/0006825 | A1 | 1/2014 | Shenhav |
| 2014/0019743 | A1 | 1/2014 | DeLuca |
| 2014/0034929 | A1 | 2/2014 | Hamada et al. |
| 2014/0046464 | A1 | 2/2014 | Reimann |
| 2014/0056435 | A1 | 2/2014 | Kjems et al. |
| 2014/0064476 | A1 | 3/2014 | Mani et al. |
| 2014/0064501 | A1 | 3/2014 | Olsen et al. |
| 2014/0073298 | A1 | 3/2014 | Rossmann |
| 2014/0075306 | A1 | 3/2014 | Rega |
| 2014/0075311 | A1 | 3/2014 | Boettcher et al. |
| 2014/0094151 | A1 | 4/2014 | Klappert et al. |
| 2014/0100854 | A1 | 4/2014 | Chen et al. |
| 2014/0108010 | A1 | 4/2014 | Maltseff et al. |
| 2014/0109138 | A1 | 4/2014 | Cannistraro et al. |
| 2014/0122075 | A1 | 5/2014 | Bak et al. |
| 2014/0126745 | A1 | 5/2014 | Dickins et al. |
| 2014/0136195 | A1 | 5/2014 | Abdossalami et al. |
| 2014/0145168 | A1 | 5/2014 | Ohsawa et al. |
| 2014/0146983 | A1 | 5/2014 | Kim et al. |
| 2014/0149118 | A1 | 5/2014 | Lee et al. |
| 2014/0159581 | A1 | 6/2014 | Pruemmer et al. |
| 2014/0161263 | A1 | 6/2014 | Koishida et al. |
| 2014/0163978 | A1 | 6/2014 | Basye et al. |
| 2014/0164400 | A1 | 6/2014 | Kruglick |
| 2014/0167929 | A1 | 6/2014 | Shim et al. |
| 2014/0167931 | A1 | 6/2014 | Lee et al. |
| 2014/0168344 | A1 | 6/2014 | Shoemake et al. |
| 2014/0172899 | A1 | 6/2014 | Hakkani-Tur et al. |
| 2014/0172953 | A1 | 6/2014 | Blanksteen |
| 2014/0181199 | A1 | 6/2014 | Kumar et al. |
| 2014/0181271 | A1 | 6/2014 | Millington |
| 2014/0188476 | A1 | 7/2014 | Li et al. |
| 2014/0192986 | A1 | 7/2014 | Lee et al. |
| 2014/0195252 | A1 | 7/2014 | Gruber et al. |
| 2014/0200881 | A1 | 7/2014 | Chatlani |
| 2014/0207457 | A1 | 7/2014 | Biatov et al. |
| 2014/0214429 | A1 | 7/2014 | Pantel |
| 2014/0215332 | A1 | 7/2014 | Lee et al. |
| 2014/0219472 | A1 | 8/2014 | Huang et al. |
| 2014/0222436 | A1 | 8/2014 | Binder et al. |
| 2014/0229184 | A1 | 8/2014 | Shires |
| 2014/0229959 | A1 | 8/2014 | Beckhardt et al. |
| 2014/0244013 | A1 | 8/2014 | Reilly |
| 2014/0244269 | A1 | 8/2014 | Tokutake |
| 2014/0244712 | A1 | 8/2014 | Walters et al. |
| 2014/0249817 | A1 | 9/2014 | Hart et al. |
| 2014/0252386 | A1 | 9/2014 | Ito et al. |
| 2014/0254805 | A1 | 9/2014 | Su et al. |
| 2014/0258292 | A1 | 9/2014 | Thramann et al. |
| 2014/0259075 | A1 | 9/2014 | Chang et al. |
| 2014/0269757 | A1 | 9/2014 | Park et al. |
| 2014/0270216 | A1 | 9/2014 | Tsilfidis et al. |
| 2014/0270282 | A1 | 9/2014 | Tammi et al. |
| 2014/0274185 | A1 | 9/2014 | Luna et al. |
| 2014/0274203 | A1 | 9/2014 | Ganong, III et al. |
| 2014/0274218 | A1 | 9/2014 | Kadiwala et al. |
| 2014/0277650 | A1 | 9/2014 | Zurek et al. |
| 2014/0278343 | A1 | 9/2014 | Tran |
| 2014/0278372 | A1 | 9/2014 | Nakadai et al. |
| 2014/0278445 | A1 | 9/2014 | Eddington, Jr. |
| 2014/0278933 | A1 | 9/2014 | McMillan |
| 2014/0288686 | A1 | 9/2014 | Sant et al. |
| 2014/0291642 | A1 | 10/2014 | Watabe et al. |
| 2014/0303969 | A1 | 10/2014 | Inose et al. |
| 2014/0310002 | A1 | 10/2014 | Nitz et al. |
| 2014/0310614 | A1 | 10/2014 | Jones |
| 2014/0324203 | A1 | 10/2014 | Coburn, IV et al. |
| 2014/0328490 | A1 | 11/2014 | Mohammad et al. |
| 2014/0330896 | A1 | 11/2014 | Addala et al. |
| 2014/0334645 | A1 | 11/2014 | Yun et al. |
| 2014/0340888 | A1 | 11/2014 | Ishisone et al. |
| 2014/0357248 | A1 | 12/2014 | Tonshal et al. |
| 2014/0358535 | A1 | 12/2014 | Lee et al. |
| 2014/0363022 | A1 | 12/2014 | Dizon et al. |
| 2014/0363024 | A1 | 12/2014 | Apodaca |
| 2014/0364089 | A1 | 12/2014 | Lienhart et al. |
| 2014/0365225 | A1 | 12/2014 | Haiut |
| 2014/0365227 | A1 | 12/2014 | Cash et al. |
| 2014/0368734 | A1 | 12/2014 | Hoffert et al. |
| 2014/0369491 | A1 | 12/2014 | Kloberdans et al. |
| 2014/0372109 | A1 | 12/2014 | Iyer et al. |
| 2015/0006176 | A1 | 1/2015 | Pogue et al. |
| 2015/0006184 | A1 | 1/2015 | Marti et al. |
| 2015/0010169 | A1 | 1/2015 | Popova et al. |
| 2015/0014680 | A1 | 1/2015 | Yamazaki et al. |
| 2015/0016642 | A1 | 1/2015 | Walsh et al. |
| 2015/0018992 | A1 | 1/2015 | Griffiths et al. |
| 2015/0019201 | A1 | 1/2015 | Schoenbach |
| 2015/0019219 | A1 | 1/2015 | Tzirkel-Hancock et al. |
| 2015/0030172 | A1 | 1/2015 | Gaensler et al. |
| 2015/0032443 | A1 | 1/2015 | Karov et al. |
| 2015/0032456 | A1 | 1/2015 | Wait |
| 2015/0036831 | A1 | 2/2015 | Klippel |
| 2015/0039303 | A1 | 2/2015 | Lesso et al. |
| 2015/0039310 | A1 | 2/2015 | Clark et al. |
| 2015/0039311 | A1 | 2/2015 | Clark et al. |
| 2015/0039317 | A1 | 2/2015 | Klein et al. |
| 2015/0058018 | A1 | 2/2015 | Georges et al. |
| 2015/0063580 | A1 | 3/2015 | Huang et al. |
| 2015/0066479 | A1 | 3/2015 | Pasupalak et al. |
| 2015/0073807 | A1 | 3/2015 | Kumar |
| 2015/0086034 | A1 | 3/2015 | Lombardi et al. |
| 2015/0088500 | A1 | 3/2015 | Conliffe |
| 2015/0091709 | A1 | 4/2015 | Reichert et al. |
| 2015/0092947 | A1 | 4/2015 | Gossain et al. |
| 2015/0104037 | A1 | 4/2015 | Lee et al. |
| 2015/0106085 | A1 | 4/2015 | Lindahl |
| 2015/0110294 | A1 | 4/2015 | Chen et al. |
| 2015/0112672 | A1 | 4/2015 | Giacobello et al. |
| 2015/0124975 | A1 | 5/2015 | Pontoppidan |
| 2015/0126255 | A1 | 5/2015 | Yang et al. |
| 2015/0128065 | A1 | 5/2015 | Torii et al. |
| 2015/0134456 | A1 | 5/2015 | Baldwin |
| 2015/0154953 | A1 | 6/2015 | Bapat et al. |
| 2015/0154976 | A1 | 6/2015 | Mutagi |
| 2015/0161990 | A1 | 6/2015 | Sharifi |
| 2015/0169279 | A1 | 6/2015 | Duga |
| 2015/0170645 | A1 | 6/2015 | Di et al. |
| 2015/0170665 | A1 | 6/2015 | Gundeti et al. |
| 2015/0172843 | A1 | 6/2015 | Quan |
| 2015/0179181 | A1 | 6/2015 | Morris et al. |

(56) References Cited

U.S. PATENT DOCUMENTS

| | | | |
|---|---|---|---|
| 2015/0180432 | A1 | 6/2015 | Gao et al. |
| 2015/0181318 | A1 | 6/2015 | Gautama et al. |
| 2015/0189438 | A1 | 7/2015 | Hampiholi et al. |
| 2015/0200454 | A1 | 7/2015 | Heusdens et al. |
| 2015/0200923 | A1 | 7/2015 | Triplett |
| 2015/0201271 | A1 | 7/2015 | Diethorn et al. |
| 2015/0221307 | A1 | 8/2015 | Shah et al. |
| 2015/0221678 | A1 | 8/2015 | Yamazaki et al. |
| 2015/0222563 | A1 | 8/2015 | Burns et al. |
| 2015/0222987 | A1 | 8/2015 | Angel, Jr. et al. |
| 2015/0228274 | A1 | 8/2015 | Leppanen et al. |
| 2015/0228803 | A1 | 8/2015 | Koezuka et al. |
| 2015/0237406 | A1 | 8/2015 | Ochoa |
| 2015/0243287 | A1 | 8/2015 | Nakano et al. |
| 2015/0245152 | A1 | 8/2015 | Ding et al. |
| 2015/0245154 | A1 | 8/2015 | Dadu et al. |
| 2015/0249889 | A1 | 9/2015 | Iyer et al. |
| 2015/0253292 | A1 | 9/2015 | Larkin et al. |
| 2015/0253960 | A1 | 9/2015 | Lin et al. |
| 2015/0254057 | A1 | 9/2015 | Klein et al. |
| 2015/0263174 | A1 | 9/2015 | Yamazaki et al. |
| 2015/0271593 | A1 | 9/2015 | Sun et al. |
| 2015/0277846 | A1 | 10/2015 | Yen et al. |
| 2015/0280676 | A1 | 10/2015 | Holman et al. |
| 2015/0296299 | A1 | 10/2015 | Klippel et al. |
| 2015/0302856 | A1 | 10/2015 | Kim et al. |
| 2015/0319529 | A1 | 11/2015 | Klippel |
| 2015/0325267 | A1 | 11/2015 | Lee et al. |
| 2015/0331663 | A1 | 11/2015 | Beckhardt et al. |
| 2015/0334471 | A1 | 11/2015 | Innes et al. |
| 2015/0338917 | A1 | 11/2015 | Steiner et al. |
| 2015/0341406 | A1 | 11/2015 | Rockefeller et al. |
| 2015/0346845 | A1 | 12/2015 | Di et al. |
| 2015/0348548 | A1 | 12/2015 | Piernot et al. |
| 2015/0348551 | A1 | 12/2015 | Gruber et al. |
| 2015/0355878 | A1 | 12/2015 | Corbin |
| 2015/0363061 | A1 | 12/2015 | De, III et al. |
| 2015/0363401 | A1 | 12/2015 | Chen et al. |
| 2015/0370531 | A1 | 12/2015 | Faaborg |
| 2015/0371657 | A1 | 12/2015 | Gao |
| 2015/0371659 | A1 | 12/2015 | Gao |
| 2015/0371664 | A1 | 12/2015 | Bar-Or et al. |
| 2015/0373100 | A1 | 12/2015 | Kravets et al. |
| 2015/0380010 | A1 | 12/2015 | Srinivasan |
| 2015/0382047 | A1 | 12/2015 | Van Os et al. |
| 2015/0382128 | A1 | 12/2015 | Ridihalgh et al. |
| 2016/0007116 | A1 | 1/2016 | Holman |
| 2016/0018873 | A1 | 1/2016 | Fernald et al. |
| 2016/0021458 | A1 | 1/2016 | Johnson et al. |
| 2016/0026428 | A1 | 1/2016 | Morganstern et al. |
| 2016/0027440 | A1 | 1/2016 | Gelfenbeyn et al. |
| 2016/0029142 | A1 | 1/2016 | Isaac et al. |
| 2016/0034448 | A1 | 2/2016 | Tran |
| 2016/0035321 | A1 | 2/2016 | Cho et al. |
| 2016/0035337 | A1 | 2/2016 | Aggarwal et al. |
| 2016/0036962 | A1 | 2/2016 | Rand et al. |
| 2016/0042748 | A1 | 2/2016 | Jain et al. |
| 2016/0044151 | A1 | 2/2016 | Shoemaker et al. |
| 2016/0050488 | A1 | 2/2016 | Matheja et al. |
| 2016/0055847 | A1 | 2/2016 | Dahan |
| 2016/0055850 | A1 | 2/2016 | Nakadai et al. |
| 2016/0057522 | A1 | 2/2016 | Choisel et al. |
| 2016/0066087 | A1 | 3/2016 | Solbach et al. |
| 2016/0070526 | A1 | 3/2016 | Sheen |
| 2016/0072804 | A1 | 3/2016 | Chien et al. |
| 2016/0077710 | A1 | 3/2016 | Lewis et al. |
| 2016/0077794 | A1 | 3/2016 | Kim et al. |
| 2016/0086609 | A1 | 3/2016 | Yue et al. |
| 2016/0088036 | A1 | 3/2016 | Corbin et al. |
| 2016/0088392 | A1 | 3/2016 | Huttunen et al. |
| 2016/0093281 | A1 | 3/2016 | Kuo et al. |
| 2016/0093304 | A1 | 3/2016 | Kim et al. |
| 2016/0094718 | A1 | 3/2016 | Mani et al. |
| 2016/0094917 | A1 | 3/2016 | Wilk et al. |
| 2016/0098393 | A1 | 4/2016 | Hebert |
| 2016/0098992 | A1 | 4/2016 | Renard et al. |
| 2016/0103653 | A1 | 4/2016 | Jang |
| 2016/0104480 | A1 | 4/2016 | Sharifi |
| 2016/0111110 | A1 | 4/2016 | Gautama et al. |
| 2016/0125876 | A1 | 5/2016 | Schroeter et al. |
| 2016/0127780 | A1 | 5/2016 | Roberts et al. |
| 2016/0133259 | A1 | 5/2016 | Rubin et al. |
| 2016/0134924 | A1 | 5/2016 | Bush et al. |
| 2016/0134966 | A1 | 5/2016 | Fitzgerald et al. |
| 2016/0134982 | A1 | 5/2016 | Iyer |
| 2016/0140957 | A1 | 5/2016 | Duta et al. |
| 2016/0148612 | A1 | 5/2016 | Guo et al. |
| 2016/0148615 | A1 | 5/2016 | Lee et al. |
| 2016/0154089 | A1 | 6/2016 | Altman |
| 2016/0155442 | A1 | 6/2016 | Kannan et al. |
| 2016/0155443 | A1 | 6/2016 | Khan et al. |
| 2016/0157035 | A1 | 6/2016 | Russell et al. |
| 2016/0162469 | A1 | 6/2016 | Santos |
| 2016/0171976 | A1 | 6/2016 | Sun et al. |
| 2016/0173578 | A1 | 6/2016 | Sharma et al. |
| 2016/0173983 | A1 | 6/2016 | Berthelsen et al. |
| 2016/0180853 | A1 | 6/2016 | Vanlund et al. |
| 2016/0189716 | A1 | 6/2016 | Lindahl et al. |
| 2016/0192099 | A1 | 6/2016 | Oishi et al. |
| 2016/0196499 | A1 | 7/2016 | Khan et al. |
| 2016/0203331 | A1 | 7/2016 | Khan et al. |
| 2016/0210110 | A1 | 7/2016 | Feldman |
| 2016/0212488 | A1 | 7/2016 | Os et al. |
| 2016/0212538 | A1 | 7/2016 | Fullam et al. |
| 2016/0216938 | A1 | 7/2016 | Millington |
| 2016/0217789 | A1 | 7/2016 | Lee et al. |
| 2016/0225385 | A1 | 8/2016 | Hammarqvist |
| 2016/0232451 | A1 | 8/2016 | Scherzer |
| 2016/0234204 | A1 | 8/2016 | Rishi et al. |
| 2016/0239255 | A1 | 8/2016 | Chavez et al. |
| 2016/0240192 | A1 | 8/2016 | Raghuvir |
| 2016/0241976 | A1 | 8/2016 | Pearson |
| 2016/0253050 | A1 | 9/2016 | Mishra et al. |
| 2016/0260431 | A1 | 9/2016 | Newendorp et al. |
| 2016/0283841 | A1 | 9/2016 | Sainath et al. |
| 2016/0299737 | A1 | 10/2016 | Clayton et al. |
| 2016/0302018 | A1 | 10/2016 | Russell et al. |
| 2016/0314782 | A1 | 10/2016 | Klimanis |
| 2016/0316293 | A1 | 10/2016 | Klimanis |
| 2016/0322045 | A1 | 11/2016 | Hatfield et al. |
| 2016/0336519 | A1 | 11/2016 | Seo et al. |
| 2016/0343866 | A1 | 11/2016 | Koezuka et al. |
| 2016/0343949 | A1 | 11/2016 | Seo et al. |
| 2016/0343954 | A1 | 11/2016 | Seo et al. |
| 2016/0345114 | A1 | 11/2016 | Hanna et al. |
| 2016/0352915 | A1 | 12/2016 | Gautama |
| 2016/0353217 | A1 | 12/2016 | Starobin et al. |
| 2016/0353218 | A1 | 12/2016 | Starobin et al. |
| 2016/0357503 | A1 | 12/2016 | Triplett et al. |
| 2016/0364206 | A1 | 12/2016 | Keyser-Allen et al. |
| 2016/0366515 | A1 | 12/2016 | Mendes et al. |
| 2016/0372113 | A1 | 12/2016 | David et al. |
| 2016/0372688 | A1 | 12/2016 | Seo et al. |
| 2016/0373269 | A1 | 12/2016 | Okubo et al. |
| 2016/0373909 | A1 | 12/2016 | Rasmussen et al. |
| 2016/0379634 | A1 | 12/2016 | Yamamoto et al. |
| 2016/0379635 | A1 | 12/2016 | Page |
| 2017/0003931 | A1 | 1/2017 | Dvortsov et al. |
| 2017/0012207 | A1 | 1/2017 | Seo et al. |
| 2017/0012232 | A1 | 1/2017 | Kataishi et al. |
| 2017/0019732 | A1 | 1/2017 | Mendes et al. |
| 2017/0025124 | A1 | 1/2017 | Mixter et al. |
| 2017/0025615 | A1 | 1/2017 | Seo et al. |
| 2017/0025630 | A1 | 1/2017 | Seo et al. |
| 2017/0026769 | A1 | 1/2017 | Patel |
| 2017/0032244 | A1 | 2/2017 | Kurata |
| 2017/0034263 | A1 | 2/2017 | Archambault et al. |
| 2017/0039025 | A1 | 2/2017 | Kielak |
| 2017/0040002 | A1 | 2/2017 | Basson et al. |
| 2017/0040018 | A1 | 2/2017 | Tormey |
| 2017/0041724 | A1 | 2/2017 | Master et al. |
| 2017/0053648 | A1 | 2/2017 | Chi |
| 2017/0053650 | A1 | 2/2017 | Ogawa |
| 2017/0060526 | A1 | 3/2017 | Barton et al. |

(56) References Cited

U.S. PATENT DOCUMENTS

2017/0062734 A1 3/2017 Suzuki et al.
2017/0070478 A1 3/2017 Park et al.
2017/0076212 A1 3/2017 Shams et al.
2017/0076720 A1 3/2017 Gopalan et al.
2017/0076726 A1 3/2017 Bae
2017/0078824 A1 3/2017 Heo
2017/0083285 A1 3/2017 Meyers et al.
2017/0083606 A1 3/2017 Mohan
2017/0084277 A1 3/2017 Sharifi
2017/0084278 A1 3/2017 Jung
2017/0084292 A1 3/2017 Yoo
2017/0084295 A1 3/2017 Tsiartas et al.
2017/0090864 A1 3/2017 Jorgovanovic
2017/0092278 A1 3/2017 Evermann et al.
2017/0092297 A1 3/2017 Sainath et al.
2017/0092299 A1 3/2017 Matsuo
2017/0092889 A1 3/2017 Seo et al.
2017/0092890 A1 3/2017 Seo et al.
2017/0094215 A1 3/2017 Western
2017/0103748 A1 4/2017 Weissberg et al.
2017/0103754 A1 4/2017 Higbie et al.
2017/0103755 A1 4/2017 Jeon et al.
2017/0110124 A1 4/2017 Boesen et al.
2017/0110130 A1 4/2017 Sharifi et al.
2017/0110144 A1 4/2017 Sharifi et al.
2017/0117497 A1 4/2017 Seo et al.
2017/0123251 A1 5/2017 Nakada et al.
2017/0125037 A1 5/2017 Shin
2017/0125456 A1 5/2017 Kasahara
2017/0133007 A1 5/2017 Drewes
2017/0133011 A1 5/2017 Chen et al.
2017/0134872 A1 5/2017 Silva et al.
2017/0139720 A1 5/2017 Stein
2017/0140449 A1 5/2017 Kannan
2017/0140748 A1 5/2017 Roberts et al.
2017/0140750 A1 5/2017 Wang et al.
2017/0140757 A1 5/2017 Penilla et al.
2017/0140759 A1 5/2017 Kumar et al.
2017/0151930 A1 6/2017 Boesen
2017/0162198 A1 6/2017 Chakladar et al.
2017/0164139 A1 6/2017 Deselaers et al.
2017/0177585 A1 6/2017 Rodger et al.
2017/0178662 A1 6/2017 Ayrapetian et al.
2017/0180561 A1 6/2017 Kadiwala et al.
2017/0186425 A1 6/2017 Dawes et al.
2017/0186427 A1 6/2017 Wang et al.
2017/0188150 A1 6/2017 Brunet et al.
2017/0188437 A1 6/2017 Banta
2017/0193999 A1 7/2017 Aleksic et al.
2017/0206896 A1 7/2017 Ko et al.
2017/0206900 A1 7/2017 Lee et al.
2017/0214996 A1 7/2017 Yeo
2017/0236512 A1 8/2017 Williams et al.
2017/0236515 A1 8/2017 Pinsky et al.
2017/0242649 A1 8/2017 Jarvis et al.
2017/0242651 A1 8/2017 Lang et al.
2017/0242653 A1 8/2017 Lang et al.
2017/0242656 A1 8/2017 Plagge et al.
2017/0242657 A1 8/2017 Jarvis et al.
2017/0243576 A1 8/2017 Millington et al.
2017/0243587 A1 8/2017 Plagge et al.
2017/0245076 A1 8/2017 Kusano et al.
2017/0255612 A1 9/2017 Sarikaya et al.
2017/0257686 A1 9/2017 Gautama et al.
2017/0269900 A1 9/2017 Triplett
2017/0269975 A1 9/2017 Wood et al.
2017/0270919 A1 9/2017 Parthasarathi et al.
2017/0278512 A1 9/2017 Pandya et al.
2017/0287485 A1 10/2017 Civelli et al.
2017/0287496 A1* 10/2017 Heitkamp .............. H04S 3/008
2017/0300289 A1 10/2017 Gattis
2017/0300990 A1 10/2017 Tanaka et al.
2017/0329397 A1 11/2017 Lin
2017/0330565 A1 11/2017 Daley et al.
2017/0331869 A1 11/2017 Bendahan et al.
2017/0332168 A1 11/2017 Moghimi et al.
2017/0346872 A1 11/2017 Naik et al.
2017/0352357 A1 12/2017 Fink
2017/0353789 A1 12/2017 Kim et al.
2017/0357390 A1 12/2017 Alonso Ruiz et al.
2017/0357475 A1 12/2017 Lee et al.
2017/0357478 A1 12/2017 Piersol et al.
2017/0364371 A1 12/2017 Nandi et al.
2017/0365247 A1 12/2017 Ushakov
2017/0366393 A1 12/2017 Shaker et al.
2017/0374454 A1 12/2017 Bernardini et al.
2017/0374552 A1 12/2017 Xia et al.
2018/0011685 A1 1/2018 Weingartner
2018/0012077 A1 1/2018 Laska et al.
2018/0018964 A1 1/2018 Reilly et al.
2018/0018965 A1 1/2018 Daley
2018/0018967 A1 1/2018 Lang et al.
2018/0020306 A1 1/2018 Sheen
2018/0025733 A1 1/2018 Qian et al.
2018/0033428 A1 2/2018 Kim et al.
2018/0033429 A1 2/2018 Makke et al.
2018/0033438 A1 2/2018 Toma et al.
2018/0040324 A1* 2/2018 Wilberding ............. G06F 3/167
2018/0047394 A1 2/2018 Tian et al.
2018/0053504 A1 2/2018 Wang et al.
2018/0054506 A1 2/2018 Hart et al.
2018/0061396 A1 3/2018 Srinivasan et al.
2018/0061402 A1 3/2018 Devaraj et al.
2018/0061404 A1 3/2018 Devaraj et al.
2018/0061409 A1 3/2018 Valentine et al.
2018/0061419 A1 3/2018 Melendo Casado et al.
2018/0061420 A1 3/2018 Patil et al.
2018/0062871 A1 3/2018 Jones et al.
2018/0084367 A1 3/2018 Greff et al.
2018/0088900 A1 3/2018 Glaser et al.
2018/0091898 A1 3/2018 Yoon et al.
2018/0091913 A1 3/2018 Hartung et al.
2018/0096678 A1 4/2018 Zhou et al.
2018/0096683 A1 4/2018 James et al.
2018/0096696 A1 4/2018 Mixter
2018/0107446 A1 4/2018 Wilberding et al.
2018/0108351 A1 4/2018 Beckhardt et al.
2018/0122372 A1 5/2018 Wanderlust
2018/0122378 A1 5/2018 Mixter et al.
2018/0130469 A1 5/2018 Gruenstein et al.
2018/0132217 A1 5/2018 Stirling-Gallacher
2018/0132298 A1 5/2018 Birnam et al.
2018/0137857 A1 5/2018 Zhou et al.
2018/0137861 A1 5/2018 Ogawa
2018/0139512 A1 5/2018 Moran et al.
2018/0152557 A1 5/2018 White et al.
2018/0158454 A1 6/2018 Campbell et al.
2018/0165055 A1 6/2018 Yu et al.
2018/0167981 A1 6/2018 Jonna et al.
2018/0174597 A1 6/2018 Lee et al.
2018/0182383 A1 6/2018 Kim et al.
2018/0182390 A1 6/2018 Hughes et al.
2018/0182397 A1 6/2018 Carbune et al.
2018/0182410 A1 6/2018 Kaskari et al.
2018/0188948 A1 7/2018 Ouyang et al.
2018/0190274 A1 7/2018 Kirazci et al.
2018/0190285 A1 7/2018 Heckmann et al.
2018/0196776 A1 7/2018 Hershko et al.
2018/0197533 A1 7/2018 Lyon et al.
2018/0199130 A1 7/2018 Jaffe et al.
2018/0199146 A1 7/2018 Sheen
2018/0204569 A1 7/2018 Nadkar et al.
2018/0205963 A1 7/2018 Matei et al.
2018/0210698 A1 7/2018 Park et al.
2018/0211665 A1 7/2018 Park et al.
2018/0218747 A1 8/2018 Moghimi et al.
2018/0219976 A1 8/2018 Decenzo et al.
2018/0225933 A1 8/2018 Park et al.
2018/0228006 A1 8/2018 Baker et al.
2018/0233130 A1 8/2018 Kaskari et al.
2018/0233136 A1 8/2018 Torok et al.
2018/0233137 A1 8/2018 Torok et al.
2018/0233139 A1 8/2018 Finkelstein et al.
2018/0233141 A1 8/2018 Solomon et al.

(56) References Cited

U.S. PATENT DOCUMENTS

| | | | |
|---|---|---|---|
| 2018/0233142 | A1 | 8/2018 | Koishida et al. |
| 2018/0233150 | A1 | 8/2018 | Gruenstein et al. |
| 2018/0234765 | A1 | 8/2018 | Torok et al. |
| 2018/0260680 | A1 | 9/2018 | Finkelstein et al. |
| 2018/0261213 | A1 | 9/2018 | Arik et al. |
| 2018/0262793 | A1 | 9/2018 | Lau et al. |
| 2018/0262831 | A1 | 9/2018 | Matheja et al. |
| 2018/0270565 | A1 | 9/2018 | Ganeshkumar |
| 2018/0270573 | A1 | 9/2018 | Lang et al. |
| 2018/0270575 | A1 | 9/2018 | Akutagawa |
| 2018/0277107 | A1 | 9/2018 | Kim |
| 2018/0277113 | A1 | 9/2018 | Hartung et al. |
| 2018/0277119 | A1 | 9/2018 | Baba et al. |
| 2018/0277133 | A1 | 9/2018 | Deetz et al. |
| 2018/0286394 | A1 | 10/2018 | Li et al. |
| 2018/0286414 | A1 | 10/2018 | Ravindran et al. |
| 2018/0293221 | A1 | 10/2018 | Finkelstein et al. |
| 2018/0293484 | A1 | 10/2018 | Wang et al. |
| 2018/0301147 | A1 | 10/2018 | Kim |
| 2018/0308470 | A1 | 10/2018 | Park et al. |
| 2018/0314552 | A1 | 11/2018 | Kim et al. |
| 2018/0322891 | A1 | 11/2018 | Van Den Oord et al. |
| 2018/0324756 | A1 | 11/2018 | Ryu et al. |
| 2018/0330727 | A1 | 11/2018 | Tulli |
| 2018/0335903 | A1 | 11/2018 | Coffman et al. |
| 2018/0336274 | A1 | 11/2018 | Choudhury et al. |
| 2018/0336892 | A1 | 11/2018 | Kim et al. |
| 2018/0349093 | A1 | 12/2018 | McCarty et al. |
| 2018/0350356 | A1 | 12/2018 | Garcia |
| 2018/0350379 | A1 | 12/2018 | Wung et al. |
| 2018/0352014 | A1 | 12/2018 | Alsina et al. |
| 2018/0352334 | A1 | 12/2018 | Family et al. |
| 2018/0356962 | A1 | 12/2018 | Corbin |
| 2018/0358009 | A1 | 12/2018 | Daley et al. |
| 2018/0358019 | A1 | 12/2018 | Mont-Reynaud |
| 2018/0365567 | A1 | 12/2018 | Kolavennu et al. |
| 2018/0367944 | A1 | 12/2018 | Heo et al. |
| 2019/0012141 | A1 | 1/2019 | Piersol et al. |
| 2019/0013019 | A1 | 1/2019 | Lawrence |
| 2019/0014592 | A1 | 1/2019 | Hampel et al. |
| 2019/0019112 | A1 | 1/2019 | Gelfenbeyn et al. |
| 2019/0025878 | A1 | 1/2019 | Shin et al. |
| 2019/0033446 | A1 | 1/2019 | Bultan et al. |
| 2019/0035404 | A1 | 1/2019 | Gabel et al. |
| 2019/0037173 | A1 | 1/2019 | Lee |
| 2019/0042187 | A1 | 2/2019 | Truong et al. |
| 2019/0043488 | A1 | 2/2019 | Bocklet et al. |
| 2019/0043492 | A1 | 2/2019 | Lang |
| 2019/0044745 | A1 | 2/2019 | Knudson et al. |
| 2019/0051298 | A1 | 2/2019 | Lee et al. |
| 2019/0066672 | A1 | 2/2019 | Wood et al. |
| 2019/0066680 | A1 | 2/2019 | Woo et al. |
| 2019/0066687 | A1 | 2/2019 | Wood et al. |
| 2019/0066710 | A1 | 2/2019 | Bryan et al. |
| 2019/0073999 | A1 | 3/2019 | Prémont et al. |
| 2019/0074025 | A1 | 3/2019 | Lashkari et al. |
| 2019/0079724 | A1 | 3/2019 | Feuz et al. |
| 2019/0081507 | A1 | 3/2019 | Ide |
| 2019/0081810 | A1 | 3/2019 | Jung |
| 2019/0082255 | A1 | 3/2019 | Tajiri et al. |
| 2019/0087455 | A1 | 3/2019 | He et al. |
| 2019/0088261 | A1 | 3/2019 | Lang et al. |
| 2019/0090056 | A1 | 3/2019 | Rexach et al. |
| 2019/0096408 | A1 | 3/2019 | Li et al. |
| 2019/0098400 | A1 | 3/2019 | Buoni et al. |
| 2019/0104119 | A1 | 4/2019 | Giorgi et al. |
| 2019/0104373 | A1 | 4/2019 | Wodrich et al. |
| 2019/0108839 | A1 | 4/2019 | Reilly et al. |
| 2019/0115011 | A1 | 4/2019 | Khellah et al. |
| 2019/0122662 | A1 | 4/2019 | Chang et al. |
| 2019/0130906 | A1 | 5/2019 | Kobayashi et al. |
| 2019/0156847 | A1 | 5/2019 | Bryan et al. |
| 2019/0163153 | A1 | 5/2019 | Price et al. |
| 2019/0172452 | A1 | 6/2019 | Smith et al. |
| 2019/0172467 | A1 | 6/2019 | Kim et al. |
| 2019/0172476 | A1 | 6/2019 | Wung et al. |
| 2019/0173687 | A1 | 6/2019 | Mackay et al. |
| 2019/0179607 | A1 | 6/2019 | Thangarathnam et al. |
| 2019/0179611 | A1 | 6/2019 | Wojogbe et al. |
| 2019/0182072 | A1 | 6/2019 | Roe et al. |
| 2019/0186937 | A1 | 6/2019 | Sharifi et al. |
| 2019/0188328 | A1 | 6/2019 | Oyenan et al. |
| 2019/0189117 | A1 | 6/2019 | Kumar |
| 2019/0206391 | A1 | 7/2019 | Busch et al. |
| 2019/0206405 | A1 | 7/2019 | Gillespie et al. |
| 2019/0206412 | A1 | 7/2019 | Li et al. |
| 2019/0219976 | A1 | 7/2019 | Giorgi et al. |
| 2019/0220246 | A1 | 7/2019 | Orr et al. |
| 2019/0221206 | A1 | 7/2019 | Chen et al. |
| 2019/0237067 | A1 | 8/2019 | Friedman et al. |
| 2019/0237089 | A1 | 8/2019 | Shin |
| 2019/0239008 | A1 | 8/2019 | Lambourne |
| 2019/0239009 | A1 | 8/2019 | Lambourne |
| 2019/0243603 | A1 | 8/2019 | Keyser-Allen et al. |
| 2019/0243606 | A1 | 8/2019 | Jayakumar et al. |
| 2019/0244608 | A1 | 8/2019 | Choi et al. |
| 2019/0251960 | A1 | 8/2019 | Maker et al. |
| 2019/0259408 | A1 | 8/2019 | Freeman et al. |
| 2019/0281387 | A1 | 9/2019 | Woo et al. |
| 2019/0281397 | A1 | 9/2019 | Lambourne |
| 2019/0287536 | A1 | 9/2019 | Sharifi et al. |
| 2019/0287546 | A1 | 9/2019 | Ganeshkumar |
| 2019/0288970 | A1 | 9/2019 | Siddiq |
| 2019/0289367 | A1 | 9/2019 | Siddiq |
| 2019/0295542 | A1 | 9/2019 | Huang et al. |
| 2019/0295555 | A1 | 9/2019 | Wilberding |
| 2019/0295556 | A1 | 9/2019 | Wilberding |
| 2019/0295563 | A1 | 9/2019 | Kamdar et al. |
| 2019/0297388 | A1 | 9/2019 | Panchaksharaiah et al. |
| 2019/0304443 | A1 | 10/2019 | Bhagwan |
| 2019/0311710 | A1 | 10/2019 | Eraslan et al. |
| 2019/0311712 | A1 | 10/2019 | Firik et al. |
| 2019/0311715 | A1 | 10/2019 | Pfeffinger et al. |
| 2019/0311718 | A1 | 10/2019 | Huber et al. |
| 2019/0311720 | A1 | 10/2019 | Pasko |
| 2019/0311722 | A1 | 10/2019 | Caldwell |
| 2019/0317606 | A1 | 10/2019 | Jain et al. |
| 2019/0318729 | A1 | 10/2019 | Chao et al. |
| 2019/0325870 | A1 | 10/2019 | Mitic |
| 2019/0325888 | A1 | 10/2019 | Geng |
| 2019/0341037 | A1 | 11/2019 | Bromand et al. |
| 2019/0341038 | A1 | 11/2019 | Bromand et al. |
| 2019/0342962 | A1 | 11/2019 | Chang et al. |
| 2019/0347063 | A1 | 11/2019 | Liu et al. |
| 2019/0348044 | A1 | 11/2019 | Chun et al. |
| 2019/0362714 | A1 | 11/2019 | Mori et al. |
| 2019/0364375 | A1 | 11/2019 | Soto et al. |
| 2019/0364422 | A1 | 11/2019 | Zhuo |
| 2019/0371310 | A1 | 12/2019 | Fox et al. |
| 2019/0371324 | A1 | 12/2019 | Powell et al. |
| 2019/0371342 | A1 | 12/2019 | Tukka et al. |
| 2019/0392832 | A1 | 12/2019 | Mitsui et al. |
| 2020/0007987 | A1 | 1/2020 | Woo et al. |
| 2020/0034492 | A1 | 1/2020 | Verbeke et al. |
| 2020/0043489 | A1 | 2/2020 | Bradley et al. |
| 2020/0051554 | A1 | 2/2020 | Kim et al. |
| 2020/0074990 | A1 | 3/2020 | Kim et al. |
| 2020/0090647 | A1 | 3/2020 | Kurtz |
| 2020/0092687 | A1 | 3/2020 | Devaraj et al. |
| 2020/0098354 | A1 | 3/2020 | Lin et al. |
| 2020/0098379 | A1 | 3/2020 | Tai et al. |
| 2020/0105245 | A1 | 4/2020 | Gupta et al. |
| 2020/0105256 | A1 | 4/2020 | Fainberg et al. |
| 2020/0105264 | A1 | 4/2020 | Jang et al. |
| 2020/0110571 | A1 | 4/2020 | Liu et al. |
| 2020/0125162 | A1 | 4/2020 | D'Amato et al. |
| 2020/0135194 | A1 | 4/2020 | Jeong |
| 2020/0135224 | A1 | 4/2020 | Bromand et al. |
| 2020/0152206 | A1 | 5/2020 | Shen et al. |
| 2020/0175989 | A1 | 6/2020 | Lockhart et al. |
| 2020/0184964 | A1 | 6/2020 | Myers et al. |
| 2020/0184980 | A1 | 6/2020 | Wilberding |
| 2020/0193973 | A1 | 6/2020 | Tolomei et al. |
| 2020/0211539 | A1 | 7/2020 | Lee |

(56) References Cited

U.S. PATENT DOCUMENTS

| | | | |
|---|---|---|---|
| 2020/0211550 | A1 | 7/2020 | Pan et al. |
| 2020/0211556 | A1 | 7/2020 | Mixter et al. |
| 2020/0213729 | A1 | 7/2020 | Soto |
| 2020/0216089 | A1 | 7/2020 | Garcia et al. |
| 2020/0234709 | A1 | 7/2020 | Kunitake |
| 2020/0244650 | A1 | 7/2020 | Burris et al. |
| 2020/0251107 | A1 | 8/2020 | Wang et al. |
| 2020/0265838 | A1 | 8/2020 | Lee et al. |
| 2020/0310751 | A1 | 10/2020 | Anand et al. |
| 2020/0336846 | A1 | 10/2020 | Rohde et al. |
| 2020/0342869 | A1 | 10/2020 | Lee et al. |
| 2020/0366477 | A1 | 11/2020 | Brown et al. |
| 2020/0395006 | A1 | 12/2020 | Smith et al. |
| 2020/0395010 | A1 | 12/2020 | Smith et al. |
| 2020/0395013 | A1 | 12/2020 | Smith et al. |
| 2020/0409652 | A1 | 12/2020 | Wilberding et al. |
| 2020/0409926 | A1 | 12/2020 | Srinivasan et al. |
| 2021/0035561 | A1 | 2/2021 | D'Amato et al. |
| 2021/0035572 | A1 | 2/2021 | D'Amato et al. |
| 2021/0067867 | A1 | 3/2021 | Kagoshima |
| 2021/0118429 | A1 | 4/2021 | Shan |
| 2021/0118439 | A1 | 4/2021 | Schillmoeller et al. |
| 2021/0166680 | A1 | 6/2021 | Jung et al. |
| 2021/0183366 | A1 | 6/2021 | Reinspach et al. |
| 2021/0193132 | A1* | 6/2021 | Hanes ................. G06F 16/3343 |
| 2021/0280185 | A1 | 9/2021 | Tan et al. |
| 2021/0287670 | A1* | 9/2021 | Regan ..................... G10L 15/22 |
| 2021/0295849 | A1 | 9/2021 | Van Der Ven et al. |
| 2021/0358481 | A1 | 11/2021 | D'Amato et al. |
| 2022/0036882 | A1 | 2/2022 | Ahn et al. |
| 2022/0050585 | A1 | 2/2022 | Fettes et al. |
| 2022/0083136 | A1 | 3/2022 | DeLeeuw |
| 2022/0301561 | A1 | 9/2022 | Robert Jose et al. |

FOREIGN PATENT DOCUMENTS

| | | | |
|---|---|---|---|
| CN | 1323435 | A | 11/2001 |
| CN | 1748250 | A | 3/2006 |
| CN | 1781291 | A | 5/2006 |
| CN | 101310558 | A | 11/2008 |
| CN | 101427154 | A | 5/2009 |
| CN | 101480039 | A | 7/2009 |
| CN | 101661753 | A | 3/2010 |
| CN | 101686282 | A | 3/2010 |
| CN | 101907983 | A | 12/2010 |
| CN | 102123188 | A | 7/2011 |
| CN | 102256098 | A | 11/2011 |
| CN | 102567468 | A | 7/2012 |
| CN | 102999161 | A | 3/2013 |
| CN | 103052001 | A | 4/2013 |
| CN | 103181192 | A | 6/2013 |
| CN | 103210663 | A | 7/2013 |
| CN | 103546616 | A | 1/2014 |
| CN | 103811007 | A | 5/2014 |
| CN | 104010251 | A | 8/2014 |
| CN | 104035743 | A | 9/2014 |
| CN | 104053088 | A | 9/2014 |
| CN | 104092936 | A | 10/2014 |
| CN | 104104769 | A | 10/2014 |
| CN | 104115224 | A | 10/2014 |
| CN | 104282305 | A | 1/2015 |
| CN | 104520927 | A | 4/2015 |
| CN | 104538030 | A | 4/2015 |
| CN | 104572009 | A | 4/2015 |
| CN | 104575504 | A | 4/2015 |
| CN | 104635539 | A | 5/2015 |
| CN | 104865550 | A | 8/2015 |
| CN | 104885406 | A | 9/2015 |
| CN | 104885438 | A | 9/2015 |
| CN | 105162886 | A | 12/2015 |
| CN | 105187907 | A | 12/2015 |
| CN | 105204357 | A | 12/2015 |
| CN | 105206281 | A | 12/2015 |
| CN | 105284076 | A | 1/2016 |
| CN | 105284168 | A | 1/2016 |
| CN | 105389099 | A | 3/2016 |
| CN | 105427861 | A | 3/2016 |
| CN | 105453179 | A | 3/2016 |
| CN | 105472191 | A | 4/2016 |
| CN | 105493179 | A | 4/2016 |
| CN | 105493442 | A | 4/2016 |
| CN | 105632486 | A | 6/2016 |
| CN | 105679318 | A | 6/2016 |
| CN | 106028223 | A | 10/2016 |
| CN | 106030699 | A | 10/2016 |
| CN | 106375902 | A | 2/2017 |
| CN | 106531165 | A | 3/2017 |
| CN | 106708403 | A | 5/2017 |
| CN | 106796784 | A | 5/2017 |
| CN | 106910500 | A | 6/2017 |
| CN | 107004410 | A | 8/2017 |
| CN | 107122158 | A | 9/2017 |
| CN | 107465974 | A | 12/2017 |
| CN | 107644313 | A | 1/2018 |
| CN | 107767863 | A | 3/2018 |
| CN | 107832837 | A | 3/2018 |
| CN | 107919116 | A | 4/2018 |
| CN | 107919123 | A | 4/2018 |
| CN | 108028047 | A | 5/2018 |
| CN | 108028048 | A | 5/2018 |
| CN | 108198548 | A | 6/2018 |
| CN | 109712626 | A | 5/2019 |
| EP | 1349146 | A1 | 10/2003 |
| EP | 1389853 | A1 | 2/2004 |
| EP | 2051542 | A1 | 4/2009 |
| EP | 2166737 | A1 | 3/2010 |
| EP | 2683147 | A1 | 1/2014 |
| EP | 2986034 | A1 | 2/2016 |
| EP | 3128767 | A2 | 2/2017 |
| EP | 3133595 | A1 | 2/2017 |
| EP | 2351021 | B1 | 9/2017 |
| EP | 3270377 | A1 | 1/2018 |
| EP | 3285502 | A1 | 2/2018 |
| GB | 2501367 | A | 10/2013 |
| JP | S63301998 | A | 12/1988 |
| JP | H0883091 | A | 3/1996 |
| JP | 2001236093 | A | 8/2001 |
| JP | 2003223188 | A | 8/2003 |
| JP | 2004109361 | A | 4/2004 |
| JP | 2004163590 | A | 6/2004 |
| JP | 2004347943 | A | 12/2004 |
| JP | 2004354721 | A | 12/2004 |
| JP | 2005242134 | A | 9/2005 |
| JP | 2005250867 | A | 9/2005 |
| JP | 2005284492 | A | 10/2005 |
| JP | 2006092482 | A | 4/2006 |
| JP | 2007013400 | A | 1/2007 |
| JP | 2007142595 | A | 6/2007 |
| JP | 2007235875 | A | 9/2007 |
| JP | 2008079256 | A | 4/2008 |
| JP | 2008158868 | A | 7/2008 |
| JP | 2008217444 | A | 9/2008 |
| JP | 2010141748 | A | 6/2010 |
| JP | 2013037148 | A | 2/2013 |
| JP | 2014071138 | A | 4/2014 |
| JP | 2014510481 | A | 4/2014 |
| JP | 2014137590 | A | 7/2014 |
| JP | 2015161551 | A | 9/2015 |
| JP | 2015527768 | A | 9/2015 |
| JP | 2016009193 | A | 1/2016 |
| JP | 2016095383 | A | 5/2016 |
| JP | 2017072857 | A | 4/2017 |
| JP | 2017129860 | A | 7/2017 |
| JP | 2017227912 | A | 12/2017 |
| JP | 2018055259 | A | 4/2018 |
| JP | 2019109510 | A | 7/2019 |
| KR | 20100036351 | A | 4/2010 |
| KR | 100966415 | B1 | 6/2010 |
| KR | 20100111071 | A | 10/2010 |
| KR | 20130050987 | A | 5/2013 |
| KR | 20140005410 | A | 1/2014 |
| KR | 20140035310 | A | 3/2014 |
| KR | 20140054643 | A | 5/2014 |
| KR | 20140111859 | A | 9/2014 |

(56) References Cited

FOREIGN PATENT DOCUMENTS

| | | | |
|---|---|---|---|
| KR | 20140112900 | A | 9/2014 |
| TW | 201629950 | A | 8/2016 |
| WO | 200153994 | | 7/2001 |
| WO | 03054854 | A2 | 7/2003 |
| WO | 2003093950 | A2 | 11/2003 |
| WO | 2008048599 | A1 | 4/2008 |
| WO | 2008096414 | A1 | 8/2008 |
| WO | 2012166386 | A2 | 12/2012 |
| WO | 2013184792 | A1 | 12/2013 |
| WO | 2014064531 | A1 | 5/2014 |
| WO | 2014159581 | A1 | 10/2014 |
| WO | 2015017303 | A1 | 2/2015 |
| WO | 2015037396 | A1 | 3/2015 |
| WO | 2015105788 | A1 | 7/2015 |
| WO | 2015131024 | A1 | 9/2015 |
| WO | 2015133022 | A1 | 9/2015 |
| WO | 2015178950 | A1 | 11/2015 |
| WO | 2015195216 | A1 | 12/2015 |
| WO | 2016003509 | A1 | 1/2016 |
| WO | 2016014142 | A1 | 1/2016 |
| WO | 2016014686 | A1 | 1/2016 |
| WO | 2016022926 | A1 | 2/2016 |
| WO | 2016033364 | A1 | 3/2016 |
| WO | 2016057268 | A1 | 4/2016 |
| WO | 2016085775 | A2 | 6/2016 |
| WO | 2016136062 | A1 | 9/2016 |
| WO | 2016165067 | A1 | 10/2016 |
| WO | 2016171956 | A1 | 10/2016 |
| WO | 2016200593 | A1 | 12/2016 |
| WO | 2017039632 | A1 | 3/2017 |
| WO | 2017058654 | A1 | 4/2017 |
| WO | 2017138934 | A1 | 8/2017 |
| WO | 2017147075 | A1 | 8/2017 |
| WO | 2017147936 | A1 | 9/2017 |
| WO | 2018027142 | A1 | 2/2018 |
| WO | 2018067404 | A1 | 4/2018 |
| WO | 2018140777 | A1 | 8/2018 |
| WO | 2019005772 | A1 | 1/2019 |

OTHER PUBLICATIONS

Chinese Patent Office, First Office Action and Translation mailed on Sep. 19, 2022, issued in connection with Chinese Application No. 201980056604.9, 13 pages.

Chinese Patent Office, First Office Action and Translation mailed on Dec. 20, 2021, issued in connection with Chinese Application No. 202010302650.7, 10 pages.

Chinese Patent Office, First Office Action and Translation mailed on Mar. 20, 2019, issued in connection with Chinese Application No. 201780025028.2, 18 pages.

Chinese Patent Office, First Office Action and Translation mailed on Nov. 25, 2022, issued in connection with Chinese Application No. 201780056321.5, 8 pages.

Chinese Patent Office, First Office Action and Translation mailed on Feb. 27, 2023, issued in connection with Chinese Application No. 201980003798.6, 12 pages.

Chinese Patent Office, First Office Action and Translation mailed on Mar. 27, 2019, issued in connection with Chinese Application No. 201780025029.7, 9 pages.

Chinese Patent Office, First Office Action and Translation mailed on May 27, 2021, issued in connection with Chinese Application No. 201880026360.5, 15 pages.

Chinese Patent Office, First Office Action and Translation mailed on Dec. 28, 2020, issued in connection with Chinese Application No. 201880072203.8, 11 pages.

Chinese Patent Office, First Office Action and Translation mailed on Dec. 30, 2022, issued in connection with Chinese Application No. 201880076775.3, 10 pages.

Chinese Patent Office, First Office Action and Translation mailed on Nov. 5, 2019, issued in connection with Chinese Application No. 201780072651.3, 19 pages.

Chinese Patent Office, First Office Action mailed on Feb. 28, 2020, issued in connection with Chinese Application No. 201780061543.6, 29 pages.

Chinese Patent Office, Second Office Action and Translation mailed on Mar. 3, 2022, issued in connection with Chinese Application No. 201880077216.4, 11 pages.

Chinese Patent Office, Second Office Action and Translation mailed on Apr. 1, 2023, issued in connection with Chinese Application No. 201980056604.9, 11 pages.

Chinese Patent Office, Second Office Action and Translation mailed on May 11, 2020, issued in connection with Chinese Application No. 201780061543.6, 17 pages.

Chinese Patent Office, Second Office Action and Translation mailed on Jul. 18, 2019, issued in connection with Chinese Application No. 201780025029.7, 14 pages.

Chinese Patent Office, Second Office Action and Translation mailed on Sep. 23, 2019, issued in connection with Chinese Application No. 201780025028.2, 15 pages.

Chinese Patent Office, Second Office Action and Translation mailed on Mar. 31, 2020, issued in connection with Chinese Application No. 201780072651.3, 17 pages.

Chinese Patent Office, Second Office Action mailed on Dec. 21, 2022, issued in connection with Chinese Application No. 201980089721.5, 12 pages.

Chinese Patent Office, Second Office Action mailed on May 30, 2023, issued in connection with Chinese Application No. 201980070006.7, 9 pages.

Chinese Patent Office, Third Office Action and Translation mailed on Sep. 16, 2019, issued in connection with Chinese Application No. 201780025029.7, 14 pages.

Chinese Patent Office, Third Office Action and Translation mailed on Aug. 5, 2020, issued in connection with Chinese Application No. 201780072651.3, 10 pages.

Chinese Patent Office, Translation of Office Action mailed on Jul. 18, 2019, issued in connection with Chinese Application No. 201780025029.7, 8 pages.

Chung et al. Empirical Evaluation of Gated Recurrent Neural Network on Sequence Modeling. Dec. 11, 2014, 9 pages.

Cipriani,. The complete list of OK, Google commands—CNET. Jul. 1, 2016, 5 pages. [online], [retrieved on Jan. 15, 2020]. Retrieved from the Internet: (URL:https://web.archive.org/web/20160803230926/https://www.cnet.com/how-to/complete-list-of-ok-google--commands/).

Corrected Notice of Allowability mailed on Mar. 8, 2017, issued in connection with U.S. Appl. No. 15/229,855, filed Aug. 5, 2016, 6 pages.

Couke et al. Efficient Keyword Spotting using Dilated Convolutions and Gating, arXiv:1811.07684v2, Feb. 18, 2019, 5 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, Decision to Refuse European Patent Application mailed on May 30, 2022, issued in connection with European Application No. 17200837.7, 4 pages.

European Patent Office, European EPC Article 94.3 mailed on Jun. 5, 2023, issued in connection with European Application No. 20710649.3, 8 pages.

European Patent Office, European EPC Article 94.3 mailed on Feb. 10, 2023, issued in connection with European Application No. 19729968.8, 7 pages.

European Patent Office, European EPC Article 94.3 mailed on Mar. 11, 2022, issued in connection with European Application No. 19731415.6, 7 pages.

European Patent Office, European EPC Article 94.3 mailed on Nov. 11, 2021, issued in connection with European Application No. 19784172.9, 5 pages.

European Patent Office, European EPC Article 94.3 mailed on May 2, 2022, issued in connection with European Application No. 20185599.6, 7 pages.

European Patent Office, European EPC Article 94.3 mailed on Jun. 21, 2022, issued in connection with European Application No. 19780508.8, 5 pages.

(56) References Cited

OTHER PUBLICATIONS

European Patent Office, European EPC Article 94.3 mailed on Feb. 23, 2021, issued in connection with European Application No. 17200837.7, 8 pages.
European Patent Office, European EPC Article 94.3 mailed on Feb. 23, 2023, issued in connection with European Application No. 19839734.1, 8 pages.
European Patent Office, European EPC Article 94.3 mailed on Feb. 26, 2021, issued in connection with European Application No. 18789515.6, 8 pages.
European Patent Office, European EPC Article 94.3 mailed on Nov. 28, 2022, issued in connection with European Application No. 18789515.6, 7 pages.
European Patent Office, European EPC Article 94.3 mailed on Mar. 3, 2022, issued in connection with European Application No. 19740292.8, 10 pages.
European Patent Office, European EPC Article 94.3 mailed on Jun. 30, 2022, issued in connection with European Application No. 19765953.5, 4 pages.
European Patent Office, European Extended Search Report mailed on Oct. 7, 2021, issued in connection with European Application No. 21193616.6, 9 pages.
European Patent Office, European Extended Search Report mailed on Oct. 7, 2022, issued in connection with European Application No. 22182193.7, 8 pages.
European Patent Office, European Extended Search Report mailed on Apr. 22, 2022, issued in connection with European Application No. 21195031.6, 14 pages.
European Patent Office, European Extended Search Report mailed on Jun. 23, 2022, issued in connection with European Application No. 22153180.9, 6 pages.
European Patent Office, European Extended Search Report mailed on Nov. 25, 2020, issued in connection with European Application No. 20185599.6, 9 pages.
European Patent Office, European Extended Search Report mailed on Feb. 3, 2020, issued in connection with European Application No. 19197116.7, 9 pages.
European Patent Office, European Extended Search Report mailed on Jan. 3, 2019, issued in connection with European Application No. 177570702, 8 pages.
European Patent Office, European Extended Search Report mailed on Jan. 3, 2019, issued in connection with European Application No. 17757075.1, 9 pages.
Non-Final Office Action mailed on Aug. 21, 2019, issued in connection with U.S. Appl. No. 16/192,126, filed Nov. 15, 2018, 8 pages.
Non-Final Office Action mailed on Feb. 21, 2019, issued in connection with U.S. Appl. No. 16/214,666, filed Dec. 10, 2018, 12 pages.
Non-Final Office Action mailed on Jan. 21, 2020, issued in connection with U.S. Appl. No. 16/214,711, filed Dec. 10, 2018, 9 pages.
Non-Final Office Action mailed on Jan. 21, 2020, issued in connection with U.S. Appl. No. 16/598,125, filed Oct. 10, 2019, 25 pages.
Non-Final Office Action mailed on Oct. 21, 2019, issued in connection with U.S. Appl. No. 15/973,413, filed May 7, 2018, 10 pages.
Non-Final Office Action mailed on Dec. 22, 2022, issued in connection with U.S. Appl. No. 16/168,389, filed Oct. 23, 2018, 39 pages.
Non-Final Office Action mailed on Jul. 22, 2020, issued in connection with U.S. Appl. No. 16/145,275, filed Sep. 28, 2018, 11 pages.
Non-Final Office Action mailed on May 22, 2018, issued in connection with U.S. Appl. No. 15/946,599, filed Apr. 5, 2018, 19 pages.
Non-Final Office Action mailed on Sep. 22, 2020, issued in connection with U.S. Appl. No. 16/539,843, filed Aug. 13, 2019, 7 pages.
Non-Final Office Action mailed on Jun. 23, 2021, issued in connection with U.S. Appl. No. 16/439,032, filed Jun. 12, 2019, 13 pages.
Non-Final Office Action mailed on Jun. 23, 2023, issued in connection with U.S. Appl. No. 18/048,945, filed Oct. 24, 2022, 10 pages.
Non-Final Office Action mailed on Mar. 23, 2022, issued in connection with U.S. Appl. No. 16/907,953, filed Jun. 22, 2020, 7 pages.
Non-Final Office Action mailed on May 23, 2019, issued in connection with U.S. Appl. No. 16/154,071, filed Oct. 8, 2018, 36 pages.
Non-Final Office Action mailed on Nov. 23, 2020, issued in connection with U.S. Appl. No. 16/524,306, filed Jul. 29, 2019, 14 pages.
Non-Final Office Action mailed on Sep. 23, 2020, issued in connection with U.S. Appl. No. 16/177,185, filed Oct. 31, 2018, 17 pages.
Non-Final Office Action mailed on Sep. 23, 2022, issued in connection with U.S. Appl. No. 16/153,530, filed Oct. 5, 2018, 25 pages.
Non-Final Office Action mailed on Apr. 24, 2023, issued in connection with U.S. Appl. No. 17/532,744, filed Nov. 22, 2021, 18 pages.
Non-Final Office Action mailed on Aug. 24, 2017, issued in connection with U.S. Appl. No. 15/297,627, filed Oct. 19, 2016, 13 pages.
Non-Final Office Action mailed on Jul. 24, 2019, issued in connection with U.S. Appl. No. 16/439,009, filed Jun. 12, 2019, 26 pages.
Non-Final Office Action mailed on May 24, 2022, issued in connection with U.S. Appl. No. 17/101,949, filed Nov. 23, 2020, 10 pages.
Non-Final Office Action mailed on Apr. 25, 2023, issued in connection with U.S. Appl. No. 17/536,572, filed Nov. 29, 2021, 8 pages.
Non-Final Office Action mailed on Apr. 25, 2023, issued in connection with U.S. Appl. No. 17/656,794, filed Mar. 28, 2022, 22 pages.
Non-Final Office Action mailed on Jul. 25, 2017, issued in connection with U.S. Appl. No. 15/273,679, filed Jul. 22, 2016, 11 pages.
Non-Final Office Action mailed on May 25, 2023, issued in connection with U.S. Appl. No. 18/157,937, filed Jan. 23, 2023, 9 pages.
Non-Final Office Action mailed on Oct. 25, 2022, issued in connection with U.S. Appl. No. 17/549,034, filed Dec. 13, 2021, 20 pages.
Non-Final Office Action mailed on Dec. 26, 2018, issued in connection with U.S. Appl. No. 16/154,469, filed Oct. 8, 2018, 7 pages.
Non-Final Office Action mailed on Jan. 26, 2017, issued in connection with U.S. Appl. No. 15/098,867, filed Apr. 14, 2016, 16 pages.
Non-Final Office Action mailed on May 26, 2022, issued in connection with U.S. Appl. No. 16/989,805, filed Aug. 10, 2020, 14 pages.
Non-Final Office Action mailed on Oct. 26, 2017, issued in connection with U.S. Appl. No. 15/438,744, filed Feb. 21, 2017, 12 pages.
Non-Final Office Action mailed on Oct. 26, 2021, issued in connection with U.S. Appl. No. 16/736,725, filed Jan. 7, 2020, 12 pages.
Non-Final Office Action mailed on Feb. 27, 2023, issued in connection with U.S. Appl. No. 17/493,430, filed Oct. 4, 2021, 17 pages.
Non-Final Office Action mailed on Jun. 27, 2018, issued in connection with U.S. Appl. No. 15/438,749, filed Feb. 21, 2017, 16 pages.
Non-Final Office Action mailed on Jun. 27, 2019, issued in connection with U.S. Appl. No. 16/437,437, filed Jun. 11, 2019, 8 pages.
Non-Final Office Action mailed on Jun. 27, 2019, issued in connection with U.S. Appl. No. 16/437,476, filed Jun. 11, 2019, 8 pages.

(56) References Cited

OTHER PUBLICATIONS

Non-Final Office Action mailed on Mar. 27, 2020, issued in connection with U.S. Appl. No. 16/790,621, filed Feb. 13, 2020, 8 pages.
Non-Final Office Action mailed on May 27, 2020, issued in connection with U.S. Appl. No. 16/715,713, filed Dec. 16, 2019, 14 pages.
Non-Final Office Action mailed on Oct. 27, 2020, issued in connection with U.S. Appl. No. 16/213,570, filed Dec. 7, 2018, 13 pages.
Non-Final Office Action mailed on Oct. 27, 2020, issued in connection with U.S. Appl. No. 16/715,984, filed Dec. 16, 2019, 14 pages.
Non-Final Office Action mailed on Oct. 27, 2020, issued in connection with U.S. Appl. No. 16/819,755, filed Mar. 16, 2020, 8 pages.
Non-Final Office Action mailed on Feb. 28, 2023, issued in connection with U.S. Appl. No. 17/548,921, filed Dec. 13, 2021, 12 pages.
Non-Final Office Action mailed on Mar. 28, 2022, issued in connection with U.S. Appl. No. 17/222,151, filed Apr. 5, 2021, 5 pages.
Non-Final Office Action mailed on Oct. 28, 2019, issued in connection with U.S. Appl. No. 16/145,275, filed Sep. 28, 2018, 11 pages.
Non-Final Office Action mailed on Oct. 28, 2021, issued in connection with U.S. Appl. No. 16/378,516, filed Apr. 8, 2019, 10 pages.
Non-Final Office Action mailed on Oct. 28, 2021, issued in connection with U.S. Appl. No. 17/247,736, filed Dec. 21, 2020, 12 pages.
Non-Final Office Action mailed on Mar. 29, 2019, issued in connection with U.S. Appl. No. 16/102,650, filed Aug. 13, 2018, 11 pages.
Non-Final Office Action mailed on Mar. 29, 2021, issued in connection with U.S. Appl. No. 16/528,265, filed Jul. 31, 2019, 18 pages.
Non-Final Office Action mailed on Nov. 29, 2021, issued in connection with U.S. Appl. No. 16/989,350, filed Aug. 10, 2020, 15 pages.
Non-Final Office Action mailed on Sep. 29, 2020, issued in connection with U.S. Appl. No. 16/402,617, filed May 3, 2019, 12 pages.
Non-Final Office Action mailed on Dec. 3, 2020, issued in connection with U.S. Appl. No. 16/145,275, filed Sep. 28, 2018, 11 pages.
Non-Final Office Action mailed on Jul. 3, 2019, issued in connection with U.S. Appl. No. 15/948,541, filed Apr. 9, 2018, 7 pages.
Notice of Allowance mailed on Aug. 15, 2022, issued in connection with U.S. Appl. No. 17/101,949, filed Nov. 23, 2020, 11 pages.
Notice of Allowance mailed on Dec. 15, 2017, issued in connection with U.S. Appl. No. 15/223,218, filed Jul. 29, 2016, 7 pages.
Notice of Allowance mailed on Feb. 15, 2023, issued in connection with U.S. Appl. No. 17/659,613, filed Apr. 18, 2022, 21 pages.
Notice of Allowance mailed on Jan. 15, 2020, issued in connection with U.S. Appl. No. 16/439,009, filed Jun. 12, 2019, 9 pages.
Notice of Allowance mailed on Jun. 15, 2023, issued in connection with U.S. Appl. No. 17/305,698, filed Jul. 13, 2021, 8 pages.
Notice of Allowance mailed on Jun. 15, 2023, issued in connection with U.S. Appl. No. 17/305,920, filed Jul. 16, 2021, 8 pages.
Notice of Allowance mailed on Mar. 15, 2019, issued in connection with U.S. Appl. No. 15/804,776, filed Nov. 6, 2017, 9 pages.
Notice of Allowance mailed on Oct. 15, 2019, issued in connection with U.S. Appl. No. 16/437,437, filed Jun. 11, 2019, 9 pages.
Notice of Allowance mailed on Oct. 15, 2020, issued in connection with U.S. Appl. No. 16/715,713, filed Dec. 16, 2019, 9 pages.
Notice of Allowance mailed on Oct. 15, 2021, issued in connection with U.S. Appl. No. 16/213,570, filed Dec. 7, 2018, 8 pages.
Notice of Allowance mailed on Sep. 15, 2021, issued in connection with U.S. Appl. No. 16/685,135, filed Nov. 15, 2019, 10 pages.
Notice of Allowance mailed on Sep. 15, 2022, issued in connection with U.S. Appl. No. 16/736,725, filed Jan. 1, 2020, 11 pages.
Notice of Allowance mailed on Apr. 16, 2021, issued in connection with U.S. Appl. No. 16/798,967, filed Feb. 24, 2020, 16 pages.
Notice of Allowance mailed on Aug. 16, 2017, issued in connection with U.S. Appl. No. 15/098,892, filed Apr. 14, 2016, 9 pages.
Notice of Allowance mailed on Aug. 17, 2017, issued in connection with U.S. Appl. No. 15/131,244, filed Apr. 18, 2016, 9 pages.
Notice of Allowance mailed on Aug. 17, 2022, issued in connection with U.S. Appl. No. 17/135,347, filed Dec. 28, 2020, 14 pages.
Notice of Allowance mailed on Feb. 17, 2021, issued in connection with U.S. Appl. No. 16/715,984, filed Dec. 16, 2019, 8 pages.
Notice of Allowance mailed on Jul. 17, 2019, issued in connection with U.S. Appl. No. 15/718,911, filed Sep. 28, 2017, 5 pages.
Notice of Allowance mailed on Jun. 17, 2020, issued in connection with U.S. Appl. No. 16/141,875, filed Sep. 25, 2018, 6 pages.
Notice of Allowance mailed on Nov. 17, 2022, issued in connection with U.S. Appl. No. 17/486,222, filed Sep. 27, 2021, 10 pages.
Notice of Allowance mailed on Sep. 17, 2018, issued in connection with U.S. Appl. No. 15/211,689, filed Jul. 15, 2016, 6 pages.
Notice of Allowance mailed on Apr. 18, 2019, issued in connection with U.S. Appl. No. 16/173,797, filed Oct. 29, 2018, 9 pages.
Notice of Allowance mailed on Dec. 18, 2019, issued in connection with U.S. Appl. No. 16/434,426, filed Jun. 7, 2019, 13 pages.
Notice of Allowance mailed on Feb. 18, 2020, issued in connection with U.S. Appl. No. 16/022,662, filed Jun. 28, 2018, 8 pages.
Notice of Allowance mailed on Jul. 18, 2019, issued in connection with U.S. Appl. No. 15/438,749, filed Feb. 21, 2017, 9 pages.
Notice of Allowance mailed on Jul. 18, 2019, issued in connection with U.S. Appl. No. 15/721,141, filed Sep. 29, 2017, 8 pages.
Notice of Allowance mailed on Jul. 18, 2022, issued in connection with U.S. Appl. No. 17/222,151, filed Apr. 5, 2021, 5 pages.
Notice of Allowance mailed on Mar. 18, 2021, issued in connection with U.S. Appl. No. 16/177,185, filed Oct. 31, 2018, 8 pages.
Notice of Allowance mailed on Aug. 19, 2020, issued in connection with U.S. Appl. No. 16/271,560, filed Feb. 8, 2019, 9 pages.
Notice of Allowance mailed on Dec. 19, 2018, issued in connection with U.S. Appl. No. 15/818,051, filed Nov. 20, 2017, 9 pages.
Notice of Allowance mailed on Jul. 19, 2018, issued in connection with U.S. Appl. No. 15/681,937, filed Aug. 21, 2017, 7 pages.
Notice of Allowance mailed on Mar. 19, 2021, issued in connection with U.S. Appl. No. 17/157,686, filed Jan. 25, 2021, 11 pages.
Notice of Allowance mailed on Aug. 2, 2019, issued in connection with U.S. Appl. No. 16/102,650, filed Aug. 13, 2018, 5 pages.
Notice of Allowance mailed on Dec. 2, 2020, issued in connection with U.S. Appl. No. 15/989,715, filed May 25, 2018, 11 pages.
Notice of Allowance mailed on Dec. 2, 2021, issued in connection with U.S. Appl. No. 16/841,116, filed Apr. 6, 2020, 5 pages.
Notice of Allowance mailed on Sep. 2, 2020, issued in connection with U.S. Appl. No. 16/214,711, filed Dec. 10, 2018, 9 pages.
Notice of Allowance mailed on Dec. 20, 2022, issued in connection with U.S. Appl. No. 16/806,747, filed Mar. 2, 2020, 5 pages.
Notice of Allowance mailed on Jan. 20, 2023, issued in connection with U.S. Appl. No. 16/915,234, filed Jun. 29, 2020, 6 pages.
Notice of Allowance mailed on Jul. 20, 2020, issued in connection with U.S. Appl. No. 15/984,073, filed May 18, 2018, 12 pages.
Notice of Allowance mailed on Jun. 20, 2022, issued in connection with U.S. Appl. No. 16/947,895, filed Aug. 24, 2020, 7 pages.
Notice of Allowance mailed on Mar. 20, 2018, issued in connection with U.S. Appl. No. 15/784,952, filed Oct. 16, 2017, 7 pages.
Notice of Allowance mailed on Mar. 20, 2023, issued in connection with U.S. Appl. No. 17/562,412, filed Dec. 27, 2021, 9 pages.
Notice of Allowance mailed on Oct. 20, 2021, issued in connection with U.S. Appl. No. 16/439,032, filed Jun. 12, 2019, 8 pages.
Notice of Allowance mailed on Sep. 20, 2018, issued in connection with U.S. Appl. No. 15/946,599, filed Apr. 5, 2018, 7 pages.
Notice of Allowance mailed on Apr. 21, 2021, issued in connection with U.S. Appl. No. 16/145,275, filed Sep. 28, 2018, 8 pages.
Notice of Allowance mailed on Dec. 21, 2021, issued in connection with U.S. Appl. No. 16/271,550, filed Feb. 8, 2019, 11 pages.
Notice of Allowance mailed on Feb. 21, 2020, issued in connection with U.S. Appl. No. 16/416,752, filed May 20, 2019, 6 pages.
Notice of Allowance mailed on Jan. 21, 2020, issued in connection with U.S. Appl. No. 16/672,764, filed Nov. 4, 2019, 10 pages.

(56) References Cited

OTHER PUBLICATIONS

Notice of Allowance mailed on Jan. 21, 2021, issued in connection with U.S. Appl. No. 16/600,644, filed Oct. 14, 2019, 7 pages.
Notice of Allowance mailed on Jul. 21, 2023, issued in connection with U.S. Appl. No. 17/986,241, filed Nov. 14, 2022, 12 pages.
International Searching Authority, International Search Report and Written Opinion mailed on May 30, 2017, issued in connection with International Application No. PCT/US2017/018728, Filed on Feb. 21, 2017, 11 bages.
International Searching Authority, Invitation to Pay Additional Fees on Jan. 27, 2023, issued in connection with International Application No. PCT/US2022/045399, filed on Sep. 30, 2022, 19 pages.
Japanese Patent Office, Decision of Refusal and Translation mailed on Oct. 4, 2022, issued in connection with Japanese Patent Application No. 2021-535871, 6 pages.
Japanese Patent Office, Decision of Refusal and Translation mailed on May 23, 2023, issued in connection with Japanese Patent Application No. 2021-163622, 13 pages.
Japanese Patent Office, Decision of Refusal and Translation mailed on Jul. 26, 2022, issued in connection with Japanese Patent Application No. 2020-513852, 10 pages.
Japanese Patent Office, Decision of Refusal and Translation mailed on Jun. 8, 2021, issued in connection with Japanese Patent Application No. 2019-073348, 5 pages.
Japanese Patent Office, English Translation of Office Action mailed on Nov. 17, 2020, issued in connection with Japanese Application No. 2019-145039, 5 pages.
Japanese Patent Office, English Translation of Office Action mailed on Aug. 27, 2020, issued in connection with Japanese Application No. 2019-073349, 6 pages.
Japanese Patent Office, English Translation of Office Action mailed on Jul. 30, 2020, issued in connection with Japanese Application No. 2019-517281, 26 pages.
Japanese Patent Office, Non-Final Office Action and Translation mailed on Nov. 5, 2019, issued in connection with Japanese Patent Application No. 2019-517281, 6 pages.
Japanese Patent Office, Non-Final Office Action mailed on Apr. 4, 2023, issued in connection with Japanese Patent Application No. 2021-573944, 5 pages.
Japanese Patent Office, Notice of Reasons for Refusal and Translation mailed on Sep. 13, 2022, issued in connection with Japanese Patent Application No. 2021-163622, 12 pages.
Japanese Patent Office, Notice of Reasons for Refusal and Translation mailed on Jun. 22, 2021, issued in connection with Japanese Patent Application No. 2020-517935, 4 pages.
Japanese Patent Office, Notice of Reasons for Refusal and Translation mailed on Nov. 28, 2021, issued in connection with Japanese Patent Application No. 2020-550102, 9 pages.
Japanese Patent Office, Office Action and Translation mailed on Nov. 15, 2022, issued in connection with Japanese Patent Application No. 2021-146144, 9 pages.
Japanese Patent Office, Office Action and Translation mailed on Mar. 16, 2021, issued in connection with Japanese Patent Application No. 2020-506725, 7 pages.
Japanese Patent Office, Office Action and Translation mailed on Nov. 17, 2020, issued in connection with Japanese Patent Application No. 2019-145039, 7 pages.
Japanese Patent Office, Office Action and Translation mailed on Apr. 20, 2021, issued in connection with Japanese Patent Application No. 2020-513852, 9 pages.
Japanese Patent Office, Office Action and Translation mailed on Feb. 24, 2021, issued in connection with Japanese Patent Application No. 2019-517281, 4 pages.
Japanese Patent Office, Office Action and Translation mailed on Apr. 27, 2021, issued in connection with Japanese Patent Application No. 2020-518400, 10 pages.
Japanese Patent Office, Office Action and Translation mailed on Aug. 27, 2020, issued in connection with Japanese Patent Application No. 2019-073349, 6 pages.
Japanese Patent Office, Office Action and Translation mailed on Jul. 30, 2020, issued in connection with Japanese Patent Application No. 2019-517281, 6 pages.
Japanese Patent Office, Office Action and Translation mailed on Jul. 6, 2020, issued in connection with Japanese Patent Application No. 2019-073348, 10 pages.
Japanese Patent Office, Office Action and Translation mailed on Jul. 6, 2021, issued in connection with Japanese Patent Application No. 2019-073349, 6 pages.
Japanese Patent Office, Office Action and Translation mailed on Oct. 8, 2019, issued in connection with Japanese Patent Application No. 2019-521032, 5 pages.
Japanese Patent Office, Office Action mailed on Dec. 7, 2021, issued in connection with Japanese Patent Application No. 2020-513852, 6 pages.
Japanese Patent Office, Office Action mailed on Nov. 29, 2022, issued in connection with Japanese Patent Application No. 2021-181224, 6 pages.
Japanese Patent Office, Office Action Translation mailed on Nov. 5, 2019, issued in connection with Japanese Patent Application No. 2019-517281, 2 pages.
Japanese Patent Office, Office Action Translation mailed on Oct. 8, 2019, issued in connection with Japanese Patent Application No. 2019-521032, 8 pages.
Jo et al., "Synchronized One-to-many Media Streaming with Adaptive Playout Control," Proceedings of SPIE, 2002, pp. 71-82, vol. 4861.
Johnson, "Implementing Neural Networks into Modern Technology," IJCNN'99. International Joint Conference on Neural Networks . Proceedings [Cat. No. 99CH36339], Washington, DC, USA, 1999, pp. 1028-1032, vol. 2, doi: 10.1109/IJCNN.1999.831096. [retrieved on Jun. 22, 2020].
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Jose Alvarez and Mathieu Salzmann "Compression-aware Training of Deep Networks" 31st Conference on Neural Information Processing Systems, Nov. 13, 2017, 12pages.
Joseph Szurley et al, "Efficient computation of microphone utility in a wireless acoustic sensor network with multi-channel Wiener filter based noise reduction", 2012 IEEE International Conference on Acoustics, Speech and Signal Processing, Kyoto, Japan, Mar. 25-30, 2012, pp. 2657-2660, XP032227701, DOI: 10.1109/ICASSP .2012. 6288463 ISBN: 978-1-4673-0045-2.
Katsamanis et al. Robust far-field spoken command recognition for home automation combining adaptation and multichannel processing. ICASSP, IEEE International Conference on Acoustics, Speech and Signal Processing—Proceedings, May 2014, pp. 5547-5551.
Ketabdar et al. Detection of Out-of-Vocabulary Words in Posterior Based ASR. Proceedings of Interspeech 2007, Aug. 27, 2007, 4 pages.
Kim et al. Character-Aware Neural Language Models. Retrieved from the Internet: URL: https://arxiv.org/pdf/1508.06615v3.pdf, Oct. 16, 2015, 9 pages.
Korean Patent Office, Korean Examination Report and Translation mailed on Apr. 10, 2023, issued in connection with Korean Application No. 10-2022-7024007, 8 pages.
Korean Patent Office, Korean Examination Report and Translation mailed on Oct. 13, 2022, issued in connection with Korean Application No. 10-2021-7030939, 4 pages.
Korean Patent Office, Korean Examination Report and Translation mailed on Apr. 19, 2022, issued in connection with Korean Application No. 10-2021-7008937, 14 pages.
Korean Patent Office, Korean Examination Report and Translation mailed on Nov. 25, 2021, issued in connection with Korean Application No. 10-2021-7008937, 14 pages.
Korean Patent Office, Korean Examination Report and Translation mailed on Apr. 26, 2021, issued in connection with Korean Application No. 10-2021-7008937, 15 pages.
Korean Patent Office, Korean Examination Report and Translation mailed on Jul. 26, 2022, issued in connection with Korean Application No. 10-2022-7016656, 17 pages.

(56) References Cited

OTHER PUBLICATIONS

Korean Patent Office, Korean Examination Report and Translation mailed on Dec. 27, 2021, issued in connection with Korean Application No. 10-2021-7008937, 22 pages.
Korean Patent Office, Korean Examination Report and Translation mailed on Mar. 31, 2023, issued in connection with Korean Application No. 10-2022-7016656, 7 pages.
Korean Patent Office, Korean Examination Report and Translation mailed on Oct. 31, 2021, issued in connection with Korean Application No. 10-2022-7024007, 10 pages.
Korean Patent Office, Korean Office Action and Translation mailed on Oct. 14, 2021, issued in connection with Korean Application No. 10-2020-7011843, 29 pages.
Korean Patent Office, Korean Office Action and Translation mailed on Aug. 16, 2019, issued in connection with Korean Application No. 10-2018-7027452, 14 pages.
Korean Patent Office, Korean Office Action and Translation mailed on Apr. 2, 2020, issued in connection with Korean Application No. 10-2020-7008486, 12 pages.
European Patent Office, European Extended Search Report mailed on Jun. 30, 2022, issued in connection with European Application No. 21212763.3, 9 pages.
European Patent Office, European Extended Search Report mailed on Oct. 30, 2017, issued in connection with EP Application No. 17174435.2, 11 pages.
European Patent Office, European Extended Search Report mailed on Aug. 6, 2020, issued in connection with European Application No. 20166332.5, 10 pages.
European Patent Office, European Extended Search Report mailed on Jul. 8, 2022, issued in connection with European Application No. 22153523.0, 9 pages.
European Patent Office, European Office Action mailed on Jul. 1, 2020, issued in connection with European Application No. 17757075.1, 7 pages.
European Patent Office, European Office Action mailed on Jan. 14, 2020, issued in connection with European Application No. 17757070.2, 7 pages.
European Patent Office, European Office Action mailed on Jan. 21, 2021, issued in connection with European Application No. 17792272.1, 7 pages.
European Patent Office, European Office Action mailed on Jan. 22, 2019, issued in connection with European Application No. 17174435.2, 9 pages.
European Patent Office, European Office Action mailed on Sep. 23, 2020, issued in connection with European Application No. 18788976.1, 7 pages.
European Patent Office, European Office Action mailed on Oct. 26, 2020, issued in connection with European Application No. 18760101.8, 4 pages.
European Patent Office, European Office Action mailed on Aug. 30, 2019, issued in connection with European Application No. 17781608.9, 6 pages.
European Patent Office, European Office Action mailed on Sep. 9, 2020, issued in connection with European Application No. 18792656.3, 10 pages.
European Patent Office, European Search Report mailed on Mar. 1, 2022, issued in connection with European Application No. 21180778.9, 9 pages.
European Patent Office, European Search Report mailed on Oct. 4, 2022, issued in connection with European Application No. 22180226.7, 6 pages.
European Patent Office, Examination Report mailed on Jul. 15, 2021, issued in connection with European Patent Application No. 19729968.8, 7 pages.
European Patent Office, Extended Search Report mailed on Aug. 13, 2021, issued in connection with European Patent Application No. 21164130.3, 11 pages.
European Patent Office, Extended Search Report mailed on May 16, 2018, issued in connection with European Patent Application No. 17200837.7, 11 pages.
European Patent Office, Extended Search Report mailed on Jul. 25, 2019, issued in connection with European Patent Application No. 18306501.0, 14 pages.
European Patent Office, Extended Search Report mailed on May 29, 2020, issued in connection with European Patent Application No. 19209389.6, 8 pages.
European Patent Office, Summons to Attend Oral Proceedings mailed on Jul. 15, 2022, issued in connection with European Application No. 17792272.1, 11 pages.
European Patent Office, Summons to Attend Oral Proceedings mailed on Dec. 20, 2019, issued in connection with European Application No. 17174435.2, 13 pages.
European Patent Office, Summons to Attend Oral Proceedings mailed on Feb. 4, 2022, issued in connection with European Application No. 17757075.1, 10 pages.
European Patent Office, Summons to Attend Oral Proceedings mailed on Dec. 9, 2021, issued in connection with European Application No. 17200837.7, 10 pages.
Fadilpasic,"Cortana can now be the default PDA on your Android", IT Pro Portal: Accessed via WayBack Machine; http://web.archive.org/web/20171129124915/https://www.itproportal.com/2015/08/11/cortana-can-now-be-. . . , Aug. 11, 2015, 6 pages.
Final Office Action mailed Jul. 23, 2021, issued in connection with U.S. Appl. No. 16/439,046, filed Jun. 12, 2019, 12 pages.
Final Office Action mailed on Oct. 6, 2017, issued in connection with U.S. Appl. No. 15/098,760, filed Apr. 14, 2016, 25 pages.
Final Office Action mailed on Jun. 1, 2022, issued in connection with U.S. Appl. No. 16/806,747, filed Mar. 2, 2020, 20 pages.
Final Office Action mailed on Feb. 10, 2021, issued in connection with U.S. Appl. No. 16/219,702, filed Dec. 13, 2018, 9 pages.
Final Office Action mailed on Feb. 10, 2021, issued in connection with U.S. Appl. No. 16/402,617, filed May 3, 2019, 13 pages.
Final Office Action mailed on Nov. 10, 2020, issued in connection with U.S. Appl. No. 16/600,644, filed Oct. 14, 2019, 19 pages.
Final Office Action mailed on Apr. 11, 2019, issued in connection with U.S. Appl. No. 15/131,254, filed Apr. 18, 2016, 17 pages.
Final Office Action mailed on Aug. 11, 2017, issued in connection with U.S. Appl. No. 15/131,776, filed Apr. 18, 2016, 7 pages.
Final Office Action mailed on Dec. 11, 2019, issued in connection with U.S. Appl. No. 16/227,308, filed Dec. 20, 2018, 10 pages.
Final Office Action mailed on Sep. 11, 2019, issued in connection with U.S. Appl. No. 16/178,122, filed Nov. 1, 2018, 13 pages.
Final Office Action mailed on Apr. 13, 2018, issued in connection with U.S. Appl. No. 15/131,254, filed Apr. 18, 2016, 18 pages.
Final Office Action mailed on Apr. 13, 2018, issued in connection with U.S. Appl. No. 15/438,744, filed Feb. 21, 2017, 20 pages.
Final Office Action mailed on May 13, 2020, issued in connection with U.S. Appl. No. 16/153,530, filed Oct. 5, 2018, 20 pages.
Final Office Action mailed on Jul. 15, 2021, issued in connection with U.S. Appl. No. 16/153,530, filed Oct. 5, 2018, 22 pages.
Final Office Action mailed on Jun. 15, 2017, issued in connection with U.S. Appl. No. 15/098,718, filed Apr. 14, 2016, 15 pages.
Final Office Action mailed on Jun. 15, 2021, issued in connection with U.S. Appl. No. 16/819,755, filed Mar. 16, 2020, 12 pages.
Final Office Action mailed on Oct. 15, 2018, issued in connection with U.S. Appl. No. 15/804,776, filed Nov. 6, 2017, 18 pages.
Final Office Action mailed on Oct. 15, 2020, issued in connection with U.S. Appl. No. 16/109,375, filed Aug. 22, 2018, 9 pages.
Final Office Action mailed on Oct. 16, 2018, issued in connection with U.S. Appl. No. 15/438,725, filed Feb. 21, 2017, 10 pages.
Final Office Action mailed on Aug. 17, 2022, issued in connection with U.S. Appl. No. 16/179,779, filed Nov. 2, 2018, 26 pages.
Final Office Action mailed on Dec. 17, 2021, issued in connection with U.S. Appl. No. 16/813,643, filed Mar. 9, 2020, 12 pages.
Final Office Action mailed on May 17, 2023, issued in connection with U.S. Appl. No. 16/168,389, filed Oct. 23, 2018, 44 pages.
Final Office Action mailed on May 18, 2020, issued in connection with U.S. Appl. No. 16/177,185, filed Oct. 31, 2018, 16 pages.
Final Office Action mailed on Feb. 21, 2018, issued in connection with U.S. Appl. No. 15/297,627, filed Oct. 19, 2016, 12 pages.
Final Office Action mailed on Mar. 21, 2022, issued in connection with U.S. Appl. No. 16/153,530, filed Oct. 5, 2018, 23 pages.

(56) References Cited

OTHER PUBLICATIONS

Final Office Action mailed on May 21, 2020, issued in connection with U.S. Appl. No. 15/989,715, filed May 25, 2018, 21 pages.
Notice of Allowance mailed on Jan. 9, 2023, issued in connection with U.S. Appl. No. 17/247,507, filed Dec. 14, 2020, 8 pages.
Notice of Allowance mailed on Jul. 9, 2018, issued in connection with U.S. Appl. No. 15/438,741, filed Feb. 21, 2017, 5 pages.
Notice of Allowance mailed on Jun. 9, 2023, issued in connection with U.S. Appl. No. 17/532,674, filed Nov. 22, 2021, 13 pages.
Notice of Allowance mailed on Mar. 9, 2023, issued in connection with U.S. Appl. No. 17/662,302, filed May 6, 2022, 7 pages.
Notice of Allowance mailed on Nov. 9, 2022, issued in connection with U.S. Appl. No. 17/385,542, filed Jul. 26, 2021, 8 pages.
Notice of Allowance mailed on Apr. 1, 2019, issued in connection with U.S. Appl. No. 15/935,966, filed Mar. 26, 2018, 5 pages.
Notice of Allowance mailed on Aug. 1, 2018, issued in connection with U.S. Appl. No. 15/297,627, filed Oct. 19, 2016, 9 pages.
Notice of Allowance mailed on Feb. 1, 2022, issued in connection with U.S. Appl. No. 16/439,046, filed Jun. 12, 2019, 9 pages.
Notice of Allowance mailed on Jun. 1, 2021, issued in connection with U.S. Appl. No. 16/219,702, filed Dec. 13, 2018, 8 pages.
Notice of Allowance mailed on Jun. 1, 2021, issued in connection with U.S. Appl. No. 16/685,135, filed Nov. 15, 2019, 10 pages.
Notice of Allowance mailed on Mar. 1, 2022, issued in connection with U.S. Appl. No. 16/879,549, filed May 20, 2020, 9 pages.
Notice of Allowance mailed on Sep. 1, 2021, issued in connection with U.S. Appl. No. 15/936,177, filed Mar. 26, 2018, 22 pages.
Notice of Allowance mailed on Aug. 10, 2020, issued in connection with U.S. Appl. No. 16/424,825, filed May 29, 2019, 9 pages.
Notice of Allowance mailed on Feb. 10, 2021, issued in connection with U.S. Appl. No. 16/138,111, filed Sep. 21, 2018, 8 pages.
Notice of Allowance mailed on Jul. 10, 2023, issued in connection with U.S. Appl. No. 17/315,599, filed May 10, 2021, 2 pages.
Notice of Allowance mailed on Jun. 10, 2022, issued in connection with U.S. Appl. No. 16/879,549, filed May 20, 2020, 8 pages.
Notice of Allowance mailed on Apr. 11, 2018, issued in connection with U.S. Appl. No. 15/719,454, filed Sep. 28, 2017, 15 pages.
Notice of Allowance mailed on May 11, 2022, issued in connection with U.S. Appl. No. 17/135,123, filed Dec. 28, 2020, 8 pages.
Notice of Allowance mailed on May 11, 2022, issued in connection with U.S. Appl. No. 17/145,667, filed Jan. 11, 2021, 7 pages.
Notice of Allowance mailed on May 11, 2023, issued in connection with U.S. Appl. No. 18/061,638, filed Dec. 5, 2022, 15 pages.
Notice of Allowance mailed on Oct. 11, 2019, issued in connection with U.S. Appl. No. 16/437,476, filed Jun. 11, 2019, 9 pages.
Notice of Allowance mailed on Sep. 11, 2019, issued in connection with U.S. Appl. No. 16/154,071, filed Oct. 8, 2018, 5 pages.
Notice of Allowance mailed on Aug. 12, 2021, issued in connection with U.S. Appl. No. 16/819,755, filed Mar. 16, 2020, 6 pages.
Notice of Allowance mailed on Dec. 12, 2018, issued in connection with U.S. Appl. No. 15/811,468, filed Nov. 13, 2017, 9 pages.
Notice of Allowance mailed on Jul. 12, 2017, issued in connection with U.S. Appl. No. 15/098,805, filed Apr. 14, 2016, 8 pages.
Notice of Allowance mailed on Jul. 12, 2022, issued in connection with U.S. Appl. No. 16/907,953, filed Jun. 22, 2020, 8 pages.
Notice of Allowance mailed on Jul. 12, 2022, issued in connection with U.S. Appl. No. 17/391,404, filed Aug. 2, 2021, 13 pages.
Notice of Allowance mailed on Jul. 12, 2023, issued in connection with U.S. Appl. No. 18/151,619, filed Jan. 9, 2023, 13 pages.
Notice of Allowance mailed on Jun. 12, 2019, issued in connection with U.S. Appl. No. 15/670,361, filed Aug. 7, 2017, 7 pages.
Notice of Allowance mailed on Jun. 12, 2023, issued in connection with U.S. Appl. No. 17/453,632, filed Nov. 4, 2021, 9 pages.
Notice of Allowance mailed on May 12, 2021, issued in connection with U.S. Appl. No. 16/402,617, filed May 3, 2019, 8 pages.
Notice of Allowance mailed on Sep. 12, 2018, issued in connection with U.S. Appl. No. 15/438,744, filed Feb. 21, 2017, 15 pages.
Notice of Allowance mailed on Apr. 13, 2022, issued in connection with U.S. Appl. No. 17/236,559, filed Apr. 21, 2021, 7 pages.
Notice of Allowance mailed on Dec. 13, 2017, issued in connection with U.S. Appl. No. 15/784,952, filed Oct. 16, 2017, 9 pages.
Notice of Allowance mailed on Dec. 13, 2021, issued in connection with U.S. Appl. No. 16/879,553, filed May 20, 2020, 15 pages.
Notice of Allowance mailed on Feb. 13, 2019, issued in connection with U.S. Appl. No. 15/959,907, filed Apr. 23, 2018, 10 pages.
Notice of Allowance mailed on Feb. 13, 2023, issued in connection with U.S. Appl. No. 18/045,360, filed Oct. 10, 2022, 9 pages.
Notice of Allowance mailed on Jan. 13, 2020, issued in connection with U.S. Appl. No. 16/192,126, filed Nov. 15, 2018, 6 pages.
Notice of Allowance mailed on Jan. 13, 2021, issued in connection with U.S. Appl. No. 16/539,843, filed Aug. 13, 2019, 5 pages.
Notice of Allowance mailed on Jul. 13, 2023, issued in connection with U.S. Appl. No. 18/145,501, filed Dec. 22, 2022, 9 pages.
Notice of Allowance mailed on Jun. 13, 2023, issued in connection with U.S. Appl. No. 17/249,776, filed Mar. 12, 2021, 10 pages.
Notice of Allowance mailed on Nov. 13, 2020, issued in connection with U.S. Appl. No. 16/131,409, filed Sep. 14, 2018, 11 pages.
Notice of Allowance mailed on Aug. 14, 2017, issued in connection with U.S. Appl. No. 15/098,867, filed Apr. 14, 2016, 10 pages.
Notice of Allowance mailed on Aug. 14, 2020, issued in connection with U.S. Appl. No. 16/598,125, filed Oct. 10, 2019, 5 pages.
Notice of Allowance mailed on Feb. 14, 2017, issued in connection with U.S. Appl. No. 15/229,855, filed Aug. 5, 2016, 11 pages.
Notice of Allowance mailed on Jan. 14, 2021, issued in connection with U.S. Appl. No. 17/087,423, filed Nov. 2, 2020, 8 pages.
Notice of Allowance mailed on Jan. 14, 2022, issued in connection with U.S. Appl. No. 16/966,397, filed Jul. 30, 2020, 5 pages.
Notice of Allowance mailed on Jun. 14, 2017, issued in connection with U.S. Appl. No. 15/282,554, filed Sep. 30, 2016, 11 pages.
Notice of Allowance mailed on Nov. 14, 2018, issued in connection with U.S. Appl. No. 15/297,627, filed Oct. 19, 2016, 5 pages.
Ullrich et al. "Soft Weight-Sharing for Neural Network Compression." ICLR 2017, 16 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Vacher at al. "Recognition of voice commands by multisource ASR and noise cancellation in a smart home environment" Signal Processing Conference 2012 Proceedings of the 20th European, IEEE, Aug. 27, 2012, 5 pages.
Vacher et al. "Speech Recognition in a Smart Home: Some Experiments for Telemonitoring," 2009 Proceedings of the 5th Conference on Speech Technology and Human-Computer Dialogoue, Constant, 2009, 10 pages.
"S Voice or Google Now?"; https://web.archive.org/web/20160807040123/lowdown.carphonewarehouse.com/news/s-voice-or-google-now/ . . . , Apr. 28, 2015; 4 pages.
Wen et al. A Network-based End-to-End Trainable Task-oriented Dialogue System, CORR (ARXIV), Apr. 15, 2016, 11 pages.
Wikipedia. "The Wayback Machine", Speech recognition software for Linux, Sep. 22, 2016, 4 pages. [retrieved on Mar. 28, 2022], Retrieved from the Internet: URL: https://web.archive.org/web/20160922151304/https://en.wikipedia.org/wiki/Speech_recognition_software_for_Linux.
Wolf et al. On the potential of channel selection for recognition of reverberated speech with multiple microphones. Interspeech, TALP Research Center, Jan. 2010, 5 pages.
Wölfel et al. Multi-source far-distance microphone selection and combination for automatic transcription of lectures, Interspeech 2006—ICSLP, Jan. 2006, 5 pages.
Wu et al. End-to-End Recurrent Entity Network for Entity-Value Independent Goal-Oriented Dialog Learning. DSTC6—Dialog System Technology Challenges, Dec. 10, 2017, 5 pages.
Wung et al. "Robust Acoustic Echo Cancellation in the Short-Time Fourier Transform Domain Using Adaptive Crossband Filters" IEEE International Conference on Acoustic, Speech and Signal Processing ICASSP, 2014, p. 1300-1304.

(56) References Cited

OTHER PUBLICATIONS

Xiao et al. "A Learning-Based Approach to Direction of Arrival Estimation in Noisy and Reverberant Environments," 2015 IEEE International Conference on Acoustics, Speech and Signal Processing, Apr. 19, 2015, 5 pages.
Xiaoguang et al. "Robust Small-Footprint Keyword Spotting Using Sequence-To-Sequence Model with Connectionist Temporal Classifier", 2019 IEEE, Sep. 28, 2019, 5 pages.
Xu et al. An End-to-end Approach for Handling Unknown Slot Values in Dialogue State Tracking. ARXIV.org, Cornell University Library, May 3, 2018, 10 pages.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
Zaykovskiy, Dmitry. Survey of the Speech Recognition Techniques for Mobile Devices. Proceedings of Specom 2006, Jun. 25, 2006, 6 pages.
Zhang et al. Noise Robust Speech Recognition Using Multi-Channel Based Channel Selection And Channel Weighting. The Institute of Electronics, Information and Communication Engineers, arXiv:1604.03276v1 [cs.SD] Jan. 1, 2010, 8 pages.
Advisory Action mailed on Nov. 7, 2022, issued in connection with U.S. Appl. No. 16/168,389, filed Oct. 23, 2018, 4 pages.
Advisory Action mailed on Jun. 10, 2020, issued in connection with U.S. Appl. No. 15/936,177, filed Mar. 26, 2018, 4 pages.
Advisory Action mailed on Aug. 13, 2021, issued in connection with U.S. Appl. No. 16/271,550, filed Feb. 8, 2019, 4 pages.
Advisory Action mailed on Apr. 23, 2021, issued in connection with U.S. Appl. No. 16/219,702, filed Dec. 13, 2018, 3 pages.
Advisory Action mailed on Apr. 24, 2020, issued in connection with U.S. Appl. No. 15/948,541, filed Apr. 9, 2018, 4 pages.
Advisory Action mailed on Feb. 28, 2022, issued in connection with U.S. Appl. No. 16/813,643, filed Mar. 9, 2020, 3 pages.
Advisory Action mailed on Jun. 28, 2018, issued in connection with U.S. Appl. No. 15/438,744, filed Feb. 21, 2017, 3 pages.
Advisory Action mailed on Dec. 31, 2018, issued in connection with U.S. Appl. No. 15/804,776, filed Nov. 6, 2017, 4 pages.
Advisory Action mailed on Sep. 8, 2021, issued in connection with U.S. Appl. No. 16/168,389, filed Oct. 23, 2018, 4 pages.
Advisory Action mailed on Jun. 9, 2020, issued in connection with U.S. Appl. No. 16/145,275, filed Sep. 28, 2018, 3 pages.
Andra et al. Contextual Keyword Spotting in Lecture Video With Deep Convolutional Neural Network. 2017 International Conference on Advanced Computer Science and Information Systems, IEEE, Oct. 28, 2017, 6 pages.
Anonymous,. S Voice or Google Now—The Lowdown. Apr. 28, 2015, 9 pages. [online], [retrieved on Nov. 29, 2017]. Retrieved from the Internet (URL: http://web.archive.org/web/20160807040123/http://lowdown.carphonewarehouse.com/news/s-voice-or-google-now/29958/).
Anonymous: "What are the function of 4 Microphones on iPhone 6S/6S+?", ETrade Supply, Dec. 24, 2015, XP055646381, Retrieved from the Internet: URL:https://www.etradesupply.com/blog/4-microphones-iphone-6s6s-for/ [retrieved on Nov. 26, 2019].
Audhkhasi Kartik et al. End-to-end ASR-free keyword search from speech. 2017 IEEE International Conference on Acoustics, Speech and Signal Processing, Mar. 5, 2017, 7 pages.
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Patent Office, Australian Examination Report Action mailed on Nov. 10, 2022, issued in connection with Australian Application No. 2018312989, 2 pages.
Australian Patent Office, Australian Examination Report Action mailed on Jul. 11, 2023, issued in connection with Australian Application No. 2022246446, 2 pages.
Australian Patent Office, Australian Examination Report Action mailed on Apr. 14, 2020, issued in connection with Australian Application No. 2019202257, 3 pages.
Australian Patent Office, Australian Examination Report Action mailed on Jun. 14, 2023, issued in connection with Australian Application No. 2019299865, 2 pages.
Australian Patent Office, Australian Examination Report Action mailed on May 19, 2022, issued in connection with Australian Application No. 2021212112, 2 pages.
Australian Patent Office, Australian Examination Report Action mailed on Sep. 28, 2022, issued in connection with Australian Application No. 2018338812, 3 pages.
Australian Patent Office, Australian Examination Report Action mailed on Oct. 3, 2019, issued in connection with Australian Application No. 2018230932, 3 pages.
Australian Patent Office, Australian Examination Report Action mailed on Mar. 4, 2022, issued in connection with Australian Application No. 2021202786, 2 pages.
Australian Patent Office, Australian Examination Report Action mailed on Apr. 7, 2021, issued in connection with Australian Application No. 2019333058, 2 pages.
Australian Patent Office, Australian Examination Report Action mailed on Aug. 7, 2020, issued in connection with Australian Application No. 2019236722, 4 pages.
Australian Patent Office, Examination Report mailed on Jun. 28, 2021, issued in connection with Australian Patent Application No. 2019395022, 2 pages.
Australian Patent Office, Examination Report mailed on Oct. 30, 2018, issued in connection with Australian Application No. 2017222436, 3 pages.
"Automatic Parameter Tying in Neural Networks" ICLR 2018, 14 pages.
Bertrand et al. "Adaptive Distributed Noise Reduction for Speech Enhancement in Wireless Acoustic Sensor Networks" Jan. 2010, 4 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Examination Report mailed on Dec. 1, 2021, issued in connection with Canadian Application No. 3096442, 4 pages.
Canadian Patent Office, Canadian Examination Report mailed on Sep. 14, 2022, issued in connection with Canadian Application No. 3067776, 4 pages.
Canadian Patent Office, Canadian Examination Report mailed on Oct. 19, 2022, issued in connection with Canadian Application No. 3123601, 5 pages.
Canadian Patent Office, Canadian Examination Report mailed on Nov. 2, 2021, issued in connection with Canadian Application No. 3067776, 4 pages.
Canadian Patent Office, Canadian Examination Report mailed on Oct. 26, 2021, issued in connection with Canadian Application No. 3072492, 3 pages.
Canadian Patent Office, Canadian Examination Report mailed on Mar. 29, 2022, issued in connection with Canadian Application No. 3111322, 3 pages.
Canadian Patent Office, Canadian Examination Report mailed on Jun. 7, 2022, issued in connection with Canadian Application No. 3105494, 5 pages.
Canadian Patent Office, Canadian Examination Report mailed on Mar. 9, 2021, issued in connection with Canadian Application No. 3067776, 5 pages.
Canadian Patent Office, Canadian Office Action mailed on Nov. 14, 2018, issued in connection with Canadian Application No. 3015491, 3 pages.
Chinese Patent Office, Chinese Office Action and Translation mailed on Jul. 2, 2021, issued in connection with Chinese Application No. 201880077216.4, 22 pages.
Chinese Patent Office, Chinese Office Action and Translation mailed on Mar. 30, 2021, issued in connection with Chinese Application No. 202010302650.7, 15 pages.

(56) References Cited

OTHER PUBLICATIONS

Chinese Patent Office, First Office Action and Translation mailed on Jun. 1, 2021, issued in connection with Chinese Application No. 201980089721.5, 21 pages.
Chinese Patent Office, First Office Action and Translation mailed on Feb. 9, 2023, issued in connection with Chinese Application No. 201880076788.0, 13 pages.
Chinese Patent Office, First Office Action and Translation mailed on Oct. 9, 2022, issued in connection with Chinese Application No. 201780056695.7, 10 pages.
Chinese Patent Office, First Office Action and Translation mailed on Dec. 1, 2021, issued in connection with Chinese Application No. 201780077204.7, 11 pages.
Chinese Patent Office, First Office Action and Translation mailed on Nov. 10, 2022, issued in connection with Chinese Application No. 201980070006.7, 15 pages.
Chinese Patent Office, First Office Action and Translation mailed on Jan. 19, 2023, issued in connection with Chinese Application No. 201880064916.X, 10 pages.
Notice of Allowance mailed on May 31, 2019, issued in connection with U.S. Appl. No. 15/717,621, filed Sep. 27, 2017, 9 pages.
Notice of Allowance mailed on Aug. 4, 2023, issued in connection with U.S. Appl. No. 18/145,520, filed Dec. 22, 2022, 10 pages.
Notice of Allowance mailed on Jun. 4, 2021, issued in connection with U.S. Appl. No. 16/528,265, filed Jul. 31, 2019, 17 pages.
Notice of Allowance mailed on Mar. 4, 2020, issued in connection with U.S. Appl. No. 16/444,975, filed Jun. 18, 2019, 10 pages.
Notice of Allowance mailed on Apr. 5, 2023, issued in connection with U.S. Appl. No. 17/549,253, filed Dec. 13, 2021, 10 pages.
Notice of Allowance mailed on Feb. 5, 2020, issued in connection with U.S. Appl. No. 16/178,122, filed Nov. 1, 2018, 9 pages.
Notice of Allowance mailed on Oct. 5, 2018, issued in connection with U.S. Appl. No. 15/211,748, filed Jul. 15, 2018, 10 pages.
Notice of Allowance mailed on Feb. 6, 2019, issued in connection with U.S. Appl. No. 16/102,153, filed Aug. 13, 2018, 9 pages.
Notice of Allowance mailed on Feb. 6, 2020, issued in connection with U.S. Appl. No. 16/227,308, filed Dec. 20, 2018, 7 pages.
Notice of Allowance mailed on Mar. 6, 2023, issued in connection with U.S. Appl. No. 17/449,926, filed Oct. 4, 2021, 8 pages.
Notice of Allowance mailed on Apr. 7, 2020, issued in connection with U.S. Appl. No. 15/098,760, filed Apr. 14, 2016, 7 pages.
Notice of Allowance mailed on Apr. 7, 2020, issued in connection with U.S. Appl. No. 16/147,710, filed Sep. 29, 2018, 15 pages.
Notice of Allowance mailed on Jun. 7, 2019, issued in connection with U.S. Appl. No. 16/102,153, filed Aug. 13, 2018, 9 pages.
Notice of Allowance mailed on Jun. 7, 2021, issued in connection with U.S. Appl. No. 16/528,224, filed Jul. 31, 2019, 9 pages.
Notice of Allowance mailed on Apr. 8, 2022, issued in connection with U.S. Appl. No. 16/813,643, filed Mar. 9, 2020, 7 pages.
Notice of Allowance mailed on Nov. 8, 2021, issued in connection with U.S. Appl. No. 17/008,104, filed Aug. 31, 2020, 9 pages.
Notice of Allowance mailed on Aug. 9, 2018, issued in connection with U.S. Appl. No. 15/229,868, filed Aug. 5, 2016, 11 pages.
Notice of Allowance mailed on Dec. 9, 2021, issued in connection with U.S. Appl. No. 16/845,946, filed Apr. 10, 2020, 10 pages.
Notice of Allowance mailed on Feb. 9, 2022, issued in connection with U.S. Appl. No. 17/247,736, filed Dec. 21, 2020, 8 pages.
Notice of Allowance mailed on Mar. 9, 2018, issued in connection with U.S. Appl. No. 15/584,782, filed May 2, 2017, 8 pages.
Oord et al. WaveNet: A Generative Model for Raw Audio. Arxiv. org, Cornell University Library, Sep. 12, 2016, 15 pages.
Optimizing Siri on HomePod in Far-Field Settings. Audio Software Engineering and Siri Speech Team, Machine Learning Journal vol. 1, Issue 12. https://machinelearning.apple.com/2018/12/03/optimizing-siri-on-homepod-in-far-field-settings.html. Dec. 2018, 18 pages.
Palm, Inc., "Handbook for the Palm VII Handheld," May 2000, 311 pages.
Parada et al. Contextual Information Improves OOV Detection in Speech. Proceedings of the 2010 Annual Conference of the North American Chapter of the Association for Computational Linguistics, Jun. 2, 2010, 9 pages.
Pre-Appeal Brief Decision mailed on Jan. 18, 2022, issued in connection with U.S. Appl. No. 16/806,747, filed Mar. 2, 2020, 2 pages.
Pre-Appeal Brief Decision mailed on Jun. 2, 2021, issued in connection with U.S. Appl. No. 16/213,570, filed Dec. 7, 2018, 2 pages.
Preinterview First Office Action mailed on Aug. 5, 2019, issued in connection with U.S. Appl. No. 16/434,426, filed Jun. 7, 2019, 4 pages.
Preinterview First Office Action mailed on Mar. 25, 2020, issued in connection with U.S. Appl. No. 16/109,375, filed Aug. 22, 2018, 6 pages.
Preinterview First Office Action mailed on Sep. 30, 2019, issued in connection with U.S. Appl. No. 15/989,715, filed May 25, 2018, 4 pages.
Preinterview First Office Action mailed on May 7, 2020, issued in connection with U.S. Appl. No. 16/213,570, filed Dec. 7, 2018, 5 pages.
Preinterview First Office Action mailed on Jan. 8, 2021, issued in connection with U.S. Appl. No. 16/798,967, filed Feb. 24, 2020, 4 pages.
Presentations at WinHEC 2000, May 2000, 138 pages.
Renato De Mori. Spoken Language Understanding: A Survey. Automatic Speech Recognition Understanding, 2007. IEEE, Dec. 1, 2007, 56 pages.
Restriction Requirement mailed on Aug. 14, 2019, issued in connection with U.S. Appl. No. 16/214,711, filed Dec. 10, 2018, 5 pages.
Restriction Requirement mailed on Aug. 9, 2018, issued in connection with U.S. Appl. No. 15/717,621, filed Sep. 27, 2017, 8 pages.
Rottondi et al., "An Overview on Networked Music Performance Technologies," IEEE Access, vol. 4, pp. 8823-8843, 2016, DOI: 10.1109/ACCESS.2016.2628440, 21 pages.
Rybakov et al. Streaming keyword spotting on mobile devices, arXiv:2005.06720v2, Jul. 29, 2020, 5 pages.
Shan et al. Attention-based End-to-End Models for Small-Footprint Keyword Spotting, arXiv:1803.10916v1, Mar. 29, 2018, 5 pages.
Simon Doclo et al. Combined Acoustic Echo and Noise Reduction Using GSVD-Based Optimal Filtering. In 2000 IEEE International Conference on Acoustics, Speech, and Signal Processing. Proceedings (Cat. No. 00CH37100), Aug. 6, 2002, 4 pages. [retrieved on Feb. 23, 2023], Retrieved from the Internet: URL: https://scholar.google.com/scholar?hl=en&as_sdt=0%2C14&q=COMBINED+ACOUSTIC+ECHO+AND+NOISE+REDUCTION+USING+GSVD-BASED+OPTIMAL+FILTERING&btnG=.
Snips: How to Snips—Assistant creation Installation, Jun. 26, 2017, 6 pages.
Souden et al. "An Integrated Solution for Online Multichannel Noise Tracking and Reduction." IEEE Transactions on Audio, Speech, and Language Processing, vol. 19. No. 7, Sep. 7, 2011, 11 pages.
Souden et al. "Gaussian Model-Based Multichannel Speech Presence Probability" IEEE Transactions on Audio, Speech, and Language Processing, vol. 18, No. 5, Jul. 5, 2010, 6pages.
Souden et al. "On Optimal Frequency-Domain Multichannel Linear Filtering for Noise Reduction." IEEE Transactions on Audio, Speech, and Language Processing, vol. 18, No. 2, Feb. 2010, 17pages.
Speidel, Hans. Chatbot Training: How to use training data to provide fully automated customer support. Retrieved from the Internet: URL: https://www.crowdguru.de/wp-content/uploads/Case-Study-Chatbox-training-How-to-use-training-data-to-provide-fully-automated-customer-support.pdf. Jun. 29, 2017, 4 pages.
Stemmer et al. Speech Recognition and Understanding on Hardware-Accelerated DSP. Proceedings of Interspeech 2017: Show & Tell Contribution, Aug. 20, 2017, 2 pages.
Steven J. Nowlan and Geoffrey E. Hinton "Simplifying Neural Networks by Soft Weight-Sharing" Neural Computation 4, 1992, 21 pages.

(56) References Cited

OTHER PUBLICATIONS

Tsiami et al. "Experiments in acoustic source localization using sparse arrays in adverse indoors environments", 2014 22nd European Signal Processing Conference, Sep. 1, 2014, 5 pages.
Tsung-Hsien Wen et al: "A Network-based End-to-End Trainable Task-oriented Dialogue System", CORR (ARXIV), vol. 1604. 04562v1, Apr. 15, 2016 (Apr. 15, 2016), pp. 1-11.
Tsung-Hsien Wen et al: "A Network-based End-to-End Trainable Task-oriented Dialogue System", CORR ARXIV, vol. 1604. 04562v1, Apr. 15, 2016, pp. 1-11, XP055396370, Stroudsburg, PA, USA.
Tweet: "How to start using Google app voice commands to make your life easier Share This Story shop @Bullet", Jan. 21, 2016, https://bgr.com/2016/01/21/best-ok-google-voice-commands/, 3 page.
Non-Final Office Action mailed on Oct. 11, 2019, issued in connection with U.S. Appl. No. 16/177,185, filed Oct. 31, 2018, 14 pages.
Non-Final Office Action mailed on Sep. 11, 2020, issued in connection with U.S. Appl. No. 15/989,715, filed May 25, 2018, 8 pages.
Non-Final Office Action mailed on Sep. 11, 2020, issued in connection with U.S. Appl. No. 16/219,702, filed Dec. 13, 2018, 9 pages.
Non-Final Office Action mailed on Apr. 12, 2021, issued in connection with U.S. Appl. No. 16/528,224, filed Jul. 31, 2019, 9 pages.
Non-Final Office Action mailed on Apr. 12, 2023, issued in connection with U.S. Appl. No. 17/878,649, filed Aug. 1, 2022, 16 pages.
Non-Final Office Action mailed on Dec. 12, 2016, issued in connection with U.S. Appl. No. 15/098,718, filed Apr. 14, 2016, 11 pages.
Non-Final Office Action mailed on Feb. 12, 2019, issued in connection with U.S. Appl. No. 15/670,361, filed Aug. 7, 2017, 13 pages.
Non-Final Office Action mailed on Jan. 13, 2017, issued in connection with U.S. Appl. No. 15/098,805, filed Apr. 14, 2016, 11 pages.
Non-Final Office Action mailed on Nov. 13, 2018, issued in connection with U.S. Appl. No. 15/717,621, filed Sep. 27, 2017, 23 pages.
Non-Final Office Action mailed on Nov. 13, 2018, issued in connection with U.S. Appl. No. 16/160,107, filed Oct. 15, 2018, 8 pages.
Non-Final Office Action mailed on Nov. 13, 2019, issued in connection with U.S. Appl. No. 15/984,073, filed May 18, 2018, 18 pages.
Non-Final Office Action mailed on Oct. 13, 2021, issued in connection with U.S. Appl. No. 16/679,538, filed Nov. 11, 2019, 8 pages.
Non-Final Office Action mailed on May 14, 2020, issued in connection with U.S. Appl. No. 15/948,541, filed Apr. 9, 2018, 8 pages.
Non-Final Office Action mailed on Nov. 14, 2022, issued in connection with U.S. Appl. No. 17/077,974, filed Oct. 22, 2020, 6 pages.
Non-Final Office Action mailed on Sep. 14, 2017, issued in connection with U.S. Appl. No. 15/178,180, filed Jun. 9, 2016, 16 pages.
Non-Final Office Action mailed on Sep. 14, 2018, issued in connection with U.S. Appl. No. 15/959,907, filed Apr. 23, 2018, 15 pages.
Non-Final Office Action mailed on Sep. 14, 2022, issued in connection with U.S. Appl. No. 17/446,690, filed Sep. 1, 2021, 10 pages.
Non-Final Office Action mailed on Apr. 15, 2020, issued in connection with U.S. Appl. No. 16/138,111, filed Sep. 21, 2018, 15 pages.
Non-Final Office Action mailed on Aug. 15, 2022, issued in connection with U.S. Appl. No. 17/448,015, filed Sep. 17, 2021, 12 pages.
Non-Final Office Action mailed on Dec. 15, 2020, issued in connection with U.S. Appl. No. 17/087,423, filed Nov. 2, 2020, 7 pages.
Non-Final Office Action mailed on Dec. 15, 2022, issued in connection with U.S. Appl. No. 17/549,253, filed Dec. 13, 2021, 10 pages.
Non-Final Office Action mailed on Feb. 15, 2023, issued in connection with U.S. Appl. No. 17/453,632, filed Nov. 4, 2021, 12 pages.
Non-Final Office Action mailed on Jan. 15, 2019, issued in connection with U.S. Appl. No. 16/173,797, filed Oct. 29, 2018, 6 pages.
Non-Final Office Action mailed on Nov. 15, 2019, issued in connection with U.S. Appl. No. 16/153,530, filed Oct. 5, 2018, 17 pages.
Non-Final Office Action mailed on Sep. 15, 2022, issued in connection with U.S. Appl. No. 17/247,507, filed Dec. 14, 2020, 9 pages.
Non-Final Office Action mailed on Sep. 15, 2022, issued in connection with U.S. Appl. No. 17/327,911, filed May 24, 2021, 44 pages.
Non-Final Office Action mailed on Feb. 16, 2023, issued in connection with U.S. Appl. No. 17/305,920, filed Jul. 16, 2021, 12 pages.
Non-Final Office Action mailed on Mar. 16, 2018, issued in connection with U.S. Appl. No. 15/681,937, filed Aug. 21, 2017, 5 pages.
Non-Final Office Action mailed on Oct. 16, 2018, issued in connection with U.S. Appl. No. 15/131,254, filed Apr. 18, 2016, 16 pages.
Non-Final Office Action mailed on Sep. 16, 2021, issued in connection with U.S. Appl. No. 16/879,553, filed May 20, 2020, 24 pages.
Non-Final Office Action mailed on Aug. 17, 2021, issued in connection with U.S. Appl. No. 17/236,559, filed Apr. 21, 2021, 10 pages.
Non-Final Office Action mailed on Sep. 17, 2020, issued in connection with U.S. Appl. No. 16/600,949, filed Oct. 14, 2019, 29 pages.
Non-Final Office Action mailed on Apr. 18, 2018, issued in connection with U.S. Appl. No. 15/811,468, filed Nov. 13, 2017, 14 pages.
Non-Final Office Action mailed on Aug. 18, 2021, issued in connection with U.S. Appl. No. 16/845,946, filed Apr. 10, 2020, 14 pages.
Non-Final Office Action mailed on Jan. 18, 2019, issued in connection with U.S. Appl. No. 15/721,141, filed Sep. 29, 2017, 18 pages.
Non-Final Office Action mailed on Jul. 18, 2023, issued in connection with U.S. Appl. No. 18/066,093, filed Dec. 14, 2022, 12 pages.
Non-Final Office Action mailed on Oct. 18, 2019, issued in connection with U.S. Appl. No. 15/098,760, filed Apr. 14, 2016, 27 pages.
Non-Final Office Action mailed on Oct. 18, 2022, issued in connection with U.S. Appl. No. 16/949,973, filed Nov. 23, 2020, 31 pages.
Non-Final Office Action mailed on Sep. 18, 2019, issued in connection with U.S. Appl. No. 16/179,779, filed Nov. 2, 2018, 14 pages.
Non-Final Office Action mailed on Apr. 19, 2017, issued in connection with U.S. Appl. No. 15/131,776, filed Apr. 18, 2016, 12 pages.
Non-Final Office Action mailed on Dec. 19, 2019, issued in connection with U.S. Appl. No. 16/147,710, filed Sep. 29, 2018, 10 pages.
Non-Final Office Action mailed on Feb. 19, 2020, issued in connection with U.S. Appl. No. 16/148,879, filed Oct. 1, 2018, 15 pages.
Non-Final Office Action mailed on Sep. 19, 2022, issued in connection with U.S. Appl. No. 17/385,542, filed Jul. 26, 2021, 9 pages.
Non-Final Office Action mailed on Sep. 2, 2020, issued in connection with U.S. Appl. No. 16/290,599, filed Mar. 1, 2019, 17 pages.
Non-Final Office Action mailed on Sep. 2, 2021, issued in connection with U.S. Appl. No. 16/947,895, filed Aug. 24, 2020, 16 pages.

(56) References Cited

OTHER PUBLICATIONS

Non-Final Office Action mailed on Apr. 20, 2023, issued in connection with U.S. Appl. No. 18/061,570, filed Dec. 5, 2022, 12 pages.
Non-Final Office Action mailed on Feb. 20, 2018, issued in connection with U.S. Appl. No. 15/211,748, filed Jul. 15, 2016, 31 pages.
Non-Final Office Action mailed on Jun. 20, 2019, issued in connection with U.S. Appl. No. 15/946,585, filed Apr. 5, 2018, 10 pages.
Non-Final Office Action mailed on Oct. 20, 2022, issued in connection with U.S. Appl. No. 17/532,674, filed Nov. 22, 2021, 52 pages.
Non-Final Office Action mailed on Apr. 21, 2021, issued in connection with U.S. Appl. No. 16/109,375, filed Aug. 22, 2018, 9 pages.
Notice of Allowance mailed on Mar. 21, 2023, issued in connection with U.S. Appl. No. 17/353,254, filed Jun. 21, 2021, 8 pages.
Notice of Allowance mailed on Nov. 21, 2022, issued in connection with U.S. Appl. No. 17/454,676, filed Nov. 12, 2021, 8 pages.
Notice of Allowance mailed on Oct. 21, 2019, issued in connection with U.S. Appl. No. 15/946,585, filed Apr. 5, 2018, 5 pages.
Notice of Allowance mailed on Sep. 21, 2022, issued in connection with U.S. Appl. No. 17/128,949, filed Dec. 21, 2020, 8 pages.
Notice of Allowance mailed on Aug. 22, 2017, issued in connection with U.S. Appl. No. 15/273,679, filed Sep. 22, 2016, 5 pages.
Notice of Allowance mailed on Jan. 22, 2018, issued in connection with U.S. Appl. No. 15/178,180, filed Jun. 9, 2016, 9 pages.
Notice of Allowance mailed on Jul. 22, 2020, issued in connection with U.S. Appl. No. 16/131,409, filed Sep. 14, 2018, 13 pages.
Notice of Allowance mailed on Jul. 22, 2020, issued in connection with U.S. Appl. No. 16/790,621, filed Feb. 13, 2020, 10 pages.
Notice of Allowance mailed on Nov. 22, 2021, issued in connection with U.S. Appl. No. 16/834,483, filed Mar. 30, 2020, 10 pages.
Notice of Allowance mailed on Sep. 22, 2022, issued in connection with U.S. Appl. No. 17/163,506, filed Jan. 31, 2021, 13 pages.
Notice of Allowance mailed on Sep. 22, 2022, issued in connection with U.S. Appl. No. 17/248,427, filed Jan. 25, 2021, 9 pages.
Notice of Allowance mailed on Aug. 23, 2021, issued in connection with U.S. Appl. No. 16/109,375, filed Aug. 22, 2018, 10 pages.
Notice of Allowance mailed on Feb. 23, 2023, issued in connection with U.S. Appl. No. 17/532,674, filed Nov. 22, 2021, 10 pages.
Notice of Allowance mailed on Jun. 23, 2021, issued in connection with U.S. Appl. No. 16/814,844, filed Mar. 10, 2020, 8 pages.
Notice of Allowance mailed on Apr. 24, 2019, issued in connection with U.S. Appl. No. 16/154,469, filed Oct. 8, 2018, 5 pages.
Notice of Allowance mailed on Mar. 24, 2022, issued in connection with U.S. Appl. No. 16/378,516, filed Apr. 8, 2019, 7 pages.
Notice of Allowance mailed on Oct. 25, 2021, issued in connection with U.S. Appl. No. 16/723,909, filed Dec. 20, 2019, 11 pages.
Notice of Allowance mailed on Apr. 26, 2022, issued in connection with U.S. Appl. No. 17/896,129, filed Aug. 26, 2022, 8 pages.
Notice of Allowance mailed on Apr. 26, 2023, issued in connection with U.S. Appl. No. 17/658,717, filed Apr. 11, 2022, 11 pages.
Notice of Allowance mailed on Aug. 26, 2020, issued in connection with U.S. Appl. No. 15/948,541, filed Apr. 9, 2018, 9 pages.
Notice of Allowance mailed on Aug. 26, 2022, issued in connection with U.S. Appl. No. 17/145,667, filed Jan. 11, 2021, 8 pages.
Notice of Allowance mailed on May 26, 2021, issued in connection with U.S. Appl. No. 16/927,670, filed Jul. 13, 2020, 10 pages.
Notice of Allowance mailed on Oct. 26, 2022, issued in connection with U.S. Appl. No. 17/486,574, filed Sep. 27, 2021, 11 pages.
Notice of Allowance mailed on Apr. 27, 2020, issued in connection with U.S. Appl. No. 16/700,607, filed Dec. 2, 2019, 10 pages.
Notice of Allowance mailed on Jun. 27, 2022, issued in connection with U.S. Appl. No. 16/812,758, filed Mar. 9, 2020, 16 pages.
Notice of Allowance mailed on Mar. 27, 2019, issued in connection with U.S. Appl. No. 16/214,666, filed Dec. 10, 2018, 6 pages.
Notice of Allowance mailed on Mar. 28, 2018, issued in connection with U.S. Appl. No. 15/699,982, filed Sep. 8, 2017, 17 pages.
Notice of Allowance mailed on May 28, 2021, issued in connection with U.S. Appl. No. 16/524,306, filed Jul. 29, 2019, 9 pages.
Notice of Allowance mailed on Sep. 28, 2022, issued in connection with U.S. Appl. No. 17/444,043, filed Jul. 29, 2021, 17 pages.
Notice of Allowance mailed on Dec. 29, 2017, issued in connection with U.S. Appl. No. 15/131,776, filed Apr. 18, 2016, 13 pages.
Notice of Allowance mailed on Dec. 29, 2022, issued in connection with U.S. Appl. No. 17/327,911, filed May 24, 2021, 14 pages.
Notice of Allowance mailed on Jan. 29, 2021, issued in connection with U.S. Appl. No. 16/290,599, filed Mar. 1, 2019, 9 pages.
Notice of Allowance mailed on Jul. 29, 2022, issued in connection with U.S. Appl. No. 17/236,559, filed Apr. 21, 2021, 6 pages.
Notice of Allowance mailed on Jun. 29, 2020, issued in connection with U.S. Appl. No. 16/216,357, filed Dec. 11, 2018, 8 pages.
Notice of Allowance mailed on Mar. 29, 2021, issued in connection with U.S. Appl. No. 16/600,949, filed Oct. 14, 2019, 9 pages.
Notice of Allowance mailed on Mar. 29, 2023, issued in connection with U.S. Appl. No. 17/722,438, filed Apr. 18, 2022, 7 pages.
Notice of Allowance mailed on May 29, 2020, issued in connection with U.S. Appl. No. 16/148,879, filed Oct. 1, 2018, 6 pages.
Notice of Allowance mailed on Sep. 29, 2021, issued in connection with U.S. Appl. No. 16/876,493, filed May 18, 2020, 5 pages.
Notice of Allowance mailed on Apr. 3, 2019, issued in connection with U.S. Appl. No. 16/160,107, filed Oct. 15, 2018, 7 pages.
Notice of Allowance mailed on Jun. 3, 2021, issued in connection with U.S. Appl. No. 16/876,493, filed May 18, 2020, 7 pages.
Notice of Allowance mailed on Mar. 3, 2022, issued in connection with U.S. Appl. No. 16/679,538, filed Nov. 11, 2019, 7 pages.
Notice of Allowance mailed on Jul. 30, 2018, issued in connection with U.S. Appl. No. 15/098,718, filed Apr. 14, 2016, 5 pages.
Notice of Allowance mailed on Jul. 30, 2019, issued in connection with U.S. Appl. No. 15/131,254, filed Apr. 18, 2016, 9 pages.
Notice of Allowance mailed on Jun. 30, 2023, issued in connection with U.S. Appl. No. 17/303,001, filed May 18, 2021, 8 pages.
Notice of Allowance mailed on Mar. 30, 2020, issued in connection with U.S. Appl. No. 15/973,413, filed May 7, 2018, 5 pages.
Notice of Allowance mailed on Mar. 30, 2023, issued in connection with U.S. Appl. No. 17/303,066, filed May 19, 2021, 7 pages.
Notice of Allowance mailed on Nov. 30, 2018, issued in connection with U.S. Appl. No. 15/438,725, filed Feb. 21, 2017, 5 pages.
Notice of Allowance mailed on Oct. 30, 2019, issued in connection with U.S. Appl. No. 16/131,392, filed Sep. 14, 2018, 9 pages.
Notice of Allowance mailed on Oct. 30, 2020, issued in connection with U.S. Appl. No. 16/528,016, filed Jul. 31, 2019, 10 pages.
Notice of Allowance mailed on Mar. 31, 2023, issued in connection with U.S. Appl. No. 17/303,735, filed Jun. 7, 2021, 19 pages.
Non-Final Office Action mailed on Jul. 3, 2023, issued in connection with U.S. Appl. No. 17/135,173, filed Dec. 28, 2020, 22 pages.
Non-Final Office Action mailed on May 3, 2019, issued in connection with U.S. Appl. No. 16/178,122, filed Nov. 1, 2018, 14 pages.
Non-Final Office Action mailed on Oct. 3, 2018, issued in connection with U.S. Appl. No. 16/102,153, filed Aug. 13, 2018, 20 pages.
Non-Final Office Action mailed on Apr. 30, 2019, issued in connection with U.S. Appl. No. 15/718,521, filed Sep. 28, 2017, 39 pages.
Non-Final Office Action mailed on Jun. 30, 2017, issued in connection with U.S. Appl. No. 15/277,810, filed Sep. 27, 2016, 13 pages.
Non-Final Office Action mailed on Sep. 30, 2022, issued in connection with U.S. Appl. No. 17/353,254, filed Jun. 21, 2021, 22 pages.
Non-Final Office Action mailed on Apr. 4, 2019, issued in connection with U.S. Appl. No. 15/718,911, filed Sep. 28, 2017, 21 pages.
Non-Final Office Action mailed on Aug. 4, 2020, issued in connection with U.S. Appl. No. 16/600,644, filed Oct. 14, 2019, 30 pages.
Non-Final Office Action mailed on Jan. 4, 2019, issued in connection with U.S. Appl. No. 15/948,541, filed Apr. 9, 2018, 6 pages.
Non-Final Office Action mailed on Jan. 4, 2022, issued in connection with U.S. Appl. No. 16/879,549, filed May 20, 2020, 14 pages.
Non-Final Office Action mailed on Nov. 4, 2022, issued in connection with U.S. Appl. No. 17/445,272, filed Aug. 17, 2021, 22 pages.
Non-Final Office Action mailed on Oct. 4, 2022, issued in connection with U.S. Appl. No. 16/915,234, filed Jun. 29, 2020, 16 pages.

(56) References Cited

OTHER PUBLICATIONS

Non-Final Office Action mailed on Apr. 5, 2023, issued in connection with U.S. Appl. No. 18/145,501, filed Dec. 22, 2022, 6 pages.
Non-Final Office Action mailed on Jul. 5, 2023, issued in connection with U.S. Appl. No. 18/061,579, filed Dec. 5, 2022, 11 pages.
Non-Final Office Action mailed on Nov. 5, 2021, issued in connection with U.S. Appl. No. 16/153,530, filed Oct. 5, 2018, 21 pages.
Non-Final Office Action mailed on Apr. 6, 2020, issued in connection with U.S. Appl. No. 16/424,825, filed May 29, 2019, 22 pages.
Non-Final Office Action mailed on Feb. 6, 2018, issued in connection with U.S. Appl. No. 15/211,689, filed Jul. 15, 2016, 32 pages.
Non-Final Office Action mailed on Feb. 6, 2018, issued in connection with U.S. Appl. No. 15/237,133, filed Aug. 15, 2016, 6 pages.
Non-Final Office Action mailed on Jan. 6, 2021, issued in connection with U.S. Appl. No. 16/439,046, filed Jun. 12, 2019, 13 pages.
Non-Final Office Action mailed on Mar. 6, 2020, issued in connection with U.S. Appl. No. 16/141,875, filed Sep. 25, 2018, 8 pages.
Non-Final Office Action mailed on Sep. 6, 2017, issued in connection with U.S. Appl. No. 15/131,254, filed Apr. 18, 2016, 13 pages.
Non-Final Office Action mailed on Sep. 6, 2018, issued in connection with U.S. Appl. No. 15/098,760, filed Apr. 14, 2016, 29 pages.
Non-Final Office Action mailed on Dec. 7, 2021, issued in connection with U.S. Appl. No. 16/168,389, filed Oct. 23, 2018, 36 pages.
Non-Final Office Action mailed on Feb. 7, 2023, issued in connection with U.S. Appl. No. 17/303,001, filed May 18, 2021, 8 pages.
Non-Final Office Action mailed on Jan. 7, 2022, issued in connection with U.S. Appl. No. 17/135,123, filed Dec. 28, 2020, 16 pages.
Non-Final Office Action mailed on Jun. 7, 2023, issued in connection with U.S. Appl. No. 16/179,779, filed Nov. 2, 2018, 29 pages.
Non-Final Office Action mailed on Mar. 7, 2022, issued in connection with U.S. Appl. No. 16/812,758, filed Mar. 9, 2020, 18 pages.
Non-Final Office Action mailed on Feb. 8, 2022, issued in connection with U.S. Appl. No. 16/806,747, filed Mar. 2, 2020, 17 pages.
Non-Final Office Action mailed on Jun. 8, 2023, issued in connection with U.S. Appl. No. 18/048,034, filed Oct. 20, 2022, 8 pages.
Non-Final Office Action mailed on Jun. 8, 2023, issued in connection with U.S. Appl. No. 18/061,243, filed Dec. 2, 2022, 10 pages.
Non-Final Office Action mailed on Sep. 8, 2020, issued in connection with U.S. Appl. No. 15/936,177, filed Mar. 26, 2018, 19 pages.
Non-Final Office Action mailed on Apr. 9, 2018, issued in connection with U.S. Appl. No. 15/804,776, filed Nov. 6, 2017, 18 pages.
Non-Final Office Action mailed on Apr. 9, 2021, issued in connection with U.S. Appl. No. 16/780,483, filed Feb. 3, 2020, 45 pages.
Non-Final Office Action mailed on Feb. 9, 2021, issued in connection with U.S. Appl. No. 16/806,747, filed Mar. 2, 2020, 16 pages.
Non-Final Office Action mailed on May 9, 2018, issued in connection with U.S. Appl. No. 15/818,051, filed Nov. 20, 2017, 22 pages.
Non-Final Office Action mailed on Sep. 9, 2020, issued in connection with U.S. Appl. No. 16/168,389, filed Oct. 23, 2018, 29 pages.
Notice of Allowance mailed Aug. 10, 2021, issued in connection with U.S. Appl. No. 17/157,686, filed Jan. 25, 2021, 9 pages.
Notice of Allowance mailed Aug. 2, 2021, issued in connection with U.S. Appl. No. 16/660,197, filed Oct. 22, 2019, 7 pages.
Notice of Allowance mailed Mar. 31, 2021, issued in connection with U.S. Appl. No. 16/813,643, filed Mar. 9, 2020, 11 pages.
Notice of Allowance mailed Aug. 4, 2021, issued in connection with U.S. Appl. No. 16/780,483, filed Feb. 3, 2020, 5 pages.
Notice of Allowance mailed on Dec. 2, 2019, issued in connection with U.S. Appl. No. 15/718,521, filed Sep. 28, 2017, 15 pages.
Notice of Allowance mailed on Nov. 2, 2022, issued in connection with U.S. Appl. No. 16/989,805, filed Aug. 10, 2020, 5 pages.
Notice of Allowance mailed on Nov. 3, 2022, issued in connection with U.S. Appl. No. 17/448,015, filed Sep. 17, 2021, 7 pages.
Notice of Allowance mailed on Dec. 4, 2017, issued in connection with U.S. Appl. No. 15/277,810, filed Sep. 27, 2016, 5 pages.
Notice of Allowance mailed on Jul. 5, 2018, issued in connection with U.S. Appl. No. 15/237,133, filed Aug. 15, 2016, 5 pages.
Notice of Allowance mailed on Feb. 6, 2023, issued in connection with U.S. Appl. No. 17/077,974, filed Oct. 22, 2020, 7 pages.
Notice of Allowance mailed on Jan. 6, 2023, issued in connection with U.S. Appl. No. 17/896,129, filed Aug. 26, 2022, 13 pages.
Notice of Allowance mailed on Dec. 7, 2022, issued in connection with U.S. Appl. No. 17/315,599, filed May 10, 2021, 11 pages.
Notice of Allowance mailed on Feb. 8, 2023, issued in connection with U.S. Appl. No. 17/446,690, filed Sep. 1, 2021, 8 pages.
International Bureau, International Preliminary Report on Patentability and Written Opinion, mailed on Apr. 8, 2021, issued in connection with International Application No. PCT/US2019/052841, filed on Sep. 25, 2019, 8 pages.
International Bureau, International Preliminary Report on Patentability and Written Opinion, mailed on Apr. 8, 2021, issued in connection with International Application No. PCT/US2019/053253, filed on Sep. 26, 2019, 10 pages.
International Bureau, International Preliminary Report on Patentability, mailed on Dec. 1, 2022, issued in connection with International Application No. PCT/US2021/070524, filed on May 10, 2021, 9 pages.
International Bureau, International Preliminary Report on Patentability, mailed on Apr. 11, 2019, issued in connection with International Application No. PCT/US2017/0054063, filed on Sep. 28, 2017, 9 pages.
International Bureau, International Preliminary Report on Patentability, mailed on Jun. 17, 2021, issued in connection with International Application No. PCT/US2019/064907, filed on Dec. 6, 2019, 8 pages.
International Bureau, International Preliminary Report on Patentability, mailed on Mar. 2, 2021, issued in connection with International Application No. PCT/US2019/048558, filed on Aug. 28, 2019, 8 pages.
International Bureau, International Preliminary Report on Patentability, mailed on Feb. 20, 2020, issued in connection with International Application No. PCT/US2018/045397, filed on Aug. 6, 2018, 8 pages.
International Bureau, International Preliminary Report on Patentability, mailed on Jul. 21, 2022, issued in connection with International Application No. PCT/US2021/070007, filed on Jan. 6, 2021, 8 pages.
International Bureau, International Preliminary Report on Patentability, mailed on Apr. 23, 2019, issued in connection with International Application No. PCT/US2017/057220, filed on Oct. 18, 2017, 7 pages.
International Bureau, International Preliminary Report on Patentability, mailed on Apr. 26, 2022, issued in connection with International Application No. PCT/US2020/056632, filed on Oct. 21, 2020, 7 pages.
International Bureau, International Preliminary Report on Patentability, mailed on Mar. 31, 2020, issued in connection with International Application No. PCT/US2018053123, filed on Sep. 27, 2018, 12 pages.
International Bureau, International Preliminary Report on Patentability, mailed on Mar. 31, 2020, issued in connection with International Application No. PCT/US2018053472, filed on Sep. 28, 2018, 8 pages.
International Bureau, International Preliminary Report on Patentability, mailed on Mar. 31, 2020, issued in connection with International Application No. PCT/US2018053517, filed on Sep. 28, 2018, 10 pages.
International Bureau, International Preliminary Report on Patentability, mailed on Sep. 7, 2018, issued in connection with International Application No. PCT/US2017/018728, filed on Feb. 21, 2017, 8 pages.
International Bureau, International Preliminary Report on Patentability, mailed on Sep. 7, 2018, issued in connection with International Application No. PCT/US2017/018739, filed on Feb. 21, 2017, 7 pages.
International Bureau, International Search Report and Written Opinion mailed on Nov. 10, 2020, issued in connection with International Application No. PCT/US2020/044250, filed on Jul. 30, 2020, 15 pages.

(56) References Cited

OTHER PUBLICATIONS

International Bureau, International Search Report and Written Opinion mailed on Dec. 11, 2019, issued in connection with International Application No. PCT/US2019/052129, filed on Sep. 20, 2019, 18 pages.
International Bureau, International Search Report and Written Opinion mailed on Nov. 13, 2018, issued in connection with International Application No. PCT/US2018/045397, filed on Aug. 6, 2018, 11 pages.
International Bureau, International Search Report and Written Opinion mailed on Jan. 14, 2019, issued in connection with International Application No. PCT/US2018053472, filed on Sep. 28, 2018, 10 pages.
International Bureau, International Search Report and Written Opinion mailed on Jul. 14, 2020, issued in connection with International Application No. PCT/US2020/017150, filed on Feb. 7, 2020, 27 pages.
International Bureau, International Search Report and Written Opinion mailed on Nov. 14, 2017, issued in connection with International Application No. PCT/US2017/045521, filed on Aug. 4, 2017, 10 pages.
International Bureau, International Search Report and Written Opinion mailed on Jul. 17, 2019, issued in connection with International Application No. PCT/US2019/032934, filed on May 17, 2019, 17 pages.
International Bureau, International Search Report and Written Opinion mailed on Nov. 18, 2019, issued in connection with International Application No. PCT/US2019/048558, filed on Aug. 28, 2019, 11 pages.
International Bureau, International Search Report and Written Opinion mailed on Nov. 18, 2019, issued in connection with International Application No. PCT/US2019052841, filed on Sep. 25, 2019, 12 pages.
International Bureau, International Search Report and Written Opinion mailed on Mar. 2, 2020, issued in connection with International Application No. PCT/US2019064907, filed on Dec. 6, 2019, 11 pages.
International Bureau, International Search Report and Written Opinion mailed on Mar. 2, 2020, issued in connection with International Application No. PCT/US2019/064907, filed on Dec. 6, 2019, 9 pages.
International Bureau, International Search Report and Written Opinion mailed on Dec. 20, 2019, issued in connection with International Application No. PCT/US2019052654, filed on Sep. 24, 2019, 11 pages.
International Bureau, International Search Report and Written Opinion mailed on Mar. 20, 2023, issued in connection with International Application No. PCT/US2022/045399, filed on Sep. 30, 2022, 25 pages.
International Bureau, International Search Report and Written Opinion mailed on Sep. 21, 2020, issued in connection with International Application No. PCT/US2020/037229, filed on Jun. 11, 2020, 17 pages.
International Bureau, International Search Report and Written Opinion mailed on Oct. 22, 2020, issued in connection with International Application No. PCT/US2020/044282, filed on Jul. 30, 2020, 15 pages.
International Bureau, International Search Report and Written Opinion mailed on Apr. 23, 2021, issued in connection with International Application No. PCT/US2021/070007, filed on Jan. 6, 2021, 11 pages.
International Bureau, International Search Report and Written Opinion mailed on Jul. 24, 2018, issued in connection with International Application No. PCT/US2018/019010, filed on Feb. 21, 2018, 12 pages.
International Bureau, International Search Report and Written Opinion, mailed on Feb. 27, 2019, issued in connection with International Application No. PCT/US2018/053123, filed on Sep. 27, 2018, 16 pages.
International Bureau, International Search Report and Written Opinion mailed on Sep. 27, 2019, issued in connection with International Application No. PCT/US2019/039828, filed on Jun. 28, 2019, 13 pages.
International Bureau, International Search Report and Written Opinion mailed on Nov. 29, 2019, issued in connection with International Application No. PCT/US2019/053253, filed on Sep. 29, 2019, 14 pages.
International Bureau, International Search Report and Written Opinion mailed on Sep. 4, 2019, issued in connection with International Application No. PCT/US2019/033945, filed on May 24, 2019, 8 pages.
International Bureau, International Search Report and Written Opinion mailed on Aug. 6, 2020, issued in connection with International Application No. PCT/FR2019/000081, filed on May 24, 2019, 12 pages.
International Bureau, International Search Report and Written Opinion mailed on Dec. 6, 2018, issued in connection with International Application No. PCT/US2018/050050, filed on Sep. 7, 2018, 9 pages.
International Bureau, International Search Report and Written Opinion mailed on Dec. 6, 2019, issued in connection with International Application No. PCT/US2019050852, filed on Sep. 12, 2019, 10 pages.
International Bureau, International Search Report and Written Opinion mailed on Oct. 6, 2017, issued in connection with International Application No. PCT/US2017/045551, filed on Aug. 4, 2017, 12 pages.
International Bureau, International Search Report and Written Opinion mailed on Apr. 8, 2020, issued in connection with International Application No. PCT/US2019/067576, filed on Dec. 19, 2019, 12 pages.
International Searching Authority, International Search Report and Written Opinion mailed on Feb. 8, 2021, issued in connection with International Application No. PCT/EP2020/082243, filed on Nov. 16, 2020, 10 pages.
International Searching Authority, International Search Report and Written Opinion mailed on Feb. 12, 2021, issued in connection with International Application No. PCT/US2020/056632, filed on Oct. 21, 2020, 10 pages.
International Searching Authority, International Search Report and Written Opinion mailed on Dec. 19, 2018, in connection with International Application No. PCT/US2018/053517, 13 pages.
International Searching Authority, International Search Report and Written Opinion mailed on Nov. 22, 2017, issued in connection with International Application No. PCT/US2017/054063, filed on Sep. 28, 2017, 11 pages.
International Searching Authority, International Search Report and Written Opinion mailed on Apr. 23, 2021, issued in connection with International Application No. PCT/US2020/066231, filed on Dec. 18, 2020, 9 pages.
International Searching Authority, International Search Report and Written Opinion mailed on Jan. 23, 2018, issued in connection with International Application No. PCT/US2017/57220, filed on Oct. 18, 2017, 8 pages.
International Searching Authority, International Search Report and Written Opinion mailed on May 23, 2017, issued in connection with International Application No. PCT/US2017/018739, Filed on Feb. 21, 2017, 10 bages.
International Searching Authority, International Search Report and Written Opinion mailed on Oct. 23, 2017, issued in connection with International Application No. PCT/US2017/042170, filed on Jul. 14, 2017, 15 pages.
International Searching Authority, International Search Report and Written Opinion mailed on Oct. 24, 2017, issued in connection with International Application No. PCT/US2017/042227, filed on Jul. 14, 2017, 16 pages.
Korean Patent Office, Korean Office Action and Translation mailed on Mar. 25, 2020, issued in connection with Korean Application No. 10-2019-7012192, 14 pages.
Korean Patent Office, Korean Office Action and Translation mailed on Aug. 26, 2020, issued in connection with Korean Application No. 10-2019-7027640, 16 pages.

(56) References Cited

OTHER PUBLICATIONS

Korean Patent Office, Korean Office Action and Translation mailed on Mar. 30, 2020, issued in connection with Korean Application No. 10-2020-7004425, 5 pages.
Korean Patent Office, Korean Office Action and Translation mailed on Jan. 4, 2021, issued in connection with Korean Application No. 10-2020-7034425, 14 pages.
Korean Patent Office, Korean Office Action and Translation mailed on Sep. 9, 2019, issued in connection with Korean Application No. 10-2018-7027451, 21 pages.
Korean Patent Office, Korean Office Action mailed on May 8, 2019, issued in connection with Korean Application No. 10-2018-7027451, 7 pages.
Korean Patent Office, Korean Office Action mailed on May 8, 2019, issued in connection with Korean Application No. 10-2018-7027452, 5 pages.
Korean Patent Office, Office Action and Translation mailed on Feb. 27, 2023, issued in connection with Korean Application No. 10-2022-7021879, 5 pages.
Lei et al. Accurate and Compact Large Vocabulary Speech Recognition on Mobile Devices. Interspeech 2013, Aug. 25, 2013, 4 pages.
Lengerich et al. An End-to-End Architecture for Keyword Spotting and Voice Activity Detection, arXiv:1611.09405v1, Nov. 28, 2016, 5 pages.
Louderback, Jim, "Affordable Audio Receiver Furnishes Homes With MP3," TechTV Vault. Jun. 28, 2000 retrieved Jul. 10, 2014, 2 pages.
Maja Taseska and Emanual A.P. Habets, "MMSE-Based Blind Source Extraction in Diffuse Noise Fields Using a Complex Coherence-Based a Priori Sap Estimator." International Workshop on Acoustic Signal Enhancement 2012, Sep. 4-6, 2012, 4pages.
Mathias Wolfel. Channel Selection by Class Separability Measures for Automatic Transcriptions on Distant Microphones, Interspeech 2007 10.21437/Interspeech.2007-255, 4 pages.
Matrix—The Ultimate Development Board Sep. 14, 2019 Matrix—The Ultimate Development Board Sep. 14, 2019 https-//web.archive.org/web/20190914035838/https-//www.matrix.one/ , 1 page.
Mesaros et al. Detection and Classification of Acoustic Scenes and Events: Outcome of the DCASE 2016 Challenge. IEEE/ACM Transactions on Audio, Speech, and Language Processing. Feb. 2018, 16 pages.
Molina et al., "Maximum Entropy-Based Reinforcement Learning Using a Confidence Measure in Speech Recognition for Telephone Speech," in IEEE Transactions on Audio, Speech, and Language Processing, vol. 18, No. 5, pp. 1041-1052, Jul. 2010, doi: 10.1109/TASL.2009.2032618. [Retrieved online] URLhttps://ieeexplore.ieee.org/document/5247099?partnum=5247099&searchProductType=IEEE%20Journals%20Transactions.
Morales-Cordovilla et al. "Room Localization for Distant Speech Recognition," Proceedings of Interspeech 2014, Sep. 14, 2014, 4 pages.
Newman, Jared. "Chromecast Audio's multi-room support has arrived," Dec. 11, 2015, https://www.pcworld.com/article/3014204/customer-electronic/chromcase-audio-s-multi-room-support-has . . . , 1 page.
Ngo et al. "Incorporating the Conditional Speech Presence Probability in Multi-Channel Wiener Filter Based Noise Reduction in Hearing Aids." EURASIP Journal on Advances in Signal Processing vol. 2009, Jun. 2, 2009, 11 pages.
Non-Final Office Action mailed Jul. 12, 2021, issued in connection with U.S. Appl. No. 17/008,104, filed Aug. 31, 2020, 6 pages.
Non-Final Office Action mailed Jun. 18, 2021, issued in connection with U.S. Appl. No. 17/236,559, filed Apr. 21, 2021, 9 pages.
Non-Final Office Action mailed Apr. 21, 2021, issued in connection with U.S. Appl. No. 16/109,375, filed Aug. 22, 2018, 9 pages.
Non-Final Office Action mailed Dec. 21, 2020, issued in connection with U.S. Appl. No. 16/153,530, filed Oct. 5, 2018, 22 pages.
Non-Final Office Action mailed Jul. 22, 2021, issued in connection with U.S. Appl. No. 16/179,779, filed Nov. 2, 2018, 19 pages.
Non-Final Office Action mailed Apr. 23, 2021, issued in connection with U.S. Appl. No. 16/660,197, filed Oct. 22, 2019, 9 pages.
Non-Final Office Action mailed Jun. 25, 2021, issued in connection with U.S. Appl. No. 16/213,570, filed Dec. 7, 2018, 11 pages.
Non-Final Office Action mailed Jul. 8, 2021, issued in connection with U.S. Appl. No. 16/813,643, filed Mar. 9, 2020, 12 pages.
Non-Final Office Action mailed Dec. 9, 2020, issued in connection with U.S. Appl. No. 16/271,550, filed Feb. 8, 2019, 35 pages.
Non-Final Office Action mailed Jul. 9, 2021, issued in connection with U.S. Appl. No. 16/806,747, filed Mar. 2, 2020, 18 pages.
Non-Final Office Action mailed on Jun. 1, 2017, issued in connection with U.S. Appl. No. 15/223,218, filed Jul. 29, 2016, 7 pages.
Non-Final Office Action mailed on Feb. 2, 2023, issued in connection with U.S. Appl. No. 17/305,698, filed Jul. 13, 2021, 16 pages.
Non-Final Office Action mailed on Nov. 2, 2017, issued in connection with U.S. Appl. No. 15/584,782, filed May 2, 2017, 11 pages.
Non-Final Office Action mailed on Nov. 3, 2017, issued in connection with U.S. Appl. No. 15/438,741, filed Feb. 21, 2017, 11 pages.
Non-Final Office Action mailed on Nov. 4, 2019, issued in connection with U.S. Appl. No. 16/022,662, filed Jun. 28, 2018, 16 pages.
Non-Final Office Action mailed on Dec. 5, 2022, issued in connection with U.S. Appl. No. 17/662,302, filed May 6, 2022, 12 pages.
Non-Final Office Action mailed on Oct. 5, 2022, issued in connection with U.S. Appl. No. 17/449,926, filed Oct. 4, 2021, 11 pages.
Non-Final Office Action mailed on Sep. 5, 2019, issued in connection with U.S. Appl. No. 16/416,752, filed May 20, 2019, 14 pages.
Non-Final Office Action mailed on Feb. 7, 2017, issued in connection with U.S. Appl. No. 15/131,244, filed Apr. 18, 2016, 12 pages.
Non-Final Office Action mailed on Feb. 8, 2017, issued in connection with U.S. Appl. No. 15/098,892, filed Apr. 14, 2016, 17 pages.
Non-Final Office Action mailed on Mar. 9, 2017, issued in connection with U.S. Appl. No. 15/098,760, filed Apr. 14, 2016, 13 pages.
Non-Final Office Action mailed on Oct. 9, 2019, issued in connection with U.S. Appl. No. 15/936,177, filed Mar. 26, 2018, 16 pages.
Non-Final Office Action mailed on Jul. 1, 2020, issued in connection with U.S. Appl. No. 16/138,111, filed Sep. 21, 2018, 14 pages.
Non-Final Office Action mailed on Jan. 10, 2018, issued in connection with U.S. Appl. No. 15/098,718, filed Apr. 14, 2016, 15 pages.
Non-Final Office Action mailed on Jan. 10, 2018, issued in connection with U.S. Appl. No. 15/229,868, filed Aug. 5, 2016, 13 pages.
Non-Final Office Action mailed on Jan. 10, 2018, issued in connection with U.S. Appl. No. 15/438,725, filed Feb. 21, 2017, 15 pages.
Non-Final Office Action mailed on Sep. 10, 2018, issued in connection with U.S. Appl. No. 15/670,361, filed Aug. 7, 2017, 17 pages.
Non-Final Office Action mailed on Aug. 11, 2021, issued in connection with U.S. Appl. No. 16/841,116, filed Apr. 6, 2020, 9 pages.
Non-Final Office Action mailed on Feb. 11, 2021, issued in connection with U.S. Appl. No. 16/876,493, filed May 18, 2020, 16 pages.
Non-Final Office Action mailed on Feb. 11, 2022, issued in connection with U.S. Appl. No. 17/145,667, filed Jan. 11, 2021, 9 pages.
Non-Final Office Action mailed on Mar. 11, 2021, issued in connection with U.S. Appl. No. 16/834,483, filed Mar. 30, 2020, 11 pages.
Final Office Action mailed on Aug. 22, 2022, issued in connection with U.S. Appl. No. 16/168,389, filed Oct. 23, 2018, 37 pages.
Final Office Action mailed on Feb. 22, 2021, issued in connection with U.S. Appl. No. 15/936,177, filed Mar. 26, 2018, 20 pages.
Final Office Action mailed on Feb. 22, 2021, issued in connection with U.S. Appl. No. 16/213,570, filed Dec. 7, 2018, 12 pages.
Final Office Action mailed on Jun. 22, 2020, issued in connection with U.S. Appl. No. 16/179,779, filed Nov. 2, 2018, 16 pages.
Final Office Action mailed on Mar. 23, 2020, issued in connection with U.S. Appl. No. 16/145,275, filed Sep. 28, 2018, 11 pages.
Final Office Action mailed on Feb. 24, 2020, issued in connection with U.S. Appl. No. 15/936,177, filed Mar. 26, 2018, 20 pages.
Final Office Action mailed on Apr. 26, 2019, issued in connection with U.S. Appl. No. 15/721,141, filed Sep. 29, 2017, 20 pages.

(56) References Cited

OTHER PUBLICATIONS

Final Office Action mailed on Jul. 27, 2022, issued in connection with U.S. Appl. No. 16/989,350, filed Aug. 10, 2020, 15 pages.
Final Office Action mailed on Mar. 29, 2023, issued in connection with U.S. Appl. No. 17/549,034, filed Dec. 13, 2021, 21 pages.
Final Office Action mailed on Nov. 29, 2021, issued in connection with U.S. Appl. No. 17/236,559, filed Apr. 21, 2021, 11 pages.
Final Office Action mailed on Apr. 30, 2019, issued in connection with U.S. Appl. No. 15/098,760, filed Apr. 14, 2016, 6 pages.
Final Office Action mailed on Jun. 4, 2021, issued in connection with U.S. Appl. No. 16/168,389, filed Oct. 23, 2018, 38 pages.
Final Office Action mailed on Oct. 4, 2021, issued in connection with U.S. Appl. No. 16/806,747, filed Mar. 2, 2020, 17 pages.
Final Office Action mailed on Feb. 5, 2019, issued in connection with U.S. Appl. No. 15/438,749, filed Feb. 21, 2017, 17 pages.
Final Office Action mailed on Feb. 7, 2020, issued in connection with U.S. Appl. No. 15/948,541, filed Apr. 9, 2018, 8 pages.
Final Office Action mailed on Jun. 7, 2022, issued in connection with U.S. Appl. No. 16/736,725, filed Jan. 7, 2020, 14 pages.
Final Office Action mailed on Jun. 8, 2021, issued in connection with U.S. Appl. No. 16/271,550, filed Feb. 8, 2019, 41 pages.
Final Office Action mailed on Sep. 8, 2020, issued in connection with U.S. Appl. No. 16/213,570, filed Dec. 7, 2018, 12 pages.
Fiorenza Arisio et al. "Deliverable 1.1 User Study, analysis of requirements and definition of the application task," May 31, 2012, http://dirha.fbk.eu/sites/dirha.fbk.eu/files/docs/DIRHA_D1.1., 31 pages.
First Action Interview Office Action mailed on Mar. 8, 2021, issued in connection with U.S. Appl. No. 16/798,967, filed Feb. 24, 2020, 4 pages.
First Action Interview Office Action mailed on Aug. 14, 2019, issued in connection with U.S. Appl. No. 16/227,308, filed Dec. 20, 2018, 4 pages.
First Action Interview Office Action mailed on Jun. 15, 2020, issued in connection with U.S. Appl. No. 16/213,570, filed Dec. 7, 2018, 4 pages.
First Action Interview Office Action mailed on Jun. 2, 2020, issued in connection with U.S. Appl. No. 16/109,375, filed Aug. 22, 2018, 10 pages.
First Action Interview Office Action mailed on Jan. 22, 2020, issued in connection with U.S. Appl. No. 15/989,715, filed May 25, 2018, 3 pages.
First Action Interview Office Action mailed on Jul. 5, 2019, issued in connection with U.S. Appl. No. 16/227,308, filed Dec. 20, 2018, 4 pages.
Freiberger, Karl, "Development and Evaluation of Source Localization Algorithms for Coincident Microphone Arrays," Diploma Thesis, Apr. 1, 2010, 106 pages.
Giacobello et al. "A Sparse Nonuniformly Partitioned Multidelay Filter for Acoustic Echo Cancellation," 2013, IEEE Workshop on Applications of Signal Processing to Audio and Acoustics, Oct. 2013, New Paltz, NY, 4 pages.
Giacobello et al. "Tuning Methodology for Speech Enhancement Algorithms using a Simulated Conversational Database and Perceptual Objective Measures," 2014, 4th Joint Workshop on Handsfree Speech Communication and Microphone Arrays HSCMA, 2014, 5 pages.
Han et al. "Deep Compression: Compressing Deep Neural Networks with Pruning, Trained Quantization and Huffman Coding." ICLR 2016, Feb. 15, 2016, 14 pages.
Hans Speidel: "Chatbot Training: How to use training data to provide fully automated customer support", Jun. 29, 2017, pp. 1-3, XP055473185, Retrieved from the Internet: URL:https://www.crowdguru.de/wp-content/uploads/Case-Study-Chatbot-training-How-to-use-training-data-to-provide-fully-automated-customer-support.pdf [retrieved on May 7, 2018].
Helwani et al."Source-domain adaptive filtering for MIMO systems with application to acoustic echo cancellation", Acoustics Speech and Signal Processing, 2010 IEEE International Conference, Mar. 14, 2010, 4 pages.
Helwani et al. Source-domain adaptive filtering for MIMO systems with application to acoustic echo cancellation. In 2010 IEEE International Conference on Acoustics, Speech and Signal Processing, Jun. 28, 2010, 4 pages. [retrieved on Feb. 23, 2023], Retrieved from the Internet: URL: https://scholar.google.com/scholar?hl=en&as_sdt=0%2C14&q=SOURCE-DOMAIN+ADAPTIVE+FILTERING+FOR+MIMO+SYSTEMS+WITH+APPLICATION+TO+ACOUSTIC+ECHO+CANCELLATION&btnG=.
Hirano et al. "A Noise-Robust Stochastic Gradient Algorithm with an Adaptive Step-Size Suitable for Mobile Hands-Free Telephones," 1995, International Conference on Acoustics, Speech, and Signal Processing, vol. 2, 4 pages.
Indian Patent Office, Examination Report mailed on May 24, 2021, issued in connection with Indian Patent Application No. 201847035595, 6 pages.
Indian Patent Office, Examination Report mailed on Feb. 25, 2021, issued in connection with Indian Patent Application No. 201847035625, 6 pages.
International Bureau, International Preliminary Report on Patentability and Written Opinion, mailed on Apr. 1, 2021, issued in connection with International Application No. PCT/US2019/052129, filed on Sep. 20, 2019, 13 pages.
International Bureau, International Preliminary Report on Patentability and Written Opinion, mailed on Jul. 1, 2021, issued in connection with International Application No. PCT/US2019/067576, filed on Dec. 19, 2019, 8 pages.
International Bureau, International Preliminary Report on Patentability and Written Opinion, mailed on Aug. 10, 2021, issued in connection with International Application No. PCT/US2020/017150, filed on Feb. 7, 2020, 20 pages.
International Bureau, International Preliminary Report on Patentability and Written Opinion, mailed on Dec. 10, 2020, issued in connection with International Application No. PCT/US2019/033945, filed on May 25, 2018, 7 pages.
International Bureau, International Preliminary Report on Patentability and Written Opinion, mailed on Mar. 10, 2020, issued in connection with International Application No. PCT/US2018/050050, filed on Sep. 7, 2018, 7 pages.
International Bureau, International Preliminary Report on Patentability and Written Opinion, mailed on Apr. 15, 2021, issued in connection with International Application No. PCT/US2019/054332, filed on Oct. 2, 2019, 9 pages.
International Bureau, International Preliminary Report on Patentability and Written Opinion, mailed on Jan. 15, 2019, issued in connection with International Application No. PCT/US2017/042170, filed on Jul. 14, 2017, 7 pages.
International Bureau, International Preliminary Report on Patentability and Written Opinion, mailed on Jan. 15, 2019, issued in connection with International Application No. PCT/US2017/042227, filed on Jul. 14, 2017, 7 bages.
International Bureau, International Preliminary Report on Patentability and Written Opinion, mailed on Mar. 25, 2021, issued in connection with International Application No. PCT/US2019/050852, filed on Sep. 12, 2019, 8 pages.
International Bureau, International Preliminary Report on Patentability and Written Opinion, mailed on Aug. 27, 2019, issued in connection with International Application No. PCT/US2018/019010, filed on Feb. 21, 2018, 9 pages.
International Bureau, International Preliminary Report on Patentability and Written Opinion, mailed on Mar. 31, 2020, issued in connection with International Application No. PCT/US2018/053517, filed on Sep. 28, 2018, 10 pages.
International Bureau, International Preliminary Report on Patentability and Written Opinion, mailed on Feb. 5, 2019, issued in connection with International Application No. PCT/US2017/045521, filed on Aug. 4, 2017, 7 pages.
International Bureau, International Preliminary Report on Patentability and Written Opinion, mailed on Feb. 5, 2019, issued in connection with International Application No. PCT/US2017/045551, filed on Aug. 4, 2017, 9 pages.
International Bureau, International Preliminary Report on Patentability and Written Opinion, mailed on Jan. 7, 2021, issued in

(56) References Cited

OTHER PUBLICATIONS connection with International Application No. PCT/US2019/039828, filed on Jun. 28, 2019, 11 pages.
International Bureau, International Preliminary Report on Patentability and Written Opinion, mailed on Apr. 8, 2021, issued in connection with International Application No. PCT/US2019/052654, filed on Sep. 24, 2019, 7 pages.

* cited by examiner

| | | | | | | |
|---|---|---|---|---|---|---|
| **Native VAS** | n/a | | | | | |
| **General VAS 1** | Permitted | n/a | | | | |
| **General VAS 2** | Permitted | Forbidden | n/a | | | |
| **General VAS 3** | Permitted | Permitted | Forbidden | n/a | | |
| **Special-Purpose VAS 1** | Permitted | Permitted | Permitted | Permitted | n/a | |
| **Special-Purpose VAS 2** | Permitted | Permitted | Permitted | Permitted | Forbidden | n/a |
| | **Native VAS** | **General VAS 1** | **General VAS 2** | **General VAS 3** | **Special-Purpose VAS 1** | **Special-Purpose VAS 2** |

*Fig. 9A*

| | | | | | | |
|---|---|---|---|---|---|---|
| **Native VAS** | n/a | | | | | |
| **General VAS 1** | Permitted | n/a | | | | |
| **General VAS 2** | Permitted | Forbidden | n/a | | | |
| **General VAS 3** | Permitted | Permitted | Forbidden | n/a | | |
| **Special-Purpose VAS 1** | Permitted | Permitted | Permitted | Permitted | n/a | |
| **Special-Purpose VAS 2** | Permitted | Permitted | Permitted | Permitted | Forbidden | n/a |
| **General VAS 1 + General VAS 3** | Permitted | n/a | n/a | Forbidden | Forbidden | Forbidden |
| | **Native VAS** | **General VAS 1** | **General VAS 2** | **General VAS 3** | **Special-Purpose VAS 1** | **Special-Purpose VAS 2** |

*Fig. 9B*

| | | | | | | |
|---|---|---|---|---|---|---|
| Native VAS | Active | | | | | |
| General VAS 1 | Concurrent | Active | | | | |
| General VAS 2 | | | Inactive | | | |
| General VAS 3 | | | | Inactive | | |
| Special-Purpose VAS 1 | | | | | Inactive | |
| Special-Purpose VAS 2 | | | | | | Inactive |
| General VAS 1 + General VAS 3 | | | | | | |
| | Native VAS | General VAS 1 | General VAS 2 | General VAS 3 | Special-Purpose VAS 1 | Special-Purpose VAS 2 |
| Priority | n/a | Last in | n/a | n/a | n/a | n/a |

*Fig. 10A*

| | | | | | | |
|---|---|---|---|---|---|---|
| Native VAS | Active | | | | | |
| General VAS 1 | Deactivated | Inactive | | | | |
| General VAS 2 | Concurrent | | Active | | | |
| General VAS 3 | | | | Inactive | | |
| Special-Purpose VAS 1 | | | | | Inactive | |
| Special-Purpose VAS 2 | | | | | | Inactive |
| General VAS 1 + General VAS 3 | | | | | | |
| | Native VAS | General VAS 1 | General VAS 2 | General VAS 3 | Special-Purpose VAS 1 | Special-Purpose VAS 2 |
| Priority | n/a | 2nd to last in | Last in | n/a | n/a | n/a |

*Fig. 10B*

| | | | | | | |
|---|---|---|---|---|---|---|
| Native VAS | Active | | | | | |
| General VAS 1 | | Inactive | | | | |
| General VAS 2 | Concurrent | | Active | | | |
| General VAS 3 | | | | Inactive | | |
| Special-Purpose VAS 1 | Concurrent | | | | Active | |
| Special-Purpose VAS 2 | | | | | | Inactive |
| General VAS 1 + General VAS 3 | | | | | | |
| | Native VAS | General VAS 1 | General VAS 2 | General VAS 3 | Special-Purpose VAS 1 | Special-Purpose VAS 2 |
| Priority | n/a | n/a | 2nd to last in | | Last in | |

*Fig. 10C*

| | | | | | | |
|---|---|---|---|---|---|---|
| Native VAS | Active | | | | | |
| General VAS 1 | | Inactive | | | | |
| General VAS 2 | Concurrent | | Active | | | |
| General VAS 3 | | | | Inactive | | |
| Special-Purpose VAS 1 | Deactivated | | | | Inactive | |
| Special-Purpose VAS 2 | Concurrent | | | | | Active |
| General VAS 1 + General VAS 3 | | | | | | |
| | Native VAS | General VAS 1 | General VAS 2 | General VAS 3 | Special-Purpose VAS 1 | Special-Purpose VAS 2 |
| Priority | n/a | n/a | 2nd to last in | n/a | n/a | Last in |

*Fig. 10D*

| | | | | | | |
|---|---|---|---|---|---|---|
| **Native VAS** | Active | | | | | |
| **General VAS 1** | | Inactive | | | | |
| **General VAS 2** | Deactivated | | Inactive | | | |
| **General VAS 3** | Concurrent | | | Active | | |
| **Special-Purpose VAS 1** | | | | | Inactive | |
| **Special-Purpose VAS 2** | Concurrent | | | | | Active |
| **General VAS 1 + General VAS 3** | | | | | | |
| | **Native VAS** | **General VAS 1** | **General VAS 2** | **General VAS 3** | **Special-Purpose VAS 1** | **Special-Purpose VAS 2** |
| **Priority** | n/a | n/a | n/a | Last in | n/a | 2nd to last in |

*Fig. 10E*

| | | | | | | |
|---|---|---|---|---|---|---|
| **Native VAS** | Active | | | | | |
| **General VAS 1** | Concurrent | Active | | | | |
| **General VAS 2** | | | Inactive | | | |
| **General VAS 3** | Concurrent | | | Active | | |
| **Special-Purpose VAS 1** | | | | | Inactive | |
| **Special-Purpose VAS 2** | Deactivated | | | | | Inactive |
| **General VAS 1 + General VAS 3** | Concurrent | | | | | |
| | **Native VAS** | **General VAS 1** | **General VAS 2** | **General VAS 3** | **Special-Purpose VAS 1** | **Special-Purpose VAS 2** |
| **Priority** | n/a | Last in | n/a | 2nd to last in | n/a | n/a |

*Fig. 10F*

| | | | | | | |
|---|---|---|---|---|---|---|
| **Native VAS** | Active | | | | | |
| **General VAS 1** | Deactivated | Inactive | | | | |
| **General VAS 2** | Concurrent | | Active | | | |
| **General VAS 3** | Deactivated | | | Inactive | | |
| **Special-Purpose VAS 1** | | | | | Inactive | |
| **Special-Purpose VAS 2** | | | | | | Inactive |
| **General VAS 1 + General VAS 3** | Deactivated | | | | | |
| | **Native VAS** | **General VAS 1** | **General VAS 2** | **General VAS 3** | **Special-Purpose VAS 1** | **Special-Purpose VAS 2** |
| **Priority** | n/a | n/a | Last in | n/a | n/a | n/a |

*Fig. 10G*

CONCURRENCY RULES FOR NETWORK MICROPHONE DEVICES HAVING MULTIPLE VOICE ASSISTANT SERVICES

CROSS-REFERENCE TO RELATED APPLICATION

This application is a 371 U.S. national phase application of International Application No. PCT/US2021/071598. Gled Sep. 25, 2021, which claims the benefit of priority to U.S. Patent Application No. 63/198,045, filed Sep. 25, 2020, which are incorporated herein by reference in their entireties.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIGS. 9A and 9B are example tables illustrating concurrency restrictions for voice assistant services.

FIGS. 10A-10G illustrate example states of various voice assistant services for a network microphone device based on concurrency restrictions.

Figure 1A:
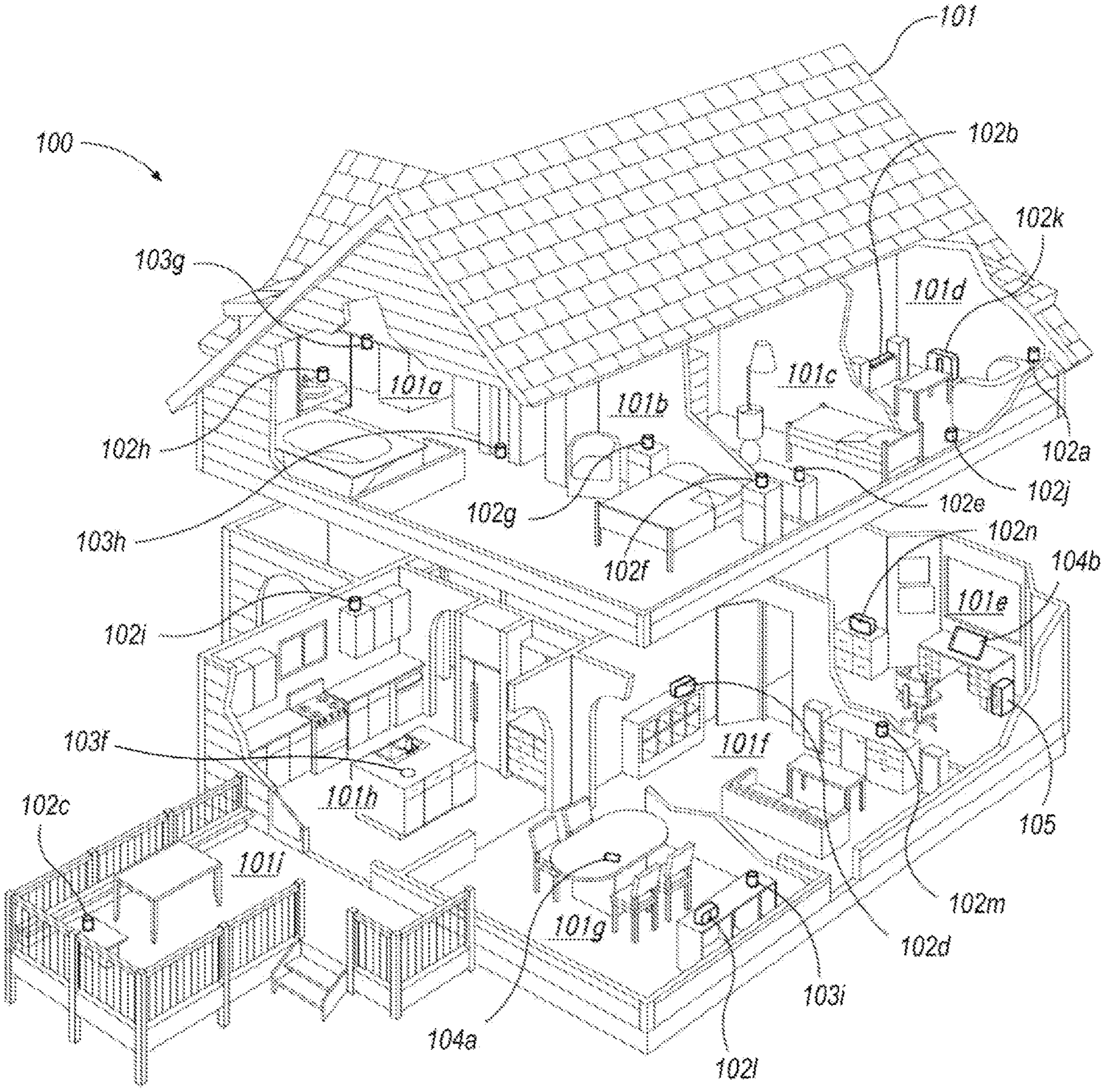
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Voice control can be beneficial for a "smart" home having smart appliances and related devices, such as wireless illumination devices, home-automation devices (e.g., thermostats, door locks, etc.), and audio playback devices. In some implementations, a networked microphone device (NMD) (which may be a component of a playback device) may be used to control smart home devices. A network microphone device will typically include a microphone for receiving voice inputs. The network microphone device can forward voice inputs to a voice assistant service (VAS), such as AMAZON's ALEXA, APPLE's SIRI, MICROSOFT's CORTANA, GOOGLE's Assistant, etc. A VAS may be a remote service implemented by cloud servers to process voice inputs. A VAS may process a voice input to determine an intent of the voice input. Based on the response, the network microphone device may cause one or more smart devices to perform an action. For example, the network microphone device may instruct an illumination device to turn on/off based on the response to the instruction from the VAS.

A voice input detected by a network microphone device will typically include an activation word followed by an utterance containing a user request. The activation word is typically a predetermined word or phrase used to "wake up" and invoke the VAS for interpreting the intent of the voice input. For instance, in querying AMAZON's ALEXA, a user might speak the activation word "Alexa." Other examples include "Ok, Google" for invoking GOOGLE's Assistant, and "Hey, Siri" for invoking APPLE's SIRI, or "Hey, Sonos" for a VAS offered by SONOS. In various examples, an activation word may also be referred to as, e.g., a wake-, trigger-, wakeup-word or phrase, and may take the form of any suitable word; combination of words, such as phrases; and/or audio cues indicating that the network microphone device and/or an associated VAS is to invoke an action.

There are several different types of VASes. For example, a native VAS may pre-installed or otherwise integrated into the NMD and configured primarily for enabling voice control of the NMD itself or other devices of the media playback system of which the NMD is a part. There may be one or more general-purpose VASes, also referred to herein as general or "ask-anything" VASes. These general-purpose VASes can be configured to perform a wide variety of tasks across many domains, such as media playback, information retrieval (e.g., weather reports, stock prices), alarm setting, calendar control, etc. AMAZON'S ALEXA, GOOGLE'S Assistant, APPLE'S SIRI, and MICROSOFT'S CORTANA are each examples of such general-purposes VASes. Another type of VAS is a special-purpose VAS, which may be configured to provide functionality over a relatively limited domain. For example, a special-purpose VAS may be configured to provide smart-home functionality, allowing a user to control lighting, climate control, or home security systems, etc. Another special-purpose VAS may be configured to allow a user to interact with a particular media provider (e.g., XFINITY Voice Remote).

In some instances, a user may wish to utilize multiple VASes within her home or even using a single device. While it can be useful to enable a single NMD to interact with multiple VASes, providing multiple concurrently enabled VASes can lead to poor user experience in some cases. As a result, in some instances, it may be undesirable to concurrently enable certain combinations of VASes on a single NMD or a within a single media playback system including multiple NMDs. For example, if the wake words associated with two different VASes are too similar, the concurrent operation of the two VASes may lead to errors in which a user intends to interact with one VAS but inadvertently enables the other VAS. As another example, if two different VASes are each configured to control the same external equipment (e.g., two different special-purpose VASes that can control the same household appliance), concurrently enabling both VASes can lead to user frustration as one or the other VAS responds to appliance-specific commands in various situations. In still other cases, enabling concurrent VASes can unduly burden the computational resources of a network microphone device, leading to a reduction in device performance. As another example, certain VASes may themselves impose restrictions on which other VASes can be concurrently enabled on a network microphone device. In these and other instances, it may be useful or necessary to limit which VASes may be concurrently enabled on an NMD or a media playback system including multiple NMDs. Such limitations can include, for example, precluding certain VASes from being concurrently enabled, or limiting an overall number of VASes that can be enabled.

In various examples, a VAS can be considered to be associated with or enabled on an NMD by virtue of having software installed and operational on the NMD that facilitates communication between the NMD and one or more remote computing devices associated with that particular VAS. Additionally or alternatively, the VAS can be considered to be associated with or enabled on an NMD by virtue of an operable wake-word engine running on the NMD that is configured to detect one or more wake words associated with that particular VAS. Additionally, a VAS can be considered to be disassociated with or disabled with respect to the NMD by either being placed in an inactive state (e.g., the software such as the wake-word engine remains on the NMD but is not actively operating to detect wake words in voice input) or by being completely removed (e.g. uninstalled or deleted) from the NMD.

Embodiments of the present technology include a concurrency rules engine that provides concurrency restrictions for VASes associated with one or more NMDs. As used herein, a "concurrency rules engine" may also be referred to as a concurrency policy manager or a concurrency state machine, or any other functional component that facilitates management of various concurrency restrictions for one or more NMDs. In various examples, a concurrency rules engine can be stored locally on an NMD or can be maintained at on or more remote computing devices that are accessible to the NMD via a network connection. In operation, an NMD that is already associated with at least a first VAS may receive a request to be associated with a second VAS (and/or to enable a wake-word engine associated with a second VAS). Following this request, the NMD may access the rules engine to determine whether any concurrency restrictions apply that may prohibit the concurrent enablement of the first and second VASes on the same NMD. If no concurrency restrictions apply, the NMD may proceed to associate with the second VAS, after which the NMD can be concurrently associated with the first VAS and the second VAS. If some concurrency restriction does apply (for example, there is a prohibition of concurrent enablement of both the first VAS and second VAS), the NMD may either disable or otherwise disassociate with the first VAS and enable the second VAS, or the NMD may preclude association with the second VAS and maintain association with the first VAS. In some instances, the concurrency rules engine can include prioritization rules that dictate which VAS will prevail in the event of a concurrency prohibition. In some examples, the most recently selected VAS may prevail in the event of a concurrency restriction. In other examples, the prioritization rules may dictate that a native VAS prevail over a third-party VAS in the event of a concurrency restriction. According to some examples, an indication can be provided to the user regarding which VAS has been enabled and which, if any, has been disabled.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110*a* is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Example Operation Environment

Figure 1B:
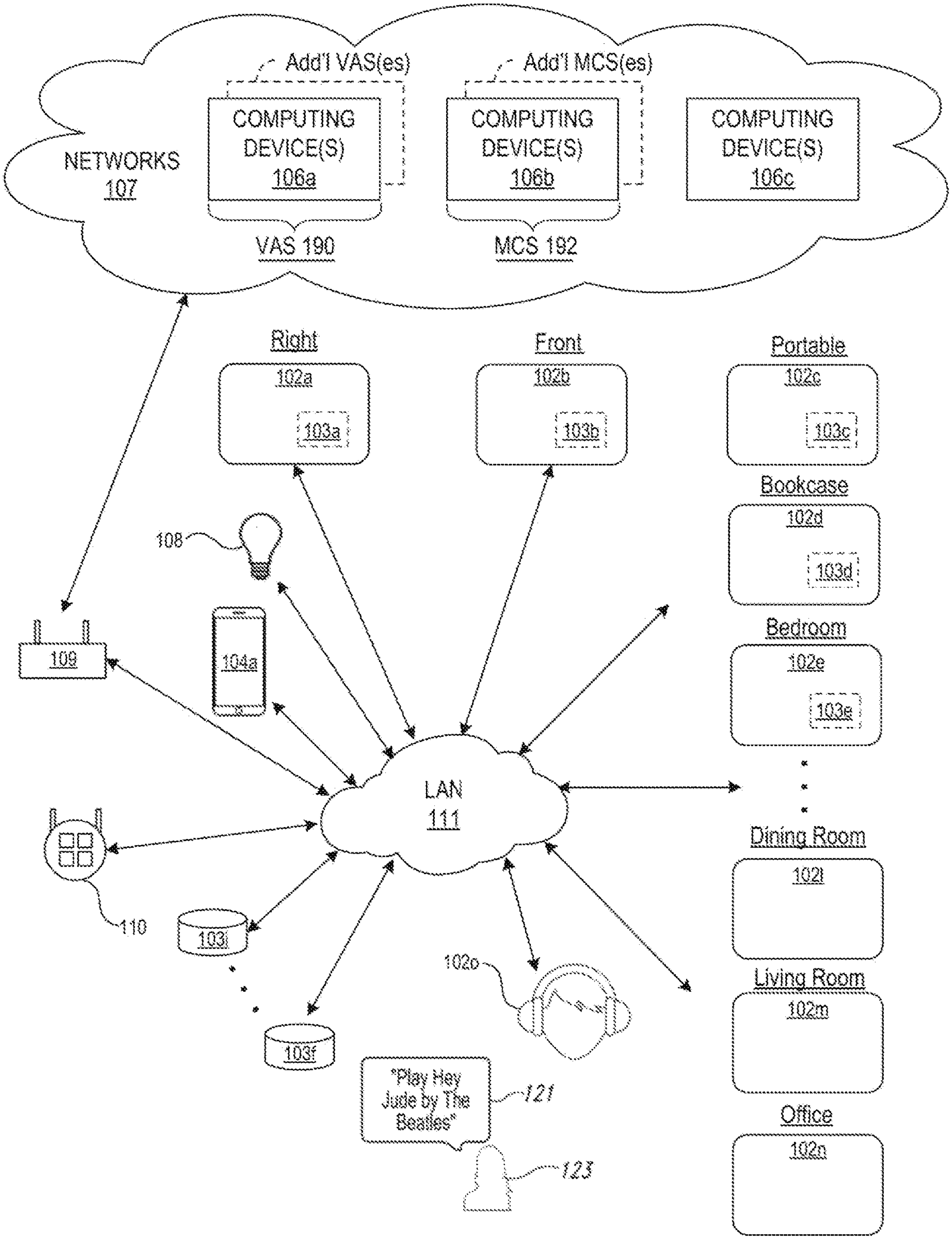
FIG. 1B is a schematic diagram of the media playback system of FIG. 1A and one or more networks.

FIGS. 1A and 1B illustrate an example configuration of a media playback system 100 (or "MPS 100") in which one or more embodiments disclosed herein may be implemented. Referring first to FIG. 1A, the MPS 100 as shown is associated with an example home environment having a plurality of rooms and spaces, which may be collectively referred to as a "home environment," "smart home," or "environment 101." The environment 101 comprises a household having several rooms, spaces, and/or playback zones, including a master bathroom 101*a*, a master bedroom 101*b*, (referred to herein as "Nick's Room"), a second bedroom 101*c*, a family room or den 101*d*, an office 101*e*, a living room 101*f*, a dining room 101*g*, a kitchen 101*h*, and an outdoor patio 101*i*. While certain embodiments and examples are described below in the context of a home environment, the technologies described herein may be implemented in other types of environments. In some examples, for instance, the MPS 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

Within these rooms and spaces, the MPS 100 includes one or more computing devices. Referring to FIGS. 1A and 1B together, such computing devices can include playback devices 102 (identified individually as playback devices 102*a*-102*o*), network microphone devices 103 (identified individually as "NMDs" 103*a*-102*i*), and controller devices 104*a* and 104*b* (collectively "controller devices 104"). Referring to FIG. 1B, the home environment may include additional and/or other computing devices, including local network devices, such as one or more smart illumination devices 108 (FIG. 1B), a smart thermostat 110, and a local computing device 105 (FIG. 1A). In examples described below, one or more of the various playback devices 102 may be configured as portable playback devices, while others may be configured as stationary playback devices. For example, the headphones 102*o* (FIG. 1B) are a portable playback device, while the playback device 102*d* on the bookcase may be a stationary device. As another example, the playback device 102*c* on the Patio may be a battery-powered device, which may allow it to be transported to various areas within the environment 101, and outside of the environment 101, when it is not plugged in to a wall outlet or the like.

With reference still to FIG. 1B, the various playback, network microphone, and controller devices 102, 103, and 104 and/or other network devices of the MPS 100 may be coupled to one another via point-to-point connections and/or over other connections, which may be wired and/or wireless, via a network 111, such as a local area network (LAN) which may include a network router 109. As used herein, a local area network can include any communications technology that is not configured for wide area communications, for example, WiFi, Bluetooth, Digital Enhanced Cordless Telecommunications (DECT), Ultra-WideBand, etc. For example, the playback device 102*j* in the Den 101*d* (FIG. 1A), which may be designated as the "Left" device, may have a point-to-point connection with the playback device 102*a*, which is also in the Den 101*d* and may be designated as the "Right" device. In a related example, the Left playback device 102*j* may communicate with other network devices, such as the playback device 102*b*, which may be designated as the "Front" device, via a point-to-point connection and/or other connections via the NETWORK 111.

As further shown in FIG. 1B, the MPS 100 may be coupled to one or more remote computing devices 106 via a wide area network ("WAN") 107. In some examples, each remote computing device 106 may take the form of one or more cloud servers. The remote computing devices 106 may be configured to interact with computing devices in the environment 101 in various ways. For example, the remote computing devices 106 may be configured to facilitate streaming and/or controlling playback of media content, such as audio, in the home environment 101.

In some implementations, the various playback devices, NMDs, and/or controller devices 102-104 may be communicatively coupled to at least one remote computing device associated with a VAS and at least one remote computing device associated with a media content service ("MCS"). For instance, in the illustrated example of FIG. 1B, remote computing devices 106 are associated with a VAS 190 and remote computing devices 106*b* are associated with an MCS 192. Although only a single VAS 190 and a single MCS 192 are shown in the example of FIG. 1B for purposes of clarity, the MPS 100 may be coupled to multiple, different VASes and/or MCSes. In some implementations, VASes may be operated by one or more of AMAZON, GOOGLE, APPLE, MICROSOFT, SONOS or other voice assistant providers. In some implementations, MCSes may be operated by one or more of SPOTIFY, PANDORA, AMAZON MUSIC, or other media content services.

As further shown in FIG. 1B, the remote computing devices 106 further include remote computing device 106*c* configured to perform certain operations, such as remotely facilitating media playback functions, managing device and system status information, directing communications between the devices of the MPS 100 and one or multiple VASes and/or MCSes, among other operations. In one example, the remote computing devices 106*c* provide cloud servers for one or more SONOS Wireless HiFi Systems.

In various implementations, one or more of the playback devices 102 may take the form of or include an on-board (e.g., integrated) network microphone device. For example, the playback devices 102*a*—e include or are otherwise equipped with corresponding NMDs 103*a*—e, respectively. A playback device that includes or is equipped with an NMD may be referred to herein interchangeably as a playback device or an NMD unless indicated otherwise in the description. In some cases, one or more of the NMDs 103 may be a stand-alone device. For example, the NMDs 103*f* and 103*g* may be stand-alone devices. A stand-alone NMD may omit components and/or functionality that is typically included in a playback device, such as a speaker or related electronics. For instance, in such cases, a stand-alone NMD may not produce audio output or may produce limited audio output (e.g., relatively low-quality audio output).

The various playback and network microphone devices 102 and 103 of the MPS 100 may each be associated with a unique name, which may be assigned to the respective devices by a user, such as during setup of one or more of these devices. For instance, as shown in the illustrated example of FIG. 1B, a user may assign the name "Bookcase" to playback device 102*d* because it is physically situated on a bookcase. Similarly, the NMD 103*f* may be assigned the named "Island" because it is physically situated on an island countertop in the Kitchen 101*h* (FIG. 1A). Some playback devices may be assigned names according to a zone or room, such as the playback devices 102*e*, 102*l*, 102*m*, and 102*n*, which are named "Bedroom," "Dining Room," "Living Room," and "Office," respectively. Further, certain playback devices may have functionally descriptive names. For example, the playback devices 102*a* and 102*b* are assigned the names "Right" and "Front," respectively, because these two devices are configured to provide specific audio channels during media playback in the zone of the Den 101*d* (FIG. 1A). The playback device 102*c* in the Patio may be named portable because it is battery-powered and/or readily transportable to different areas of the environment 101. Other naming conventions are possible.

As discussed above, an NMD may detect and process sound from its environment, such as sound that includes background noise mixed with speech spoken by a person in the NMD's vicinity. For example, as sounds are detected by the NMD in the environment, the NMD may process the detected sound to determine if the sound includes speech that contains voice input intended for the NMD and ultimately a particular VAS. For example, the NMD may identify whether speech includes a wake word associated with a particular VAS.

In the illustrated example of FIG. 1B, the NMDs 103 are configured to interact with the VAS 190 over a network via the network 111 and the router 109. Interactions with the VAS 190 may be initiated, for example, when an NMD identifies in the detected sound a potential wake word. The identification causes a wake-word event, which in turn causes the NMD to begin transmitting detected-sound data to the VAS 190. In some implementations, the various local network devices 102-105 (FIG. 1A) and/or remote computing devices 106*c* of the MPS 100 may exchange various feedback, information, instructions, and/or related data with the remote computing devices associated with the selected VAS. Such exchanges may be related to or independent of transmitted messages containing voice inputs. In some examples, the remote computing device(s) and the MPS 100 may exchange data via communication paths as described herein and/or using a metadata exchange channel as described in U.S. application Ser. No. 15/438,749 filed Feb. 21, 2017, and titled "Voice Control of a Media Playback System," which is herein incorporated by reference in its entirety.

Upon receiving the stream of sound data, the VAS 190 determines if there is voice input in the streamed data from the NMD, and if so the VAS 190 will also determine an underlying intent in the voice input. The VAS 190 may next transmit a response back to the MPS 100, which can include transmitting the response directly to the NMD that caused the wake-word event. The response is typically based on the intent that the VAS 190 determined was present in the voice input. As an example, in response to the VAS 190 receiving a voice input with an utterance to "Play Hey Jude by The Beatles," the VAS 190 may determine that the underlying intent of the voice input is to initiate playback and further determine that intent of the voice input is to play the particular song "Hey Jude." After these determinations, the VAS 190 may transmit a command to a particular MCS 192 to retrieve content (i.e., the song "Hey Jude"), and that MCS 192, in turn, provides (e.g., streams) this content directly to the MPS 100 or indirectly via the VAS 190. In some implementations, the VAS 190 may transmit to the MPS 100 a command that causes the MPS 100 itself to retrieve the content from the MCS 192.

In certain implementations, NMDs may facilitate arbitration amongst one another when voice input is identified in speech detected by two or more NMDs located within proximity of one another. For example, the NMD-equipped playback device 102*d* in the environment 101 (FIG. 1A) is in relatively close proximity to the NMD-equipped Living Room playback device 102*m*, and both devices 102*d* and 102*m* may at least sometimes detect the same sound. In such cases, this may require arbitration as to which device is ultimately responsible for providing detected-sound data to the remote VAS. Examples of arbitrating between NMDs may be found, for example, in previously referenced U.S. application Ser. No. 15/438,749. When performing local command-keyword detection, as described in more detail below, it may be useful to forego or delay any such arbitration, such that two or more NMDs may process the same voice input for command-keyword detection. This can allow results of voice processing of two or more different NMDS to be compared to one another as a way to cross-check keyword detection results. In some examples, results of NLU determinations associated with different NMDs can be used to arbitrate between them. For example, if a first NLU associated with a first NMD identifies a keyword with a higher confidence level than that of a second NLU associated with the second NMD, then the first NMD may be selected over the second NMD.

In certain implementations, an NMD may be assigned to, or otherwise associated with, a designated or default playback device that may not include an NMD. For example, the Island NMD 103*f* in the Kitchen 101*h* (FIG. 1A) may be assigned to the Dining Room playback device 102*l*, which is in relatively close proximity to the Island NMD 103*f*. In practice, an NMD may direct an assigned playback device to play audio in response to a remote VAS receiving a voice input from the NMD to play the audio, which the NMD might have sent to the VAS in response to a user speaking a command to play a certain song, album, playlist, etc. Additional details regarding assigning NMDs and playback devices as designated or default devices may be found, for example, in previously referenced U.S. patent application No.

Further aspects relating to the different components of the example MPS 100 and how the different components may interact to provide a user with a media experience may be found in the following sections. While discussions herein may generally refer to the example MPS 100, technologies described herein are not limited to applications within, among other things, the home environment described above. For instance, the technologies described herein may be useful in other home environment configurations comprising more or fewer of any of the playback, network microphone, and/or controller devices 102-104. For example, the technologies herein may be utilized within an environment having a single playback device 102 and/or a single NMD 103. In some examples of such cases, the NETWORK 111 (FIG. 1B) may be eliminated and the single playback device 102 and/or the single NMD 103 may communicate directly with the remote computing devices 106-*d*. In some examples, a telecommunication network (e.g., an LTE network, a 5G network, etc.) may communicate with the various playback, network microphone, and/or controller devices 102-104 independent of a LAN.

a. Example Playback & Network Microphone Devices

Figure 2A:
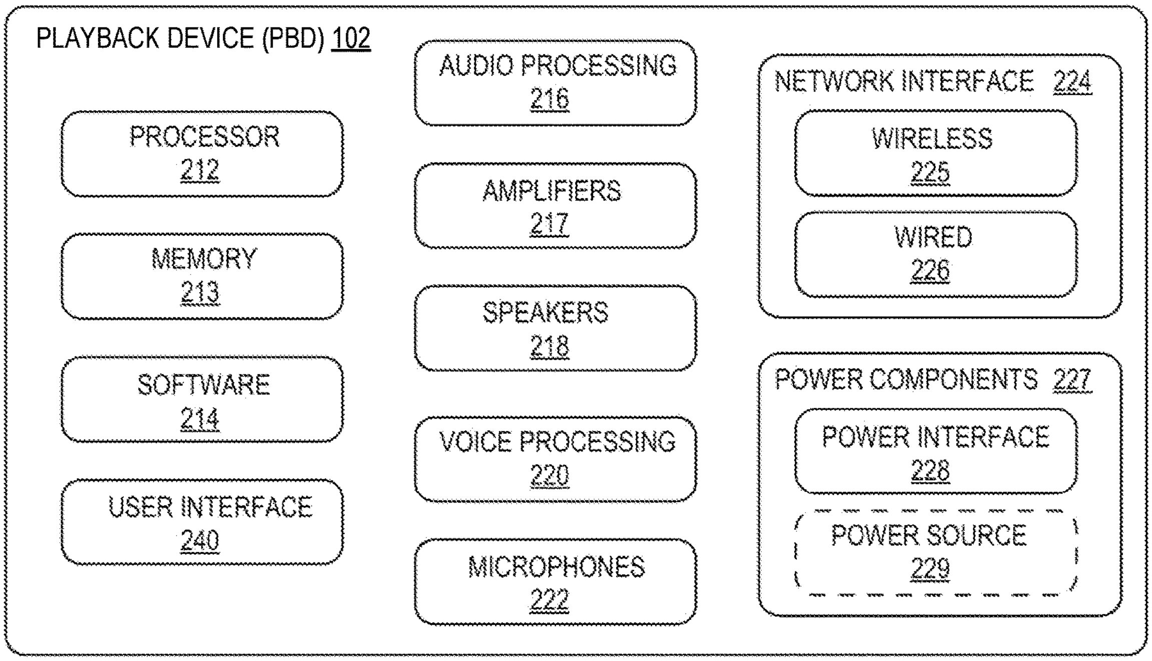
FIG. 2A is a functional block diagram of an example playback device.

FIG. 2A is a functional block diagram illustrating certain aspects of one of the playback devices 102 of the MPS 100 of FIGS. 1A and 1B. As shown, the playback device 102 includes various components, each of which is discussed in further detail below, and the various components of the playback device 102 may be operably coupled to one another via a system bus, communication network, or some other connection mechanism. In the illustrated example of FIG. 2A, the playback device 102 may be referred to as an "NMD-equipped" playback device because it includes components that support the functionality of an NMD, such as one of the NMDs 103 shown in FIG. 1A.

As shown, the playback device 102 includes at least one processor 212, which may be a clock-driven computing component configured to process input data according to instructions stored in memory 213. The memory 213 may be a tangible, non-transitory, computer-readable medium configured to store instructions that are executable by the processor 212. For example, the memory 213 may be data storage that can be loaded with software code 214 that is executable by the processor 212 to achieve certain functions.

In one example, these functions may involve the playback device 102 retrieving audio data from an audio source, which may be another playback device. In another example, the functions may involve the playback device 102 sending audio data, detected-sound data (e.g., corresponding to a voice input), and/or other information to another device on a network via at least one network interface 224. In yet another example, the functions may involve the playback device 102 causing one or more other playback devices to synchronously playback audio with the playback device 102. In yet a further example, the functions may involve the playback device 102 facilitating being paired or otherwise bonded with one or more other playback devices to create a multi-channel audio environment. Numerous other example functions are possible, some of which are discussed below.

As just mentioned, certain functions may involve the playback device 102 synchronizing playback of audio content with one or more other playback devices. During synchronous playback, a listener may not perceive time-delay differences between playback of the audio content by the synchronized playback devices. U.S. Pat. No. 8,234,395 filed on Apr. 4, 2004, and titled "System and method for synchronizing operations among a plurality of independently clocked digital data processing devices," which is hereby incorporated by reference in its entirety, provides in more detail some examples for audio playback synchronization among playback devices.

To facilitate audio playback, the playback device 102 includes audio processing components 216 that are generally configured to process audio prior to the playback device 102 rendering the audio. In this respect, the audio processing components 216 may include one or more digital-to-analog converters ("DAC"), one or more audio preprocessing components, one or more audio enhancement components, one or more digital signal processors ("DSPs"), and so on. In some implementations, one or more of the audio processing components 216 may be a subcomponent of the processor 212. In operation, the audio processing components 216 receive analog and/or digital audio and process and/or otherwise intentionally alter the audio to produce audio signals for playback.

The produced audio signals may then be provided to one or more audio amplifiers 217 for amplification and playback through one or more speakers 218 operably coupled to the amplifiers 217. The audio amplifiers 217 may include components configured to amplify audio signals to a level for driving one or more of the speakers 218.

Each of the speakers 218 may include an individual transducer (e.g., a "driver") or the speakers 218 may include a complete speaker system involving an enclosure with one or more drivers. A particular driver of a speaker 218 may include, for example, a subwoofer (e.g., for low frequencies), a mid-range driver (e.g., for middle frequencies), and/or a tweeter (e.g., for high frequencies). In some cases, a transducer may be driven by an individual corresponding audio amplifier of the audio amplifiers 217. In some implementations, a playback device may not include the speakers 218, but instead may include a speaker interface for connecting the playback device to external speakers. In certain examples, a playback device may include neither the speakers 218 nor the audio amplifiers 217, but instead may include an audio interface (not shown) for connecting the playback device to an external audio amplifier or audio-visual receiver.

In addition to producing audio signals for playback by the playback device 102, the audio processing components 216 may be configured to process audio to be sent to one or more other playback devices, via the network interface 224, for playback. In example scenarios, audio content to be processed and/or played back by the playback device 102 may be received from an external source, such as via an audio line-in interface (e.g., an auto-detecting 3.5 mm audio line-in connection) of the playback device 102 (not shown) or via the network interface 224, as described below.

As shown, the at least one network interface 224, may take the form of one or more wireless interfaces 225 and/or one or more wired interfaces 226. A wireless interface may provide network interface functions for the playback device 102 to wirelessly communicate with other devices (e.g., other playback device(s), NMD(s), and/or controller device(s)) in accordance with a communication protocol (e.g., any wireless standard including IEEE 802.11a, 802.11b, 802.11g, 802.11n, 802.11ac, 802.15, 4G mobile communication standard, and so on). A wired interface may provide network interface functions for the playback device 102 to communicate over a wired connection with other devices in accordance with a communication protocol (e.g., IEEE 802.3). While the network interface 224 shown in FIG. 2A include both wired and wireless interfaces, the playback device 102 may in some implementations include only wireless interface(s) or only wired interface(s).

In general, the network interface 224 facilitates data flow between the playback device 102 and one or more other devices on a data network. For instance, the playback device 102 may be configured to receive audio content over the data network from one or more other playback devices, network devices within a LAN, and/or audio content sources over a WAN, such as the Internet. In one example, the audio content and other signals transmitted and received by the playback device 102 may be transmitted in the form of digital packet data comprising an Internet Protocol (IP)-based source address and IP-based destination addresses. In such a case, the network interface 224 may be configured to parse the digital packet data such that the data destined for the playback device 102 is properly received and processed by the playback device 102.

As shown in FIG. 2A, the playback device 102 also includes voice processing components 220 that are operably coupled to one or more microphones 222. The microphones 222 are configured to detect sound (i.e., acoustic waves) in the environment of the playback device 102, which is then provided to the voice processing components 220. More specifically, each microphone 222 is configured to detect sound and convert the sound into a digital or analog signal representative of the detected sound, which can then cause the voice processing component 220 to perform various functions based on the detected sound, as described in greater detail below. In one implementation, the microphones 222 are arranged as an array of microphones (e.g., an array of six microphones). In some implementations, the playback device 102 includes more than six microphones (e.g., eight microphones or twelve microphones) or fewer than six microphones (e.g., four microphones, two microphones, or a single microphones).

In operation, the voice-processing components 220 are generally configured to detect and process sound received via the microphones 222, identify potential voice input in the detected sound, and extract detected-sound data to enable a VAS, such as the VAS 190 (FIG. 1B), to process voice input identified in the detected-sound data. The voice processing components 220 may include one or more analog-to-digital converters, an acoustic echo canceller ("AEC"), a spatial processor (e.g., one or more multi-channel Wiener filters, one or more other filters, and/or one or more beam former components), one or more buffers (e.g., one or more circular buffers), one or more wake-word engines, one or more voice extractors, and/or one or more speech processing components (e.g., components configured to recognize a voice of a particular user or a particular set of users associated with a household), among other example voice processing components. In example implementations, the voice processing components 220 may include or otherwise take the form of one or more DSPs or one or more modules of a DSP. In this respect, certain voice processing components 220 may be configured with particular parameters (e.g., gain and/or spectral parameters) that may be modified or otherwise tuned to achieve particular functions. In some implementations, one or more of the voice processing components 220 may be a subcomponent of the processor 212.

As further shown in FIG. 2A, the playback device 102 also includes power components 227. The power components 227 include at least an external power source interface 228, which may be coupled to a power source (not shown) via a power cable or the like that physically connects the playback device 102 to an electrical outlet or some other external power source. Other power components may include, for example, transformers, converters, and like components configured to format electrical power.

In some implementations, the power components 227 of the playback device 102 may additionally include an internal power source 229 (e.g., one or more batteries) configured to power the playback device 102 without a physical connection to an external power source. When equipped with the internal power source 229, the playback device 102 may operate independent of an external power source. In some such implementations, the external power source interface 228 may be configured to facilitate charging the internal power source 229. As discussed before, a playback device comprising an internal power source may be referred to herein as a "portable playback device." On the other hand, a playback device that operates using an external power source may be referred to herein as a "stationary playback device," although such a device may in fact be moved around a home or other environment.

The playback device 102 further includes a user interface 240 that may facilitate user interactions independent of or in conjunction with user interactions facilitated by one or more of the controller devices 104. In various examples, the user interface 240 includes one or more physical buttons and/or supports graphical interfaces provided on touch sensitive screen(s) and/or surface(s), among other possibilities, for a user to directly provide input. The user interface 240 may further include one or more of lights (e.g., LEDs) and the speakers to provide visual and/or audio feedback to a user.

Figure 2B:
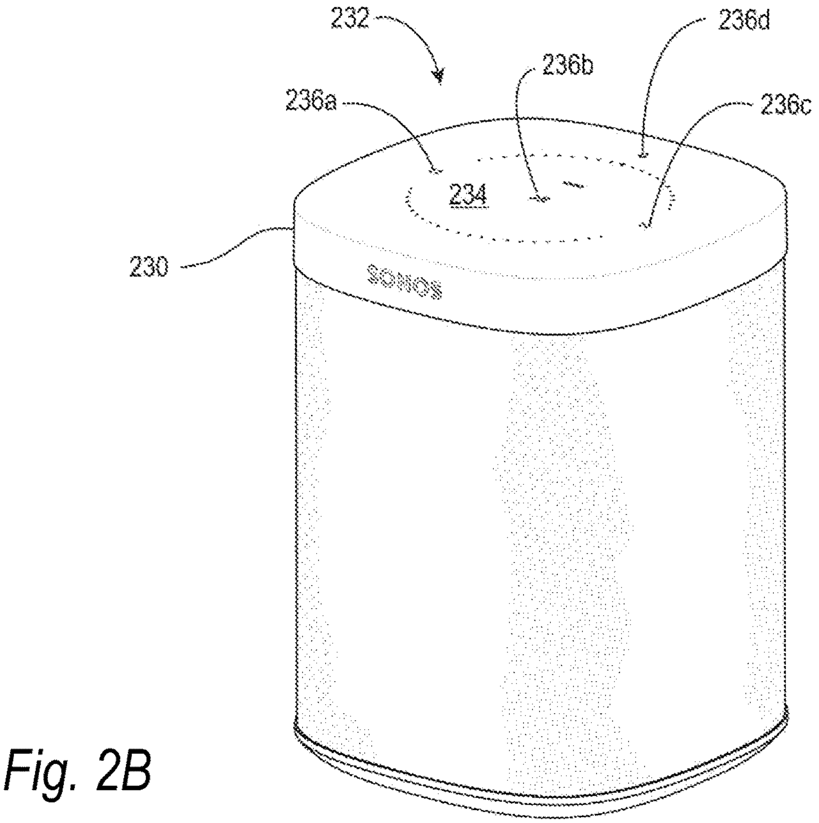
FIG. 2B is an isometric diagram of an example housing of the playback device of FIG. 2A.

As an illustrative example, FIG. 2B shows an example housing 230 of the playback device 102 that includes a user interface in the form of a control area 232 at a top portion 234 of the housing 230. The control area 232 includes buttons 236*a-c* for controlling audio playback, volume level, and other functions. The control area 232 also includes a button 236*d* for toggling the microphones 222 to either an on state or an off state.

As further shown in FIG. 2B, the control area 232 is at least partially surrounded by apertures formed in the top portion 234 of the housing 230 through which the microphones 222 (not visible in FIG. 2B) receive the sound in the environment of the playback device 102. The microphones 222 may be arranged in various positions along and/or within the top portion 234 or other areas of the housing 230 so as to detect sound from one or more directions relative to the playback device 102.

By way of illustration, SONOS, Inc. presently offers (or has offered) for sale certain playback devices that may implement certain of the examples disclosed herein, including a "SONOS ONE," "PLAY:5," "BEAM," "ARC," "SUB," and "CONNECT." Any other past, present, and/or future playback devices may additionally or alternatively be used to implement the playback devices of examples disclosed herein. Additionally, it should be understood that a playback device is not limited to the examples illustrated in FIG. 2A or 2B or to the SONOS product offerings. For example, a playback device may include, or otherwise take the form of, a wired or wireless headphone set, which may operate as a part of the MPS 100 via a network interface or the like. In another example, a playback device may include or interact with a docking station for personal mobile media playback devices. In yet another example, a playback device may be integral to another device or component such as a television, a lighting fixture, or some other device for indoor or outdoor use.

Figure 2C:
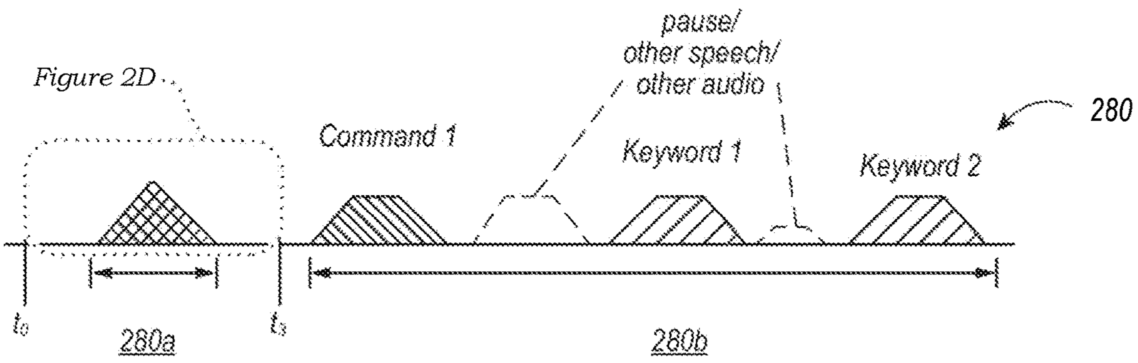
FIG. 2C is a diagram of an example voice input.

FIG. 2C is a diagram of an example voice input 280 that may be processed by an NMD or an NMD-equipped playback device. The voice input 280 may include a keyword portion 280*a* and an utterance portion 280*b*. The keyword portion 280*a* may include a wake word or a command keyword. In the case of a wake word, the keyword portion 280*a* corresponds to detected sound that caused a command-keyword event. The utterance portion 280*b* corresponds to detected sound that potentially comprises a user request following the keyword portion 280*a*. An utterance portion 280*b* can be processed to identify the presence of any words in detected-sound data by the NMD in response to the event caused by the keyword portion 280*a*. In various implementations, an underlying intent can be determined based on the words in the utterance portion 280*b*. In certain implementations, an underlying intent can also be based or at least partially based on certain words in the keyword portion 280*a*, such as when keyword portion includes a command keyword. In any case, the words may correspond to one or more commands, as well as a certain command and certain keywords. A keyword in the voice utterance portion 280*b* may be, for example, a word identifying a particular device or group in the MPS 100. For instance, in the illustrated example, the keywords in the voice utterance portion 280*b* may be one or more words identifying one or more zones in which the music is to be played, such as the Living Room and the Dining Room (FIG. 1A). In some cases, the utterance portion 280*b* may include additional information, such as detected pauses (e.g., periods of non-speech) between words spoken by a user, as shown in FIG. 2C. The pauses may demarcate the locations of separate commands, keywords, or other information spoke by the user within the utterance portion 280*b*.

Based on certain command criteria, the NMD and/or a remote VAS may take actions as a result of identifying one or more commands in the voice input. Command criteria may be based on the inclusion of certain keywords within the voice input, among other possibilities. Additionally, or alternatively, command criteria for commands may involve identification of one or more control-state and/or zone-state variables in conjunction with identification of one or more particular commands. Control-state variables may include, for example, indicators identifying a level of volume, a queue associated with one or more devices, and playback state, such as whether devices are playing a queue, paused, etc. Zone-state variables may include, for example, indicators identifying which, if any, zone players are grouped.

In some implementations, the MPS 100 is configured to temporarily reduce the volume of audio content that it is playing upon detecting a certain keyword, such as a wake word, in the keyword portion 280*a*. The MPS 100 may restore the volume after processing the voice input 280. Such a process can be referred to as ducking, examples of which are disclosed in U.S. patent application Ser. No. 15/438,749, incorporated by reference herein in its entirety.

Figure 2D:
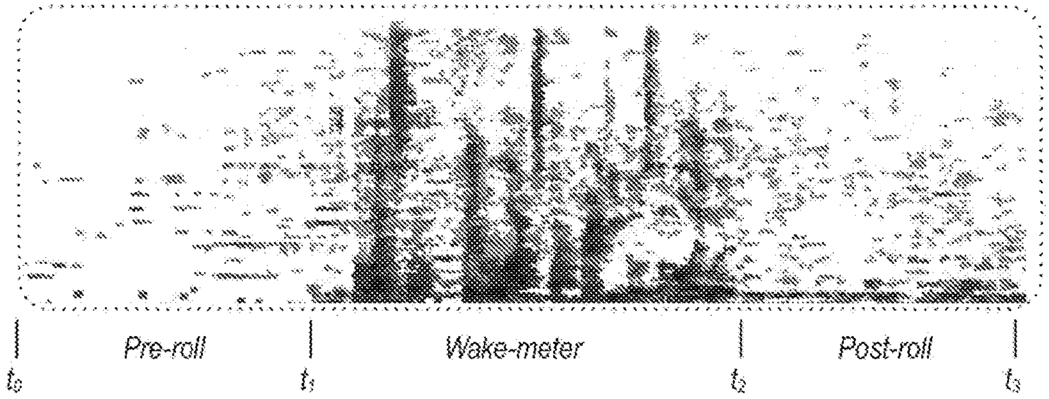
FIG. 2D is a graph depicting an example sound specimen in accordance with aspects of the disclosure.

FIG. 2D shows an example sound specimen. In this example, the sound specimen corresponds to the sound-data stream (e.g., one or more audio frames) associated with a spotted wake word or command keyword in the keyword portion 280*a* of FIG. 2A. As illustrated, the example sound specimen comprises sound detected in an NMD's environment (i) immediately before a wake or command word was spoken, which may be referred to as a pre-roll portion (between times $t_0$ and $t_1$), (ii) while a wake or command word was spoken, which may be referred to as a wake-meter portion (between times $t_1$ and $t_2$), and/or (iii) after the wake or command word was spoken, which may be referred to as a post-roll portion (between times $t_2$ and $t_3$). Other sound specimens are also possible. In various implementations, aspects of the sound specimen can be evaluated according to an acoustic model which aims to map mels/spectral features to phonemes in a given language model for further processing. For example, automatic speech recognition (ASR) may include such mapping for keyword detection. Wake-word detection engines, by contrast, may be precisely tuned to identify a specific wake-word, and a downstream action of invoking a VAS (e.g., by targeting only nonce words in the voice input processed by the playback device).

ASR for command keyword detection may be tuned to accommodate a wide range of keywords (e.g., 5, 10, 100, 1,000, 10,000 keywords). Command-keyword detection, in contrast to wake-word detection, may involve feeding ASR output to an onboard, local NLU which together with the ASR determine when command-keyword events have occurred. In some implementations described below, the local NLU may determine an intent based on one or more other keywords in the ASR output produced by a particular voice input. In these or other implementations, a playback device may act on a detected command-keyword event only when the playback devices determines that certain conditions have been met, such as environmental conditions (e.g., low background noise). In some examples, multiple devices within a single media playback system may have different onboard, local ASRs and/or NLUs, for example supporting different libraries of keywords.

b. Example Playback Device Configurations

Figure 3B:
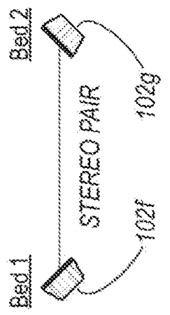
FIGS. 3A, 3B, 3C, 3D and 3E are diagrams showing example playback device configurations in accordance with aspects of the disclosure.
Figure 3C:
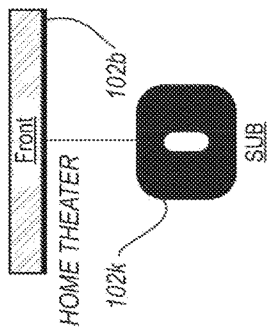
Figure 3D:
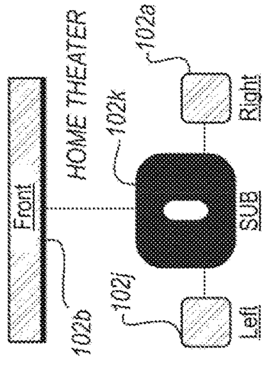
Figure 3E:
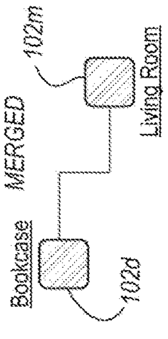
Figure 3A:
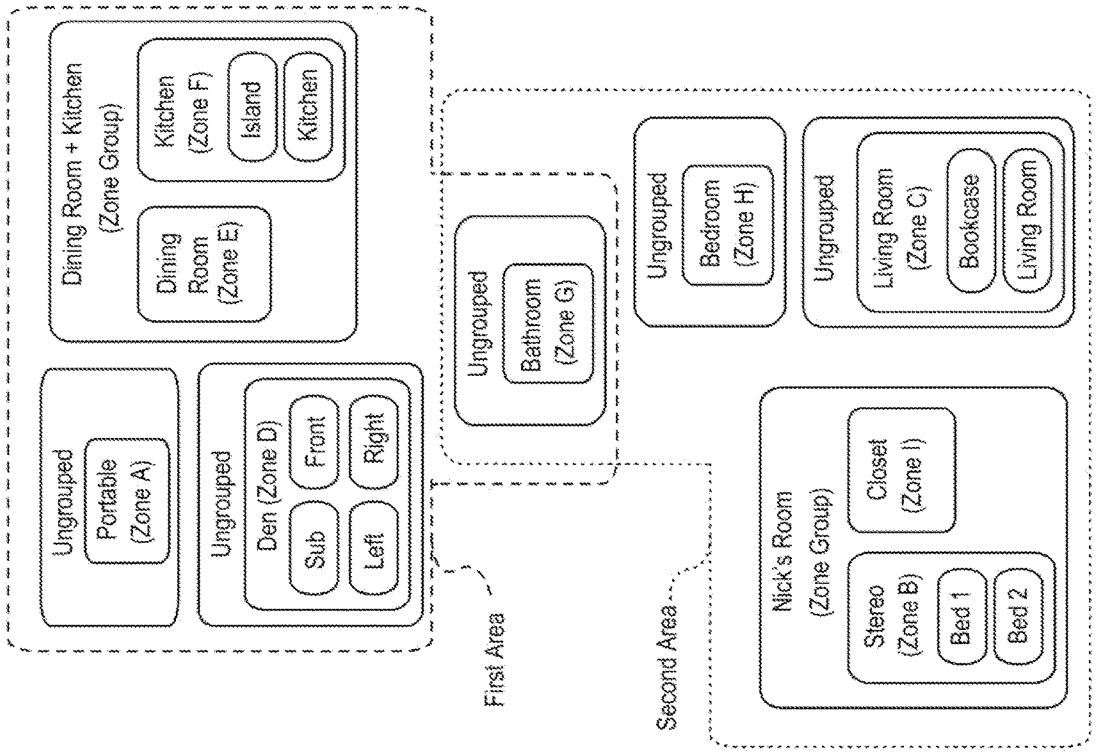

FIGS. 3A-3E show example configurations of playback devices. Referring first to FIG. 3A, in some example instances, a single playback device may belong to a zone. For example, the playback device 102*c* (FIG. 1A) on the Patio may belong to Zone A. In some implementations described below, multiple playback devices may be "bonded" to form a "bonded pair," which together form a single zone. For example, the playback device 102*f* (FIG. 1A) named "Bed 1" in FIG. 3A may be bonded to the playback device 102*g* (FIG. 1A) named "Bed 2" in FIG. 3A to form Zone B. Bonded playback devices may have different playback responsibilities (e.g., channel responsibilities). In another implementation described below, multiple playback devices may be merged to form a single zone. For example, the playback device 102*d* named "Bookcase" may be merged with the playback device 102*m* named "Living Room" to form a single Zone C. The merged playback devices 102*d* and 102*m* may not be specifically assigned different playback responsibilities. That is, the merged playback devices 102*d* and 102*m* may, aside from playing audio content in synchrony, each play audio content as they would if they were not merged.

For purposes of control, each zone in the MPS 100 may be represented as a single user interface ("UI") entity. For example, as displayed by the controller devices 104, Zone A may be provided as a single entity named "Portable," Zone B may be provided as a single entity named "Stereo," and Zone C may be provided as a single entity named "Living Room."

In various examples, a zone may take on the name of one of the playback devices belonging to the zone. For example, Zone C may take on the name of the Living Room device 102*m* (as shown). In another example, Zone C may instead take on the name of the Bookcase device 102*d*. In a further example, Zone C may take on a name that is some combination of the Bookcase device 102*d* and Living Room device 102*m*. The name that is chosen may be selected by a user via inputs at a controller device 104. In some examples, a zone may be given a name that is different than the device(s) belonging to the zone. For example, Zone B in FIG. 3A is named "Stereo" but none of the devices in Zone B have this name. In one aspect, Zone B is a single UI entity representing a single device named "Stereo," composed of constituent devices "Bed 1" and "Bed 2." In one implementation, the Bed 1 device may be playback device 102*f* in the master bedroom 101*b* (FIG. 1A) and the Bed 2 device may be the playback device 102*g* also in the master bedroom 101*h* (FIG. 1A).

As noted above, playback devices that are bonded may have different playback responsibilities, such as playback responsibilities for certain audio channels. For example, as shown in FIG. 3B, the Bed 1 and Bed 2 devices 102*f* and 102*g* may be bonded so as to produce or enhance a stereo effect of audio content. In this example, the Bed 1 playback device 102*f* may be configured to play a left channel audio component, while the Bed 2 playback device 102*g* may be configured to play a right channel audio component. In some implementations, such stereo bonding may be referred to as "pairing."

Additionally, playback devices that are configured to be bonded may have additional and/or different respective speaker drivers. As shown in FIG. 3C, the playback device 102*b* named "Front" may be bonded with the playback device 102*k* named "SUB." The Front device 102*b* may render a range of mid to high frequencies, and the SUB device 102*k* may render low frequencies as, for example, a subwoofer. When unbonded, the Front device 102*b* may be configured to render a full range of frequencies. As another example, FIG. 3D shows the Front and SUB devices 102*b* and 102*k* further bonded with Right and Left playback devices 102*a* and 102*j*, respectively. In some implementations, the Right and Left devices 102*a* and 102*j* may form surround or "satellite" channels of a home theater system. The bonded playback devices 102a, 102b, 102j, and 102k may form a single Zone D (FIG. 3A).

In some implementations, playback devices may also be "merged." In contrast to certain bonded playback devices, playback devices that are merged may not have assigned playback responsibilities, but may each render the full range of audio content that each respective playback device is capable of Nevertheless, merged devices may be represented as a single UI entity (i.e., a zone, as discussed above). For instance, FIG. 3E shows the playback devices 102d and 102m in the Living Room merged, which would result in these devices being represented by the single UI entity of Zone C. In one example, the playback devices 102d and 102m may playback audio in synchrony, during which each outputs the full range of audio content that each respective playback device 102d and 102m is capable of rendering.

In some examples, a stand-alone NMD may be in a zone by itself. For example, the NMD 103h from FIG. 1A is named "Closet" and forms Zone I in FIG. 3A. An NMD may also be bonded or merged with another device so as to form a zone. For example, the NMD 103f named "Island" may be bonded with the playback device 102i Kitchen, which together form Zone F, which is also named "Kitchen." Additional details regarding assigning NMDs and playback devices as designated or default devices may be found, for example, in previously referenced U.S. patent application Ser. No. 15/438,749. In some examples, a stand-alone NMD may not be assigned to a zone.

Zones of individual, bonded, and/or merged devices may be arranged to form a set of playback devices that playback audio in synchrony. Such a set of playback devices may be referred to as a "group," "zone group," "synchrony group," or "playback group." In response to inputs provided via a controller device 104, playback devices may be dynamically grouped and ungrouped to form new or different groups that synchronously play back audio content. For example, referring to FIG. 3A, Zone A may be grouped with Zone B to form a zone group that includes the playback devices of the two zones. As another example, Zone A may be grouped with one or more other Zones C-I. The Zones A-I may be grouped and ungrouped in numerous ways. For example, three, four, five, or more (e.g., all) of the Zones A-I may be grouped. When grouped, the zones of individual and/or bonded playback devices may play back audio in synchrony with one another, as described in previously referenced U.S. Pat. No. 8,234,395. Grouped and bonded devices are example types of associations between portable and stationary playback devices that may be caused in response to a trigger event, as discussed above and described in greater detail below.

In various implementations, the zones in an environment may be assigned a particular name, which may be the default name of a zone within a zone group or a combination of the names of the zones within a zone group, such as "Dining Room+Kitchen," as shown in FIG. 3A. In some examples, a zone group may be given a unique name selected by a user, such as "Nick's Room," as also shown in FIG. 3A. The name "Nick's Room" may be a name chosen by a user over a prior name for the zone group, such as the room name "Master Bedroom."

Referring back to FIG. 2A, certain data may be stored in the memory 213 as one or more state variables that are periodically updated and used to describe the state of a playback zone, the playback device(s), and/or a zone group associated therewith. The memory 213 may also include the data associated with the state of the other devices of the MPS 100, which may be shared from time to time among the devices so that one or more of the devices have the most recent data associated with the system.

In some examples, the memory 213 of the playback device 102 may store instances of various variable types associated with the states. Variables instances may be stored with identifiers (e.g., tags) corresponding to type. For example, certain identifiers may be a first type "a1" to identify playback device(s) of a zone, a second type "b1" to identify playback device(s) that may be bonded in the zone, and a third type "c1" to identify a zone group to which the zone may belong. As a related example, in FIG. 1A, identifiers associated with the Patio may indicate that the Patio is the only playback device of a particular zone and not in a zone group. Identifiers associated with the Living Room may indicate that the Living Room is not grouped with other zones but includes bonded playback devices 102a, 102b, 102j, and 102k. Identifiers associated with the Dining Room may indicate that the Dining Room is part of Dining Room+Kitchen group and that devices 103f and 102i are bonded. Identifiers associated with the Kitchen may indicate the same or similar information by virtue of the Kitchen being part of the Dining Room+Kitchen zone group. Other example zone variables and identifiers are described below.

In yet another example, the MPS 100 may include variables or identifiers representing other associations of zones and zone groups, such as identifiers associated with Areas, as shown in FIG. 3A. An Area may involve a cluster of zone groups and/or zones not within a zone group. For instance, FIG. 3A shows a first area named "First Area" and a second area named "Second Area." The First Area includes zones and zone groups of the Patio, Den, Dining Room, Kitchen, and Bathroom. The Second Area includes zones and zone groups of the Bathroom, Nick's Room, Bedroom, and Living Room. In one aspect, an Area may be used to invoke a cluster of zone groups and/or zones that share one or more zones and/or zone groups of another cluster. In this respect, such an Area differs from a zone group, which does not share a zone with another zone group. Further examples of techniques for implementing Areas may be found, for example, in U.S. application Ser. No. 15/682,506 filed Aug. 21, 2017 and titled "Room Association Based on Name," and U.S. Pat. No. 8,483,853 filed Sep. 11, 2007, and titled "Controlling and manipulating groupings in a multi-zone media system." Each of these applications is incorporated herein by reference in its entirety. In some examples, the MPS 100 may not implement Areas, in which case the system may not store variables associated with Areas.

The memory 213 may be further configured to store other data. Such data may pertain to audio sources accessible by the playback device 102 or a playback queue that the playback device (or some other playback device(s)) may be associated with. In examples described below, the memory 213 is configured to store a set of command data for selecting a particular VAS when processing voice inputs. During operation, one or more playback zones in the environment of FIG. 1A may each be playing different audio content. For instance, the user may be grilling in the Patio zone and listening to hip hop music being played by the playback device 102c, while another user may be preparing food in the Kitchen zone and listening to classical music being played by the playback device 102i. In another example, a playback zone may play the same audio content in synchrony with another playback zone.

For instance, the user may be in the Office zone where the playback device 102n is playing the same hip-hop music that is being playing by playback device 102c in the Patio zone.

In such a case, playback devices 102*c* and 102*n* may be playing the hip-hop in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the MPS 100 may be dynamically modified. As such, the MPS 100 may support numerous configurations. For example, if a user physically moves one or more playback devices to or from a zone, the MPS 100 may be reconfigured to accommodate the change(s). For instance, if the user physically moves the playback device 102*c* from the Patio zone to the Office zone, the Office zone may now include both the playback devices 102*c* and 102*n*. In some cases, the user may pair or group the moved playback device 102*c* with the Office zone and/or rename the players in the Office zone using, for example, one of the controller devices 104 and/or voice input. As another example, if one or more playback devices 102 are moved to a particular space in the home environment that is not already a playback zone, the moved playback device(s) may be renamed or associated with a playback zone for the particular space.

Further, different playback zones of the MPS 100 may be dynamically combined into zone groups or split up into individual playback zones. For example, the Dining Room zone and the Kitchen zone may be combined into a zone group for a dinner party such that playback devices 102*i* and 102*l* may render audio content in synchrony. As another example, bonded playback devices in the Den zone may be split into (i) a television zone and (ii) a separate listening zone. The television zone may include the Front playback device 102*b*. The listening zone may include the Right, Left, and SUB playback devices 102*a*, 102*j*, and 102*k*, which may be grouped, paired, or merged, as described above. Splitting the Den zone in such a manner may allow one user to listen to music in the listening zone in one area of the living room space, and another user to watch the television in another area of the living room space. In a related example, a user may utilize either of the NMD 103*a* or 103*b* (FIG. 1B) to control the Den zone before it is separated into the television zone and the listening zone. Once separated, the listening zone may be controlled, for example, by a user in the vicinity of the NMD 103*a*, and the television zone may be controlled, for example, by a user in the vicinity of the NMD 103*b*. As described above, however, any of the NMDs 103 may be configured to control the various playback and other devices of the MPS 100.

c. Example Controller Devices

Figure 4:
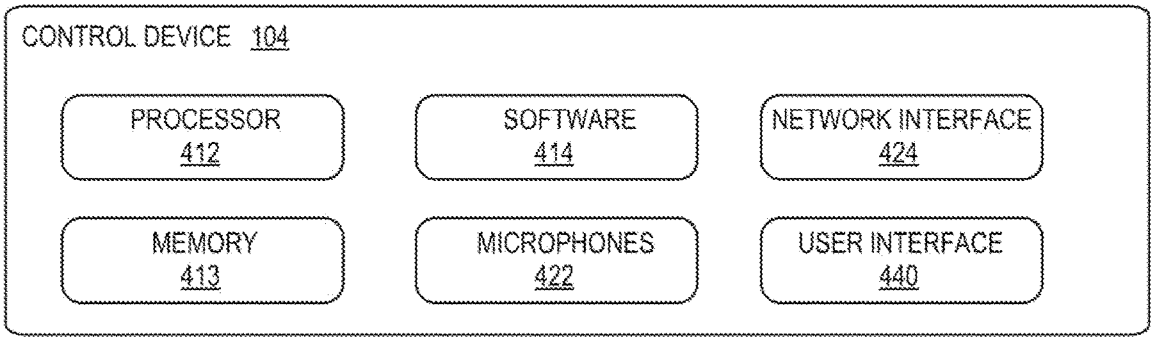
FIG. 4 is a functional block diagram of an example controller device in accordance with aspects of the disclosure.

FIG. 4 is a functional block diagram illustrating certain aspects of a selected one of the controller devices 104 of the MPS 100 of FIG. 1A. Such controller devices may also be referred to herein as a “control device” or “controller.” The controller device shown in FIG. 4 may include components that are generally similar to certain components of the network devices described above, such as a processor 412, memory 413 storing program software 414, at least one network interface 424, and one or more microphones 422. In one example, a controller device may be a dedicated controller for the MPS 100. In another example, a controller device may be a network device on which media playback system controller application software may be installed, such as for example, an iPhone™, iPad™ or any other smart phone, tablet, or network device (e.g., a networked computer such as a PC or Mac™).

The memory 413 of the controller device 104 may be configured to store controller application software and other data associated with the MPS 100 and/or a user of the system 100. The memory 413 may be loaded with instructions in software 414 that are executable by the processor 412 to achieve certain functions, such as facilitating user access, control, and/or configuration of the MPS 100. The controller device 104 is configured to communicate with other network devices via the network interface 424, which may take the form of a wireless interface, as described above.

In one example, system information (e.g., such as a state variable) may be communicated between the controller device 104 and other devices via the network interface 424. For instance, the controller device 104 may receive playback zone and zone group configurations in the MPS 100 from a playback device, an NMD, or another network device. Likewise, the controller device 104 may transmit such system information to a playback device or another network device via the network interface 424. In some cases, the other network device may be another controller device.

The controller device 104 may also communicate playback device control commands, such as volume control and audio playback control, to a playback device via the network interface 424. As suggested above, changes to configurations of the MPS 100 may also be performed by a user using the controller device 104. The configuration changes may include adding/removing one or more playback devices to/from a zone, adding/removing one or more zones to/from a zone group, forming a bonded or merged player, separating one or more playback devices from a bonded or merged player, among others.

Figure 5A:
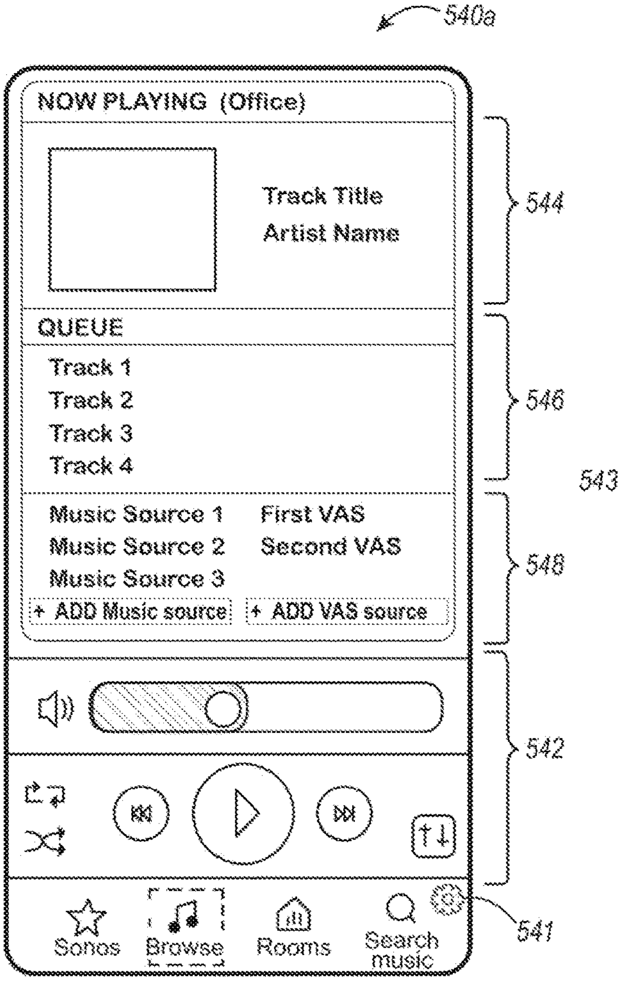
FIGS. 5A and 5B are controller interfaces in accordance with aspects of the disclosure.
Figure 5B:
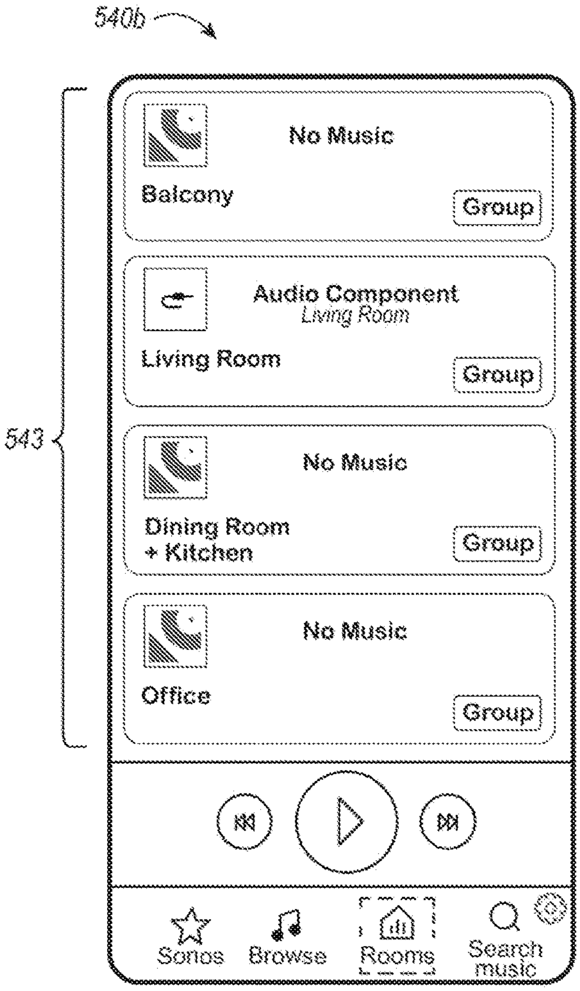

As shown in FIG. 4, the controller device 104 also includes a user interface 440 that is generally configured to facilitate user access and control of the MPS 100. The user interface 440 may include a touch-screen display or other physical interface configured to provide various graphical controller interfaces, such as the controller interfaces 540*a* and 540*b* shown in FIGS. 5A and 5B. Referring to FIGS. 5A and 5B together, the controller interfaces 540*a* and 540*b* includes a playback control region 542, a playback zone region 543, a playback status region 544, a playback queue region 546, and a sources region 548. The user interface as shown is just one example of an interface that may be provided on a network device, such as the controller device shown in FIG. 4, and accessed by users to control a media playback system, such as the MPS 100. Other user interfaces of varying formats, styles, and interactive sequences may alternatively be implemented on one or more network devices to provide comparable control access to a media playback system.

The playback control region 542 (FIG. 5A) may include selectable icons (e.g., by way of touch or by using a cursor) that, when selected, cause playback devices in a selected playback zone or zone group to play or pause, fast forward, rewind, skip to next, skip to previous, enter/exit shuffle mode, enter/exit repeat mode, enter/exit cross fade mode, etc. The playback control region 542 may also include selectable icons that, when selected, modify equalization settings and/or playback volume, among other possibilities.

The playback zone region 543 (FIG. 5B) may include representations of playback zones within the MPS 100. The playback zones regions 543 may also include a representation of zone groups, such as the Dining Room+Kitchen zone group, as shown.

In some examples, the graphical representations of playback zones may be selectable to bring up additional selectable icons to manage or configure the playback zones in the MPS 100, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the MPS 100 to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface are also possible. The representations of playback zones in the playback zone region 543 (FIG. 5B) may be dynamically updated as playback zone or zone group configurations are modified.

The playback status region 544 (FIG. 5A) may include graphical representations of audio content that is presently being played, previously played, or scheduled to play next in the selected playback zone or zone group. The selected playback zone or zone group may be visually distinguished on a controller interface, such as within the playback zone region 543 and/or the playback status region 544. The graphical representations may include track title, artist name, album name, album year, track length, and/or other relevant information that may be useful for the user to know when controlling the MPS 100 via a controller interface.

The playback queue region 546 may include graphical representations of audio content in a playback queue associated with the selected playback zone or zone group. In some examples, each playback zone or zone group may be associated with a playback queue comprising information corresponding to zero or more audio items for playback by the playback zone or zone group. For instance, each audio item in the playback queue may comprise a uniform resource identifier (URI), a uniform resource locator (URL), or some other identifier that may be used by a playback device in the playback zone or zone group to find and/or retrieve the audio item from a local audio content source or a networked audio content source, which may then be played back by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streamed audio content, such as Internet radio that may continue to play until otherwise stopped, rather than discrete audio items that have playback durations. In an alternative example, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue or may be associated with a new playback queue that is empty or contains audio items from the playback queue associated with the established zone group before the established zone group was ungrouped. Similarly, the resulting second playback zone may be re-associated with the previous second playback queue or may be associated with a new playback queue that is empty or contains audio items from the playback queue associated with the established zone group before the established zone group was ungrouped. Other examples are also possible.

With reference still to FIGS. 5A and 5B, the graphical representations of audio content in the playback queue region 646 (FIG. 5A) may include track titles, artist names, track lengths, and/or other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device. Playback of such a playback queue may involve one or more playback devices playing back media items of the queue, perhaps in sequential or random order.

The sources region 548 may include graphical representations of selectable audio content sources and/or selectable voice assistants associated with a corresponding VAS. The VASes may be selectively assigned. In some examples, multiple VASes, such as AMAZON's Alexa, MICROSOFT's Cortana, etc., may be invokable by the same NMD. In some examples, a user may assign a VAS exclusively to one or more NMDs. For example, a user may assign a first VAS to one or both of the playback devices 102*a* and 102*b* in the Living Room shown in FIG. 1A, and a second VAS to the NMD 103*f* in the Kitchen. Other examples are possible.

d. Example Audio Content Sources

The audio sources in the sources region 548 may be audio content sources from which audio content may be retrieved and played by the selected playback zone or zone group. One or more playback devices in a zone or zone group may be configured to retrieve for playback audio content (e.g., according to a corresponding URI or URL for the audio content) from a variety of available audio content sources. In one example, audio content may be retrieved by a playback device directly from a corresponding audio content source (e.g., via a line-in connection). In another example, audio content may be provided to a playback device over a network via one or more other playback devices or network devices. As described in greater detail below, in some examples, audio content may be provided by one or more media content services.

Example audio content sources may include a memory of one or more playback devices in a media playback system such as the MPS 100 of FIG. 1, local music libraries on one or more network devices (e.g., a controller device, a network-enabled personal computer, or a networked-attached storage ("NAS")), streaming audio services providing audio content via the Internet (e.g., cloud-based music services), or audio sources connected to the media playback system via a line-in input connection on a playback device or network device, among other possibilities.

In some examples, audio content sources may be added or removed from a media playback system such as the MPS 100 of FIG. 1A. In one example, an indexing of audio items may be performed whenever one or more audio content sources are added, removed, or updated. Indexing of audio items may involve scanning for identifiable audio items in all folders/directories shared over a network accessible by playback devices in the media playback system and generating or updating an audio content database comprising metadata (e.g., title, artist, album, track length, among others) and other associated information, such as a URI or URL for each identifiable audio item found. Other examples for managing and maintaining audio content sources may also be possible.

Figure 6:
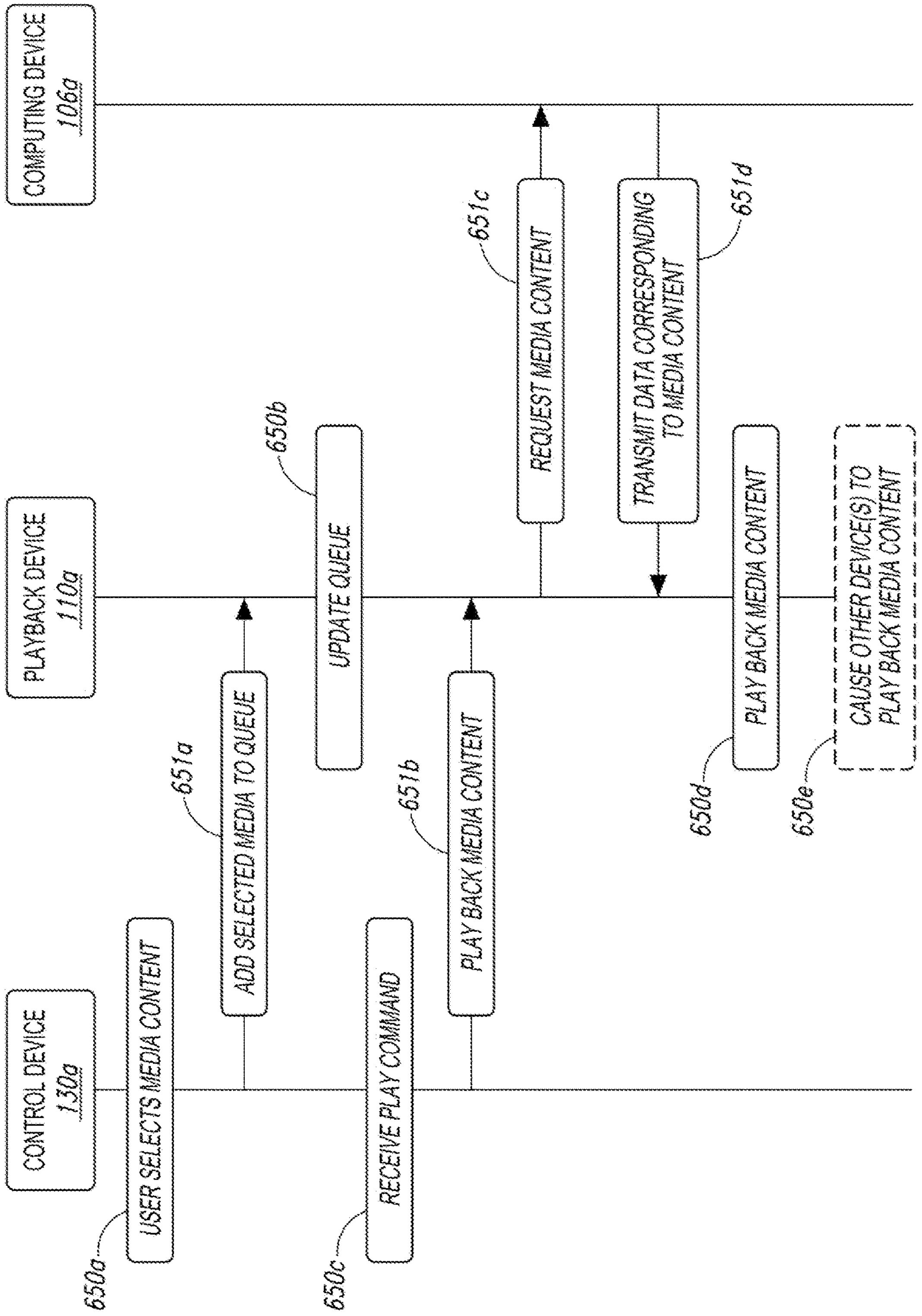
FIG. 6 is a message flow diagram of a media playback system.

FIG. 6 is a message flow diagram illustrating data exchanges between devices of the MPS 100. At step 650*a*, the MPS 100 receives an indication of selected media content (e.g., one or more songs, albums, playlists, podcasts, videos, stations) via the control device 104. The selected media content can comprise, for example, media items stored locally on or more devices (e.g., the audio source 105 of FIG. 1C) connected to the media playback system and/or media items stored on one or more media service servers (one or more of the remote computing devices 106 of FIG. 1B). In response to receiving the indication of the selected media content, the control device 104 transmits a message 651*a* to the playback device 102 (FIGS. 1A-1C) to add the selected media content to a playback queue on the playback device 102.

At step 650*b*, the playback device 102 receives the message 651*a* and adds the selected media content to the playback queue for play back.

At step 650*c*, the control device 104 receives input corresponding to a command to play back the selected media content. In response to receiving the input corresponding to the command to play back the selected media content, the control device 104 transmits a message 651*b* to the playback device 102 causing the playback device 102 to play back the selected media content. In response to receiving the message 651*b*, the playback device 102 transmits a message 651*c* to the computing device 106 requesting the selected media content. The computing device 106, in response to receiving the message 651*c*, transmits a message 651*d* comprising data (e.g., audio data, video data, a URL, a URI) corresponding to the requested media content.

At step 650*d*, the playback device 102 receives the message 651*d* with the data corresponding to the requested media content and plays back the associated media content.

At step 650*e*, the playback device 102 optionally causes one or more other devices to play back the selected media content. In one example, the playback device 102 is one of a bonded zone of two or more players (FIG. 1M). The playback device 102 can receive the selected media content and transmit all or a portion of the media content to other devices in the bonded zone. In another example, the playback device 102 is a coordinator of a group and is configured to transmit and receive timing information from one or more other devices in the group. The other one or more devices in the group can receive the selected media content from the computing device 106, and begin playback of the selected media content in response to a message from the playback device 102 such that all of the devices in the group play back the selected media content in synchrony.

Figure 7:
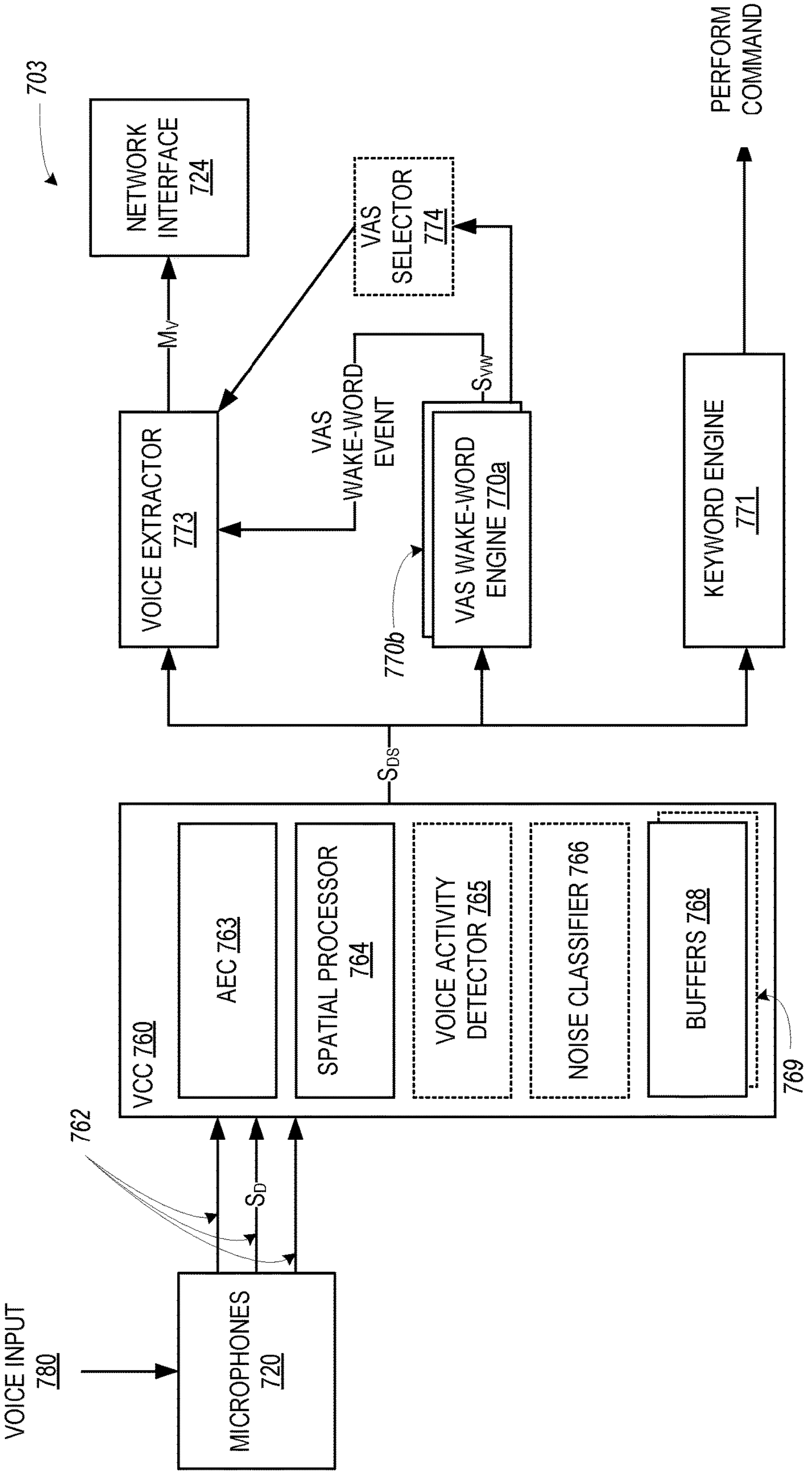
FIG. 7 is a functional block diagram of certain components of an example network microphone device in accordance with aspects of the disclosure.

III. Example Configurations of Network Microphone Devices and Interactions with Voice Assistant Services FIG. 7 is functional block diagram showing aspects of an NMD 703 configured in accordance with examples of the disclosure. The NMD 703 may be generally similar to the NMD 103 and include similar components. As described in more detail below, the NMD 703 (FIG. 7) is configured to handle certain voice inputs locally, without necessarily transmitting data representing the voice input to a voice assistant service. However, the NMD 703 is also configured to process other voice inputs using a voice assistant service.

Referring to FIG. 7, the NMD 703 includes voice capture components ("VCC") 760, a VAS wake-word engine 770*a*, and a voice extractor 773. The VAS wake-word engine 770*a* and the voice extractor 773 are operably coupled to the VCC 760. The NMD 703 further comprises a keyword engine 771 operably coupled to the VCC 760.

The NMD 703 further includes microphones 720 and the at least one network interface 724 as described above and may also include other components, such as audio amplifiers, a user interface, etc., which are not shown in FIG. 7 for purposes of clarity. The microphones 720 of the NMD 703 are configured to provide detected sound, SD, from the environment of the NMD 703 to the VCC 760. The detected sound SD may take the form of one or more analog or digital signals. In example implementations, the detected sound SD may be composed of a plurality signals associated with respective channels 762 that are fed to the VCC 760.

Each channel 762 may correspond to a particular microphone 720. For example, an NMD having six microphones may have six corresponding channels. Each channel of the detected sound SD may bear certain similarities to the other channels but may differ in certain regards, which may be due to the position of the given channel's corresponding microphone relative to the microphones of other channels. For example, one or more of the channels of the detected sound SD may have a greater signal to noise ratio ("SNR") of speech to background noise than other channels.

As further shown in FIG. 7, the VCC 760 includes an AEC 763, a spatial processor 764, and one or more buffers 768. In operation, the AEC 763 receives the detected sound SD and filters or otherwise processes the sound to suppress echoes and/or to otherwise improve the quality of the detected sound SD. That processed sound may then be passed to the spatial processor 764.

The spatial processor 764 is typically configured to analyze the detected sound SD and identify certain characteristics, such as a sound's amplitude (e.g., decibel level), frequency spectrum, directionality, etc. In one respect, the spatial processor 764 may help filter or suppress ambient noise in the detected sound SD from potential user speech based on similarities and differences in the constituent channels 762 of the detected sound SD, as discussed above. As one possibility, the spatial processor 764 may monitor metrics that distinguish speech from other sounds. Such metrics can include, for example, energy within the speech band relative to background noise and entropy within the speech band—a measure of spectral structure—which is typically lower in speech than in most common background noise. In some implementations, the spatial processor 764 may be configured to determine a speech presence probability, examples of such functionality are disclosed in U.S. patent application Ser. No. 15/984,073, filed May 18, 2018, titled "Linear Filtering for Noise-Suppressed Speech Detection," which is incorporated herein by reference in its entirety.

In operation, the one or more buffers 768—one or more of which may be part of or separate from the memory 213 (FIG. 2A)—capture data corresponding to the detected sound SD. More specifically, the one or more buffers 768 capture detected-sound data that was processed by the upstream AEC 764 and spatial processor 764.

The network interface 724 may then provide this information to a remote server that may be associated with the MPS 100. In one aspect, the information stored in the additional buffer 769 does not reveal the content of any speech but instead is indicative of certain unique features of the detected sound itself. In a related aspect, the information may be communicated between computing devices, such as the various computing devices of the MPS 100, without necessarily implicating privacy concerns. In practice, the MPS 100 can use this information to adapt and fine tune voice processing algorithms, including sensitivity tuning as discussed below. In some implementations the additional buffer may comprise or include functionality similar to lookback buffers disclosed, for example, in U.S. patent application Ser. No. 15/989,715, filed May 25, 2018, titled "Determining and Adapting to Changes in Microphone Performance of Playback Devices"; U.S. patent application Ser. No. 16/141,875, filed Sep. 25, 2018, titled "Voice Detection Optimization Based on Selected Voice Assistant Service"; and U.S. patent application Ser. No. 16/138,111, filed Sep. 21, 2018, titled "Voice Detection Optimization Using Sound Metadata," which are incorporated herein by reference in their entireties.

In any event, the detected-sound data forms a digital representation (i.e., sound-data stream), $S_{DS}$, of the sound detected by the microphones 720. In practice, the sound-data stream $S_{DS}$ may take a variety of forms. As one possibility, the sound-data stream $S_{DS}$ may be composed of frames, each of which may include one or more sound samples. The frames may be streamed (i.e., read out) from the one or more buffers 768 for further processing by downstream components, such as the VAS wake-word engines 770 and the voice extractor 773 of the NMD 703.

In some implementations, at least one buffer 768 captures detected-sound data utilizing a sliding window approach in which a given amount (i.e., a given window) of the most recently captured detected-sound data is retained in the at least one buffer 768 while older detected sound data is overwritten when it falls outside of the window. For example, at least one buffer 768 may temporarily retain 20 frames of a sound specimen at given time, discard the oldest frame after an expiration time, and then capture a new frame, which is added to the 19 prior frames of the sound specimen.

In practice, when the sound-data stream $S_{DS}$ is composed of frames, the frames may take a variety of forms having a variety of characteristics. As one possibility, the frames may take the form of audio frames that have a certain resolution (e.g., 16 bits of resolution), which may be based on a sampling rate (e.g., 44,100 Hz). Additionally, or alternatively, the frames may include information corresponding to a given sound specimen that the frames define, such as metadata that indicates frequency response, power input level, SNR, microphone channel identification, and/or other information of the given sound specimen, among other examples. Thus, in some examples, a frame may include a portion of sound (e.g., one or more samples of a given sound specimen) and metadata regarding the portion of sound. In other examples, a frame may only include a portion of sound (e.g., one or more samples of a given sound specimen) or metadata regarding a portion of sound.

In any case, downstream components of the NMD 703 may process the sound-data stream $S_{DS}$. For instance, the VAS wake-word engines 770 are configured to apply one or more identification algorithms to the sound-data stream $S_{DS}$ (e.g., streamed sound frames) to spot potential wake words in the detected-sound SD. This process may be referred to as automatic speech recognition. The VAS wake-word engine **770*a* and keyword engine 771** apply different identification algorithms corresponding to their respective wake words, and further generate different events based on detecting a wake word in the detected sound SD.

Example wake word detection algorithms accept audio as input and provide an indication of whether a wake word is present in the audio. Many first- and third-party wake word detection algorithms are known and commercially available. For instance, operators of a voice service may make their algorithm available for use in third-party devices. Alternatively, an algorithm may be trained to detect certain wake-words.

For instance, when the VAS wake-word engine **770*a* detects a potential VAS wake word, the VAS work-word engine 770*a* provides an indication of a "VAS wake-word event" (also referred to as a "VAS wake-word trigger"). In the illustrated example of FIG. 7, the VAS wake word engine 770*a* outputs a signal, $S_{VW}$, that indicates the occurrence of a VAS wake-word event to the voice extractor 773**.

In multi-VAS implementations, the NMD 703 may include a VAS selector 774 (shown in dashed lines) that is generally configured to direct extraction by the voice extractor 773 and transmission of the sound-data stream $S_{DS}$ to the appropriate VAS when a given wake-word is identified by a particular wake-word engine (and a corresponding wake-word trigger), such as the VAS wake-word engine **770*a* and at least one additional VAS wake-word engine 770*b* (shown in dashed lines). In such implementations, the NMD 703** may include multiple, different VAS wake word engines and/or voice extractors, each supported by a respective VAS.

Similar to the discussion above, each VAS wake-word engine 770 may be configured to receive as input the sound-data stream $S_{DS}$ from the one or more buffers 768 and apply identification algorithms to cause a wake-word trigger for the appropriate VAS. Thus, as one example, the VAS wake-word engine **770*a* may be configured to identify the wake word "Alexa" and cause the NMD 703 to invoke the AMAZON VAS when "Alexa" is spotted. As another example, the wake-word engine 770*b* may be configured to identify the wake word "Ok, Google" and cause the NMD 520 to invoke the GOOGLE VAS when "Ok, Google" is spotted. In single-VAS implementations, the VAS selector 774** may be omitted.

As described in more detail elsewhere herein, in various examples, the NMD 703 can be configured to support various combinations wake-word engines and to facilitate communication with various combinations of VASes. In certain cases, two ore more particular VASes (or two or more particular wake-word engines) may be prohibited from being enabled concurrently in order to safeguard the user experience or to avoid other problems. For example, if two wake-word engines are configured to detect very similar wake words, then the NMD 703 can be configured to permit only one of those wake-word engines to be enabled at a time. Additionally or alternatively, if a plurality of particular VASes being enabled concurrently would strain the available computational resources of the NMD (e.g., processing power, available memory, etc.), then concurrent enablement may be limited to a certain subset of the available VASes. In some examples, such concurrency restrictions can be maintained and governed by a concurrency rules engine, which can be stored locally on the NMD 703 or may be stored remotely on one or more computing devices accessible to the NMD via a network.

For purposes of concurrency restrictions, in some examples the keyword engine 771 and associated downstream commands can be considered a native VAS. For example, the keyword engine 771 can cause the NMD to perform commands (or to transmit instructions to other devices to perform commands) with or without transmitting a voice utterance to remote computing devices for evaluation. Such voice-enabled operation of the NMD or related devices via the keyword engine 771 can be considered a native VAS, which as discussed elsewhere herein, which may be restricted from being concurrently enabled with certain other VASes (e.g., as reflected in a concurrency rules engine). Accordingly, in some instances, the keyword engine 771 can be selectively enabled or disabled based at least in part on concurrency restrictions.

In response to the VAS wake-word event (e.g., in response to the signal $S_{VW}$ indicating the wake-word event), the voice extractor 773 is configured to receive and format (e.g., packetize) the sound-data stream $S_{DS}$. For instance, the voice extractor 773 packetizes the frames of the sound-data stream $S_{DS}$ into messages. The voice extractor 773 transmits or streams these messages, $M_V$, that may contain voice input in real time or near real time to a remote VAS via the network interface 724.

The VAS is configured to process the sound-data stream $S_{DS}$ contained in the messages $M_V$ sent from the NMD 703. More specifically, the NMD 703 is configured to identify a voice input 780 based on the sound-data stream $S_{DS}$. As described in connection with FIG. 2C, the voice input 780 may include a keyword portion and an utterance portion. The keyword portion corresponds to detected sound that caused a wake-word event, or leads to a command-keyword event when one or more certain conditions, such as certain playback conditions, are met. For instance, when the voice input 780 includes a VAS wake word, the keyword portion corresponds to detected sound that caused the wake-word engine 770*a* to output the wake-word event signal $S_{VW}$ to the voice extractor 773. The utterance portion in this case corresponds to detected sound that potentially comprises a user request following the keyword portion.

When a VAS wake-word event occurs, the VAS may first process the keyword portion within the sound data stream $S_{DS}$ to verify the presence of a VAS wake word. In some instances, the VAS may determine that the keyword portion comprises a false wake word (e.g., the word "Election" when the word "Alexa" is the target VAS wake word). In such an occurrence, the VAS may send a response to the NMD 703 with an instruction for the NMD 703 to cease extraction of sound data, which causes the voice extractor 773 to cease further streaming of the detected-sound data to the VAS. The VAS wake-word engine 770*a* may resume or continue monitoring sound specimens until it spots another potential VAS wake word, leading to another VAS wake-word event. In some implementations, the VAS does not process or receive the keyword portion but instead processes only the utterance portion.

In any case, the VAS processes the utterance portion to identify the presence of any words in the detected-sound data and to determine an underlying intent from these words. The words may correspond to one or more commands, as well as certain keywords. The keyword may be, for example, a word in the voice input identifying a particular device or group in the MPS 100. For instance, in the illustrated example, the keyword may be one or more words identifying one or more zones in which the music is to be played, such as the Living Room and the Dining Room (FIG. 1A).

To determine the intent of the words, the VAS is typically in communication with one or more databases associated with the VAS (not shown) and/or one or more databases (not shown) of the MPS 100. Such databases may store various user data, analytics, catalogs, and other information for natural language processing and/or other processing. In some implementations, such databases may be updated for adaptive learning and feedback for a neural network based on voice-input processing. In some cases, the utterance portion may include additional information, such as detected pauses (e.g., periods of non-speech) between words spoken by a user, as shown in FIG. 2C. The pauses may demarcate the locations of separate commands, keywords, or other information spoke by the user within the utterance portion.

After processing the voice input, the VAS may send a response to the MPS 100 with an instruction to perform one or more actions based on an intent it determined from the voice input. For example, based on the voice input, the VAS may direct the MPS 100 to initiate playback on one or more of the playback devices 102, control one or more of these playback devices 102 (e.g., raise/lower volume, group/ungroup devices, etc.), or turn on/off certain smart devices, among other actions. After receiving the response from the VAS, the wake-word engine 770*a* of the NMD 703 may resume or continue to monitor the sound-data stream $S_{DS1}$ until it spots another potential wake-word, as discussed above.

In general, the one or more identification algorithms that a particular VAS wake-word engine, such as the VAS wake-word engine 770*a*, applies are configured to analyze certain characteristics of the detected sound stream $S_{DS}$ and compare those characteristics to corresponding characteristics of the particular VAS wake-word engine's one or more particular VAS wake words. For example, the wake-word engine 770*a* may apply one or more identification algorithms to spot temporal and spectral characteristics in the detected sound stream $S_{DS}$ that match the temporal and spectral characteristics of the engine's one or more wake words, and thereby determine that the detected sound SD comprises a voice input including a particular VAS wake word.

In some implementations, the one or more identification algorithms may be third-party identification algorithms (i.e., developed by a company other than the company that provides the NMD 703). For instance, operators of a voice service (e.g., AMAZON) may make their respective algorithms (e.g., identification algorithms corresponding to AMAZON's ALEXA) available for use in third-party devices (e.g., the NMDs 103), which are then trained to identify one or more wake words for the particular voice assistant service. Additionally, or alternatively, the one or more identification algorithms may be first-party identification algorithms that are developed and trained to identify certain wake words that are not necessarily particular to a given voice service. Other possibilities also exist.

As noted above, the NMD 703 also includes a keyword engine 771 in parallel with the VAS wake-word engine 770*a*. Like the VAS wake-word engine 770*a*, the keyword engine 771 may apply one or more identification algorithms corresponding to one or more wake words. A "command-keyword event" is generated when a particular command keyword is identified in the detected sound SD. In contrast to the nonce words typically as utilized as VAS wake words, command keywords function as both the wake word and the command itself. For instance, example command keywords may correspond to playback commands (e.g., "play," "pause," "skip," etc.) as well as control commands ("turn on"), among other examples. Under appropriate conditions, based on detecting one of these command keywords, the NMD 703 performs the corresponding command.

The keyword engine 771 can employ an automatic speech recognizer (ASR). The ASR is configured to output phonetic or phonemic representations, such as text corresponding to words, based on sound in the sound-data stream $S_{DS}$ to text. For instance, the ASR may transcribe spoken words represented in the sound-data stream $S_{DS}$ to one or more strings representing the voice input 780 as text. The keyword engine 771 can feed ASR output to a local natural language unit (NLU) that identifies particular keywords as being command keywords for invoking command-keyword events, as described below.

As noted above, in some example implementations, the NMD 703 is configured to perform natural language processing, which may be carried out using an onboard natural language understanding processor, referred to herein as a natural language unit (NLU). The local NLU is configured to analyze text output of the ASR of the keyword engine 771 to spot (i.e., detect or identify) keywords in the voice input 780. The local keyword engine 771 includes a library of keywords (i.e., words and phrases) corresponding to respective commands and/or parameters.

In one aspect, the library of the local keyword engine 771 includes command keywords. When the local keyword engine 771 identifies a command keyword in the signal, the keyword engine 771 generates a command-keyword event and performs a command corresponding to the command keyword in the signal.

Further, the library of the local keyword engine 771 may also include keywords corresponding to parameters. The local keyword engine 771 may then determine an underlying intent from the matched keywords in the voice input 780. For instance, if the local keyword engine 771 matches the keywords "David Bowie" and "kitchen" in combination with a play command, the local keyword engine 771 may determine an intent of playing David Bowie in the Kitchen 101*h* on the playback device 102*i*. In contrast to a processing of the voice input 780 by a cloud-based VAS, local processing of the voice input 780 by the local keyword engine 771 may be relatively less sophisticated, as the keyword engine 771 does not have access to the relatively greater processing capabilities and larger voice databases that a VAS generally has access to.

In some examples, the local keyword engine 771 may determine an intent with one or more slots, which correspond to respective keywords. For instance, referring back to the play David Bowie in the Kitchen example, when processing the voice input, the local keyword engine 771 may determine that an intent is to play music (e.g., intent=playMusic), while a first slot includes David Bowie as target content (e.g., slot1=DavidBowie) and a second slot includes the Kitchen 101*h* as the target playback device (e.g., slot2=kitchen). Here, the intent (to "playMusic") is based on the command keyword and the slots are parameters modifying the intent to a particular target content and playback device.

Some error in performing local automatic speech recognition is expected. Within examples, the keyword engine 771 may generate a confidence score when transcribing spoken words to text, which indicates how closely the spoken words in the voice input 780 matches the sound patterns for that word. In some implementations, generating a command-keyword event is based on the confidence score for a given command keyword. For instance, the keyword engine 771 may generate a command-keyword event when the confidence score for a given sound exceeds a given threshold value (e.g., 0.5 on a scale of 0-1, indicating that the given sound is more likely than not the command keyword). Conversely, when the confidence score for a given sound is at or below the given threshold value, the keyword engine 771 does not generate the command-keyword event.

Similarly, some error in performing keyword matching is expected. Within examples, the keyword engine 771 may generate a confidence score when determining an intent, which indicates how closely the transcribed words in the signal match the corresponding keywords in the library of the local keyword engine 771. In some implementations, performing an operation according to a determined intent is based on the confidence score for keywords. For instance, the NMD 703 may perform an operation according to a determined intent when the confidence score for a given sound exceeds a given threshold value (e.g., 0.5 on a scale of 0-1, indicating that the given sound is more likely than not the command keyword). Conversely, when the confidence score for a given intent is at or below the given threshold value, the NMD 703 does not perform the operation according to the determined intent.

As noted above, in some implementations, a phrase may be used as a command keyword, which provides additional syllables to match (or not match). For instance, the phrase "play me some music" has more syllables than "play," which provides additional sound patterns to match to words. Accordingly, command keywords that are phrases may generally be less prone to false wake word triggers.

As indicated above, the NMD 703 generates a command-keyword event (and performs a command corresponding to the detected command keyword) only when certain conditions corresponding to a detected command keyword are met. These conditions are intended to lower the prevalence of false positive command-keyword events. For instance, after detecting the command keyword "skip," the NMD 703 generates a command-keyword event (and skips to the next track) only when certain playback conditions indicating that a skip should be performed are met. These playback conditions may include, for example, (i) a first condition that a media item is being played back, (ii) a second condition that a queue is active, and (iii) a third condition that the queue includes a media item subsequent to the media item being played back. If any of these conditions are not satisfied, the command-keyword event is not generated (and no skip is performed).

The NMD 703 can include one or more state machine(s) to facilitate determining whether the appropriate conditions are met. The state machine transitions between a first state and a second state based on whether one or more conditions corresponding to the detected command keyword are met. In particular, for a given command keyword corresponding to a particular command requiring one or more particular conditions, the state machine transitions into a first state when one or more particular conditions are satisfied and transitions into a second state when at least one condition of the one or more particular conditions is not satisfied.

Within example implementations, the command conditions are based on states indicated in state variables. As noted above, the devices of the MPS 100 may store state variables describing the state of the respective device. For instance, the playback devices 102 may store state variables indicating the state of the playback devices 102, such as the audio content currently playing (or paused), the volume levels, network connection status, and the like). These state variables are updated (e.g., periodically, or based on an event (i.e., when a state in a state variable changes)) and the state variables further can be shared among the devices of the MPS 100, including the NMD 703.

Similarly, the NMD 703 may maintain these state variables (either by virtue of being implemented in a playback device or as a stand-alone NMD). The state machine monitors the states indicated in these state variables, and determines whether the states indicated in the appropriate state variables indicate that the command condition(s) are satisfied. Based on these determinations, the state machine transitions between the first state and the second state, as described above.

Other example conditions may be based on the output of a voice activity detector ("VAD") 765. The VAD 765 is configured to detect the presence (or lack thereof) of voice activity in the sound-data stream $S_{DS}$. In particular, the VAD 765 may analyze frames corresponding to the pre-roll portion of the voice input 780 (FIG. 2D) with one or more voice detection algorithms to determine whether voice activity was present in the environment in certain time windows prior to a keyword portion of the voice input 780.

The VAD 765 may utilize any suitable voice activity detection algorithms. Example voice detection algorithms involve determining whether a given frame includes one or more features or qualities that correspond to voice activity, and further determining whether those features or qualities diverge from noise to a given extent (e.g., if a value exceeds a threshold for a given frame). Some example voice detection algorithms involve filtering or otherwise reducing noise in the frames prior to identifying the features or qualities.

In some examples, the VAD 765 may determine whether voice activity is present in the environment based on one or more metrics. For example, the VAD 765 can be configured distinguish between frames that include voice activity and frames that don't include voice activity. The frames that the VAD determines have voice activity may be caused by speech regardless of whether it near- or far-field. In this example and others, the VAD 765 may determine a count of frames in the pre-roll portion of the voice input 780 that indicate voice activity. If this count exceeds a threshold percentage or number of frames, the VAD 765 may be configured to output a signal or set a state variable indicating that voice activity is present in the environment. Other metrics may be used as well in addition to, or as an alternative to, such a count.

The presence of voice activity in an environment may indicate that a voice input is being directed to the NMD 73. Accordingly, when the VAD 765 indicates that voice activity is not present in the environment (perhaps as indicated by a state variable set by the VAD 765) this may be configured as one of the command conditions for the command keywords. When this condition is met (i.e., the VAD 765 indicates that voice activity is present in the environment), the state machine 775 will transition to the first state to enable performing commands based on command keywords, so long as any other conditions for a particular command keyword are satisfied.

Further, in some implementations, the NMD 703 may include a noise classifier 766. The noise classifier 766 is configured to determine sound metadata (frequency response, signal levels, etc.) and identify signatures in the sound metadata corresponding to various noise sources. The noise classifier 766 may include a neural network or other mathematical model configured to identify different types of noise in detected sound data or metadata. One classification of noise may be speech (e.g., far-field speech). Another classification may be a specific type of speech, such as background speech, and example of which is described in greater detail with reference to FIG. 8. Background speech may be differentiated from other types of voice-like activity, such as more general voice activity (e.g., cadence, pauses, or other characteristics) of voice-like activity detected by the VAD 765.

For example, analyzing the sound metadata can include comparing one or more features of the sound metadata with known noise reference values or a sample population data with known noise. For example, any features of the sound metadata such as signal levels, frequency response spectra, etc. can be compared with noise reference values or values collected and averaged over a sample population. In some examples, analyzing the sound metadata includes projecting the frequency response spectrum onto an eigenspace corresponding to aggregated frequency response spectra from a population of NMDs. Further, projecting the frequency response spectrum onto an eigenspace can be performed as a preprocessing step to facilitate downstream classification.

In various examples, any number of different techniques for classification of noise using the sound metadata can be used, for example machine learning using decision trees, or Bayesian classifiers, neural networks, or any other classification techniques. Alternatively or additionally, various clustering techniques may be used, for example K-Means clustering, mean-shift clustering, expectation-maximization clustering, or any other suitable clustering technique. Techniques to classify noise may include one or more techniques disclosed in U.S. application Ser. No. 16/227,308 filed Dec. 20, 2018, and titled "Optimization of Network Microphone Devices Using Noise Classification," which is herein incorporated by reference in its entirety.

With continued reference to FIG. 7, in some implementations, the additional buffer 769 (shown in dashed lines) may store information (e.g., metadata or the like) regarding the detected sound SD that was processed by the upstream AEC 763 and spatial processor 764. This additional buffer 769 may be referred to as a "sound metadata buffer." Examples of such sound metadata include: (1) frequency response data, (2) echo return loss enhancement measures, (3) voice direction measures; (4) arbitration statistics; and/or (5) speech spectral data. In example implementations, the noise classifier 766 may analyze the sound metadata in the buffer 769 to classify noise in the detected sound SD.

As noted above, one classification of sound may be background speech, such as speech indicative of far-field speech and/or speech indicative of a conversation not involving the NMD 703. The noise classifier 766 may output a signal and/or set a state variable indicating that background speech is present in the environment. The presence of voice activity (i.e., speech) in the pre-roll portion of the voice input 780 indicates that the voice input 780 might not be directed to the NMD 703, but instead be conversational speech within the environment. For instance, a household member might speak something like "our kids should have a play date soon" without intending to direct the command keyword "play" to the NMD 703.

Further, when the noise classifier indicates that background speech is present is present in the environment, this condition may disable the keyword engine 771. In some implementations, the condition of background speech being absent in the environment (perhaps as indicated by a state variable set by the noise classifier 766) is configured as one of the command conditions for the command keywords. Accordingly, the state machine 775 will not transition to the first state when the noise classifier 766 indicates that background speech is present in the environment.

Further, the noise classifier 766 may determine whether background speech is present in the environment based on one or more metrics. For example, the noise classifier 766 may determine a count of frames in the pre-roll portion of the voice input 780 that indicate background speech. If this count exceeds a threshold percentage or number of frames, the noise classifier 766 may be configured to output the signal or set the state variable indicating that background speech is present in the environment. Other metrics may be used as well in addition to, or as an alternative to, such a count.

Referring still to FIG. 7, in some examples, one or more additional keyword engines may be provided, for example including custom keyword engines. Cloud service providers, such as streaming audio services, may provide a custom keyword engine pre-configured with identification algorithms configured to spot service-specific command keywords. These service-specific command keywords may include commands for custom service features and/or custom names used in accessing the service.

For instance, the NMD 703 may include a particular streaming audio service (e.g., Apple Music) keyword engine. This particular keyword engine may be configured to detect command keywords specific to the particular streaming audio service and generate streaming audio service wake word events. For instance, one command keyword may be "Friends Mix," which corresponds to a command to play back a custom playlist generated from playback histories of one or more "friends" within the particular streaming audio service.

In some examples, different NMDs 703 of the same media playback system 100 can have different additional custom keyword engines. For example, a first NMD may include a custom keyword engine configured with a library of keywords configured for a particular streaming audio service (e.g., Apple Music) while a second NMD includes a custom-command keyword engine configured with a library of keywords configured to a different streaming audio service (e.g., Spotify). In operation, voice input received at either NMD may be transmitted to the other NMD for processing, such that in combination the media playback system may effectively evaluate voice input for keywords with the benefit of multiple different custom keyword engines distributed among multiple different NMDs 703.

Referring back to FIG. 7, in certain examples, the VAS wake-word engine 770*a* and the keyword engine 771 may take a variety of forms. For example, the VAS wake-word engine 770*a* and the keyword engine 771 may take the form of one or more modules that are stored in memory of the NMD 703 (e.g., the memory 112*b* of FIG. 1F). As another example, the VAS wake-word engine 770*a* and the keyword engine 771 may take the form of a general purposes or special-purpose processor, or modules thereof. In this respect, multiple wake word engines 770 and 771 may be part of the same component of the NMD 703 or each wake-word engine 770 and 771 may take the form of a component that is dedicated for the particular wake-word engine. Other possibilities also exist.

To further reduce false positives, the keyword engine 771 may utilize a relative low sensitivity compared with the VAS wake-word engine 770*a*. In practice, a wake-word engine may include a sensitivity level setting that is modifiable. The sensitivity level may define a degree of similarity between a word identified in the detected sound stream $S_{DS1}$ and the wake-word engine's one or more particular wake words that is considered to be a match (i.e., that triggers a VAS wake-word or command-keyword event). In other words, the sensitivity level defines how closely, as one example, the spectral characteristics in the detected sound stream $S_{DS2}$ must match the spectral characteristics of the engine's one or more wake words to be a wake-word trigger.

In this respect, the sensitivity level generally controls how many false positives that the VAS wake-word engine 770*a* and keyword engine 771 identifies. For example, if the VAS wake-word engine 770*a* is configured to identify the wake-word "Alexa" with a relatively high sensitivity, then false wake words of "Election" or "Lexus" may cause the wake-word engine 770*a* to flag the presence of the wake-word "Alexa." In contrast, if the keyword engine 771 is configured with a relatively low sensitivity, then the false wake words of "may" or "day" would not cause the keyword engine 771 to flag the presence of the command keyword "Play."

In practice, a sensitivity level may take a variety of forms. In example implementations, a sensitivity level takes the form of a confidence threshold that defines a minimum confidence (i.e., probability) level for a wake-word engine that serves as a dividing line between triggering or not triggering a wake-word event when the wake-word engine is analyzing detected sound for its particular wake word. In this regard, a higher sensitivity level corresponds to a lower confidence threshold (and more false positives), whereas a lower sensitivity level corresponds to a higher confidence threshold (and fewer false positives). For example, lowering a wake-word engine's confidence threshold configures it to trigger a wake-word event when it identifies words that have a lower likelihood that they are the actual particular wake word, whereas raising the confidence threshold configures the engine to trigger a wake-word event when it identifies words that have a higher likelihood that they are the actual particular wake word. Within examples, a sensitivity level of the keyword engine 771 may be based on more or more confidence scores, such as the confidence score in spotting a command keyword and/or a confidence score in determining an intent. Other examples of sensitivity levels are also possible.

In example implementations, sensitivity level parameters (e.g., the range of sensitivities) for a particular wake-word engine can be updated, which may occur in a variety of manners. As one possibility, a VAS or other third-party provider of a given wake-word engine may provide to the NMD 703 a wake-word engine update that modifies one or more sensitivity level parameters for the given VAS wake-word engine 770*a*. By contrast, the sensitive level parameters of the keyword engine 771 may be configured by the manufacturer of the NMD 703 or by another cloud service (e.g., for a custom wake-word engine).

Notably, within certain examples, the NMD 703 foregoes sending any data representing the detected sound SD (e.g., the messages $M_V$) to a VAS when processing a voice input 780 including a command keyword. In implementations including the local keyword engine 771, the NMD 703 can further process the voice utterance portion of the voice input 780 (in addition to the keyword word portion) without necessarily sending the voice utterance portion of the voice input 780 to the VAS. Accordingly, speaking a voice input 780 (with a command keyword) to the NMD 703 may provide increased privacy relative to other NMDs that process all voice inputs using a VAS.

As indicated above, the keywords in the library of the keyword engine 771 can correspond to parameters. These parameters may define to perform the command corresponding to the detected command keyword. When keywords are recognized in the voice input 780, the command corresponding to the detected command keyword is performed according to parameters corresponding to the detected keywords.

For instance, an example voice input 780 may be "play music at low volume" with "play" being the command keyword portion (corresponding to a playback command) and "music at low volume" being the voice utterance portion. When analyzing this voice input 780, the keyword engine 771 may recognize that "low volume" is a keyword in its library corresponding to a parameter representing a certain (low) volume level. Accordingly, the keyword engine 771 may determine an intent to play at this lower volume level. Then, when performing the playback command corresponding to "play," this command is performed according to the parameter representing a certain volume level.

In a second example, another example voice input 780 may be "play my favorites in the Kitchen" with "play" again being the command keyword portion (corresponding to a playback command) and "my favorites in the Kitchen" as the voice utterance portion. When analyzing this voice input 780, the keyword engine 771 may recognize that "favorites" and "Kitchen" match keywords in its library. In particular, "favorites" corresponds to a first parameter representing particular audio content (i.e., a particular playlist that includes a user's favorite audio tracks) while "Kitchen" corresponds to a second parameter representing a target for the playback command (i.e., the kitchen **101*h* zone. Accordingly, the keyword engine 771 may determine an intent to play this particular playlist in the kitchen 101*h*** zone.

In a third example, a further example voice input 780 may be "volume up" with "volume" being the command keyword portion (corresponding to a volume adjustment command) and "up" being the voice utterance portion. When analyzing this voice input 780, the keyword engine 771 may recognize that "up" is a keyword in its library corresponding to a parameter representing a certain volume increase (e.g., a 10-point increase on a 100-point volume scale). Accordingly, the keyword engine 771 may determine an intent to increase volume. Then, when performing the volume adjustment command corresponding to "volume," this command is performed according to the parameter representing the certain volume increase.

Within examples, certain command keywords are functionally linked to a subset of the keywords within the library of the keyword engine 771, which may hasten analysis. For instance, the command keyword "skip" may be functionality linked to the keywords "forward" and "backward" and their cognates. Accordingly, when the command keyword "skip" is detected in a given voice input 780, analyzing the voice utterance portion of that voice input 780 with the local keyword engine 771 may involve determining whether the voice input 780 includes any keywords that match these functionally linked keywords (rather than determining whether the voice input 780 includes any keywords that match any keyword in the library of the local keyword engine 771). Since vastly fewer keywords are checked, this analysis is relatively quicker than a full search of the library. By contrast, a nonce VAS wake word such as "Alexa" provides no indication as to the scope of the accompanying voice input.

Some commands may require one or more parameters, as such the command keyword alone does not provide enough information to perform the corresponding command. For example, the command keyword "volume" might require a parameter to specify a volume increase or decrease, as the intent of "volume" of volume alone is unclear. As another example, the command keyword "group" may require two or more parameters identifying the target devices to group.

Accordingly, in some example implementations, when a given command keyword is detected in the voice input 780 by the keyword engine 771, the local keyword engine 771 may determine whether the voice input 780 includes keywords matching keywords in the library corresponding to the required parameters. If the voice input 780 does include keywords matching the required parameters, the NMD 703 proceeds to perform the command (corresponding to the given command keyword) according to the parameters specified by the keywords.

However, if the voice input 780 does include keywords matching the required parameters for the command, the NMD 703 may prompt the user to provide the parameters. For instance, in a first example, the NMD 703 may play an audible prompt such as "I've heard a command, but I need more information" or "Can I help you with something?" Alternatively, the NMD 703 may send a prompt to a user's personal device via a control application (e.g., the software components **132*c* of the control device(s) 104**).

In further examples, the NMD 703 may play an audible prompt customized to the detected command keyword. For instance, after detecting a command keyword corresponding to a volume adjustment command (e.g., "volume"), the audible prompt may include a more specific request such as "Do you want to adjust the volume up or down?" As another example, for a grouping command corresponding to the command keyword "group," the audible prompt may be "Which devices do you want to group?" Supporting such specific audible prompts may be made practicable by supporting a relatively limited number of command keywords (e.g., less than 100), but other implementations may support more command keywords with the trade-off of requiring additional memory and processing capability.

Within additional examples, when a voice utterance portion does not include keywords corresponding to one or more required parameters, the NMD 703 may perform the corresponding command according to one or more default parameters. For instance, if a playback command does not include keywords indicating target playback devices 102 for playback, the NMD 703 may default to playback on the NMD 703 itself (e.g., if the NMD 703 is implemented within a playback device 102) or to playback on one or more associated playback devices 102 (e.g., playback devices 102 in the same room or zone as the NMD 703). Further, in some examples, the user may configure default parameters using a graphical user interface (e.g., user interface 430) or voice user interface. For example, if a grouping command does not specify the playback devices 102 to group, the NMD 703 may default to instructing two or more pre-configured default playback devices 102 to form a synchrony group.

Default parameters may be stored in data storage (e.g., the memory 112b (FIG. 1F)) and accessed when the NMD 703 determines that keywords exclude certain parameters. Other examples are possible as well.

In some cases, the NMD 703 sends the voice input 780 to a VAS when the keyword engine 771 is unable to process the voice input 780 (e.g., when the local keyword engine 771 is unable to find matches to keywords in the library, or when the local keyword engine 771 has a low confidence score as to intent). In an example, to trigger sending the voice input 780, the NMD 703 may generate a bridging event, which causes the voice extractor 773 to process the sound-data stream SD, as discussed above. That is, the NMD 703 generates a bridging event to trigger the voice extractor 773 without a VAS wake-word being detected by the VAS wake word engine 770a (instead based on a command keyword in the voice input 780, as well as the keyword engine 771 being unable to process the voice input 780).

Before sending the voice input 780 to the VAS (e.g., via the messages $M_V$), the NMD 703 may obtain confirmation from the user that the user acquiesces to the voice input 780 being sent to the VAS. For instance, the NMD 703 may play an audible prompt to send the voice input to a default or otherwise configured VAS, such as "I'm sorry, I didn't understand that. May I ask Alexa?" In another example, the NMD 703 may play an audible prompt using a VAS voice (i.e., a voice that is known to most users as being associated with a particular VAS), such as "Can I help you with something?" In such examples, generation of the bridging event (and trigging of the voice extractor 773) is contingent on a second affirmative voice input 780 from the user.

Within certain example implementations, the local keyword engine 771 may process the signal SASR without necessarily a command-keyword event being generated by the keyword engine 771 (i.e., directly). That is, the automatic speech recognition 772 may be configured to perform automatic speech recognition on the sound-data stream SD, which the local keyword engine 771 processes for matching keywords without requiring a command-keyword event. If keywords in the voice input 780 are found to match keywords corresponding to a command (possibly with one or more keywords corresponding to one or more parameters), the NMD 703 performs the command according to the one or more parameters.

In some examples, the library of the local keyword engine 771 is partially customized to the individual user(s). In a first aspect, the library may be customized to the devices that are within the household of the NMD (e.g., the household within the environment 101 (FIG. 1A)). For instance, the library of the local keyword engine 771 may include keywords corresponding to the names of the devices within the household, such as the zone names of the playback devices 102 in the MPS 100. In a second aspect, the library may be customized to the users of the devices within the household. For example, the library of the local keyword engine 771 may include keywords corresponding to names or other identifiers of a user's preferred playlists, artists, albums, and the like. Then, the user may refer to these names or identifiers when directing voice inputs to the keyword engine 771. In some examples, different NMDs 703 of the same media playback system 100 can have different keyword engines 771 with different customized libraries. For example, a first NMD may include a first subset of device and zone names, and a second NMD may include a second subset of device and zone names.

Within example implementations, the NMD 703 may populate the library of the local keyword engine 771 locally within the network 111 (FIG. 1B). As noted above, the NMD 703 may maintain or have access to state variables indicating the respective states of devices connected to the network 111 (e.g., the playback devices 104). These state variables may include names of the various devices. For instance, the kitchen 101h may include the playback device 102b, which are assigned the zone name "Kitchen." The NMD 703 may read these names from the state variables and include them in the library of the local keyword engine 771 by training the local keyword engine 771 to recognize them as keywords. The keyword entry for a given name may then be associated with the corresponding device in an associated parameter (e.g., by an identifier of the device, such as a MAC address or IP address). The NMD 703 can then use the parameters to customize control commands and direct the commands to a particular device.

In further examples, the NMD 703 may populate the library by discovering devices connected to the network 111. For instance, the NMD 703 may transmit discovery requests via the network 111 according to a protocol configured for device discovery, such as universal plug-and-play (UPnP) or zero-configuration networking. Devices on the network 111 may then respond to the discovery requests and exchange data representing the device names, identifiers, addresses and the like to facilitate communication and control via the network 111. The NMD 703 may read these names from the exchanged messages and include them in the library of the local keyword engine 771 by training the local keyword engine 771 to recognize them as keywords.

As discussed above, an NMD 703 may be configured to communicate with remote computing devices (e.g., cloud servers) associated with multiple different VASes. Although several examples are provided herein with respect to managing interactions between two VASes, in various examples there may be additional VASes (e.g., three, four, five, six, or more VASes), and the interactions between these VASes can be managed using the approaches described herein. In various examples, in response to detecting a particular wake word, the NMD 703 may send voice inputs over a network 102 to the remote computing device(s) associated with the first VAS 190 or one or more additional VASes (FIG. 1B). In some examples, the one or more NMDs 703 only send the voice utterance portion 280b (FIG. 2C) of the voice input 280 to the remote computing device(s) associated with the VAS(es) (and not the wake word portion 280a). In some examples, the one or more NMDs 103 send both the voice utterance portion 280b and the wake word portion 280a (FIG. 3F) to the remote computing device(s) associated with the VAS(es).

Figure 8:
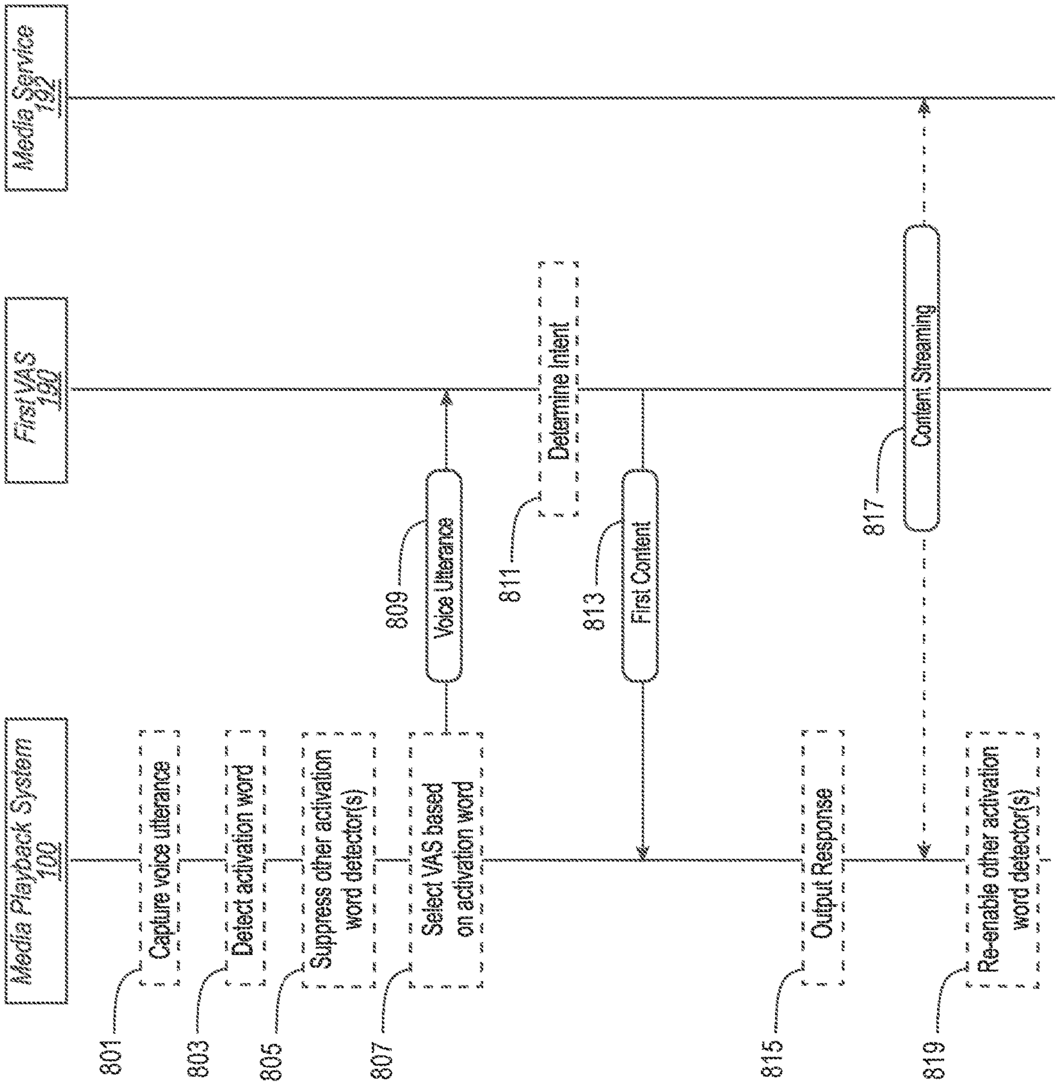
FIG. 8 is an example message flow diagram between a media playback system and a voice assistant service.

FIG. 8 is a message flow diagram illustrating various data exchanges between the MPS 100 and the remote computing devices. The media playback system 100 captures a voice input via a network microphone device in block 801 and detects a wake word in the voice input in block 803 (e.g., via wake-word engine 770a (FIG. 7). Once a particular wake word has been detected (block 803), the MPS 100 may suppress other wake word detector(s) in block 805. For example, if the wake word "Alexa" is detected in the voice utterance in block 803, then the MPS 100 may suppress operation of a second wake-word detector configured to detect a wake word such as "OK, Google." This can reduce the likelihood of cross-talk between different VASes, by reducing or eliminating the risk that second VAS mistakenly detects its wake word during a user's active dialogue session with a first VAS. This can also preserve user privacy by eliminating the possibility of a user's voice input intended for one VAS being transmitted to a different VAS.

In some examples, suppressing operation of the second wake-word detector involves ceasing providing voice input to the second wake-word detector for a predetermined time, or until a user interaction with the first VAS is deemed to be completed (e.g., after a predetermined time has elapsed since the last interaction—either a text-to-speech output from the first VAS or a user voice input to the first VAS). In some examples, suppression of the second wake-word detector can involve powering down the second wake-word detector to a low-power or no-power state for a predetermined time or until the user interaction with the first VAS is deemed complete.

In some examples, the first wake-word detector can remain active even after the first wake word has been detected and the voice utterance has been transmitted to the first VAS, such that a user may utter the first wake word to interrupt a current output or other activity being performed by the first VAS. For example, if a user asks Alexa to read a news flash briefing, and the playback device begins to play back the text-to-speech (TTS) response from Alexa, a user may interrupt by speaking the wake word followed by a new command.

With continued reference to FIG. 8, in block 807, the media playback system 100 may select an appropriate VAS based on particular wake word detected in block 803. In the illustrated message flow, the first VAS 190 is selected in block 807. In alternative flows, a different VAS may be selected in block 807. Upon this selection, the media playback system 100 transmits one or more messages 809 (e.g., packets) containing the voice utterance (e.g., voice utterance 280*b* of FIG. 2C) to the first VAS 190. The media playback system 100 may concurrently transmit other information to the first VAS 190 with the message(s) 809. For example, the media playback system 100 may transmit data over a metadata channel, as described in for example, in previously referenced U.S. application Ser. No. 15/438,749.

The first VAS 190 may process the voice input in the message(s) 809 to determine intent (block 811). Based on the intent, the first VAS 190 may send content 813 via messages (e.g., packets) to the media playback system 100. In some instances, the response message(s) 713 may include a payload that directs one or more of the devices of the media playback system 100 to execute instructions. For example, the instructions may direct the media playback system 100 to play back media content, group devices, and/or perform other functions. In addition or alternatively, the first content 813 from the first VAS 190 may include a payload with a request for more information, such as in the case of multi-turn commands.

In block 815, the MPS 100 outputs a response, for example by playing back the first content 813, causing one or more devices of the MPS 100 to perform some action, or transmitting instructions to one or more external devices to perform an action (e.g., instructing a smart thermostat to adjust a temperature setting). In some examples, the MPS 100 may exchange messages for receiving content, such as via a media stream 817 comprising, e.g., audio content.

In block 819, the other wake word detector(s) can be re-enabled. For example, the MPS 100 may resume providing voice input to the other wake-word detector(s) after a predetermined time or after the user's interaction with the first VAS 190 is deemed to be completed (e.g., after a predetermined time has elapsed since the last interaction—either a text-to-speech output from the first VAS or a user voice input to the first VAS). Once the other wake word detector(s) have been re-enabled, a user may initiate interaction with any available VAS by speaking the appropriate wake word or phrase.

III. Example Systems and Methods for Managing Concurrent Voice Assistant Services While it can be useful to enable a single NMD to interact with multiple VASes, providing multiple concurrently enabled VASes can lead to poor user experience in some situations. As a result, in some instances, it may be beneficial or necessary to restrict concurrent operation, association, or enablement of two or more VASes on a particular NMD, or within a particular media playback system. For example, it may be useful to prohibit concurrent operation of two VASes with wake words that are too similar, or that are configured to control the same household appliances (e.g., two smart-light VASes). Additionally or alternatively, if the combination of concurrent VASes will place excessive computational demands on the NMD (e.g., processing power, memory consumption, etc.), then the user experience can be improved by prohibiting concurrency of at least some of the selected VASes.

To address these and other problems, an NMD can access a concurrency rules engine that provides concurrency restrictions for VASes associated with one or more network microphone devices. In various examples, such a rules engine can be stored locally on the NMD or can be maintained on one or more remote computing devices that are accessible to the NMD via a network connection. In operation, an NMD that is already associated with at least a first VAS may receive a request to be associated with a second VAS (and/or to enable a wake-word engine associated with the second VAS). For example, a user with an NMD that is enabled to communicate with an AMAZON VAS may wish to add a second voice assistant service to the device, and may instruct the NMD (e.g., via a control device 104) to enable the second VAS on the NMD. A user may indicate this request in any number of ways, such as via a control device 104, by voice input provided to an NMD, or any other form of user selection. Following this request, the NMD may access the rules engine to determine whether any concurrency restrictions apply. If no concurrency restrictions apply, the NMD may proceed to enable the second VAS, after which the NMD can be concurrently associated with the first VAS and the second VAS. If some concurrency restriction does apply (for example, there is a prohibition of concurrent association with both the first VAS and second VAS), the NMD may either disable or otherwise disassociate with the first VAS and enable the second VAS, or the NMD may preclude association with the second VAS and maintain association with the first VAS. In some instances, the concurrency rules engine can include prioritization rules that dictate which VAS will prevail in the event of a concurrency prohibition. In some examples, the most recently selected VAS may prevail in the event of a concurrency restriction. In other examples, a native VAS may prevail over a third-party VAS in the event of a concurrency restriction. According to some examples, an indication can be provided to the user regarding which VAS has been enabled and which, if any, has been disabled.

FIGS. 9A and 9B illustrate example concurrency policy tables reflecting concurrency permissions and restrictions of a concurrency rules engine. The tables illustrate a simplified form for discussion purposes only in which one enabled VAS is shown in the left-hand column, and another possibly enabled VAS is shown along the bottom row. At intersections of particular VAS pairs, the policy tables indicate whether such concurrent enablement is permitted or forbidden. As one example, Native VAS can be a SONOS VAS operating on a SONOS playback device, General VAS 1 can be an AMAZON VAS (e.g., ALEXA), General VAS 2 can be a GOOGLE VAS (e.g., GOOGLE Assistant), General VAS 3 can be a MICROSOFT VAS (e.g., CORTANA), Special-Purpose VAS 1 can be a PHILIPS VAS for controlling smart-home lights, and Special-Purpose VAS 2 can be an XFINITY VAS for interacting with a smart television.

In the example shown in FIG. 9A, Native VAS is permitted to be concurrently enabled with any one of the other VASes. As such, if a user has previously opted to enable Native VAS (or if Native VAS was enabled by default), a request from the user to enable any one of the other VASes shown will be permitted by the concurrency rules engine. While many of the possible combinations are permitted, the table shown in FIG. 9A forbids the concurrent enablement of General VAS 2 and General VAS 1, and also forbids the concurrent enablement of General VAS 3 and General VAS 2. In such cases, the user may only be permitted to enable one of these VASes at a given time. In some instances, general-purpose VASes may impose their own restrictions on concurrency. For example, the company offering General VAS 1 may contractually require an NMD manufacturer to forbid concurrent enablement of General VAS 1 and General VAS 2 on the same NMD.

Another restriction illustrated in FIG. 9A is the concurrent enablement of Special-Purpose VAS 1 and Special-Purpose VAS 2. Such restrictions may be provided because, for example, the wake words associated with these VASes are too similar, or other incompatibilities (e.g., two smart-light VASes may not be enabled on the same NMD to avoid poor user experience when trying to control lights via voice control).

FIG. 9B illustrates another example of a policy table, with an additional row reflecting concurrent enablement of General VAS 1 and General VAS 3. In this row, the policy table indicates that an NMD that has these two VASes enabled may additionally concurrently enable Native VAS, but may not enable any of the other VASes shown in the table. This restriction can reflect a conservation of computational resources of the NMD. For example, because running multiple wake-word engines on an NMD can be computationally intensive, the policy table may limit concurrent operation of two general-purpose VASes such that no additional third-party VASes are permitted.

In operation, a user may initiate a request to enable a particular VAS on the user's NMD. The NMD may access a concurrency rules engine that includes restrictions such as those illustrated in the policy tables in FIGS. 9A and 9B. If there are any concurrency restrictions, the NMD may preclude concurrent enablement by: (i) disabling one or more previously enabled VASes on the NMD, and enabling the newly requested VAS; (ii) precluding enablement of the newly requested VAS; or (iii) outputting a message to the user indicating a concurrency restriction and asking which VAS should be enabled and which should be disabled. In this latter case, an input from the user (e.g., received via voice control (e.g., via Native VAS) or via control device 104) can be used to determine which VAS to enable and which to disable.

Although the tables shown in FIGS. 9A and 9B are relatively simplified, indicating policies around two or three concurrent VASes, in various examples a concurrency rules engine may include rules governing concurrent operation or enablement of any number of VASes on a single NMD. In some examples, forbidden combinations can be restricted by uninstalling or deleting software associated with a particular VAS from the NMD. Additionally or alternatively, forbidden combinations can be restricted by disabling a wake-word engine associated with a particular VAS such that the disabled wake-word engine does not process voice input captured via the NMD.

FIGS. 10A-10G are tables illustrating the status of activated (e.g., enabled or operational) and deactivated (e.g., disabled, non-operational) VASes over time in an example process. For example, in the configuration shown in FIG. 10A, the user may initially enable Native VAS (or Native VAS may be pre-enabled by default) and the user may also enable General VAS 1, such that these two VASes are concurrently enabled on the NMD. In this example, these two VASes are permitted to be concurrently enabled (e.g., as governed by a concurrency rules engine).

Next, the user may enable (e.g., install or activate) General VAS 2. Because a concurrency rules engine forbids concurrent enablement of General VAS 1 and General VAS 2, the NMD may deactivate (e.g., disable, delete, or uninstall) General VAS 1 and enable General VAS 2, as reflected in FIG. 10B. In the case of a concurrency restriction, the concurrency rules engine may also dictate which VAS is to be disabled, for example on the basis of that VAS's priority. The tables shown in FIGS. 10A-10G indicate a priority ranking along the bottom row, which identifies which VAS was "last in" (i.e., the most recent to be selected for activation). One example prioritization policy is to enable the last in VAS (e.g., the VAS most recently actively selected by a user) in the event of conflict, such that the prioritization rules follow a "first in, first out" policy. Additionally or alternatively, certain VASes can be exceptions to the prioritization rules. For example, once Native VAS has been enabled, Native VAS can be an exception to the prioritization rules, such that it is never disabled as a result of a concurrency restriction, but rather is only disabled if a user specifically opts to disable Native VAS. The prioritization rules shown here are but one example. In other instances, the prioritization can be based on other factors, such as computational demands, type of VAS, contractual obligations, etc.

Next, the user may opt to enable (e.g., activate or install) Special-Purpose VAS 1. Since this does not violate any concurrency policy (e.g., as reflected in the policy tables shown in FIGS. 9A and 9B), Special-Purpose VAS 1 is activated, and all three of General VAS 2, Special-Purpose VAS 1, and Native VAS are permitted to operate concurrently on the NMD, as reflected in FIG. 10C.

With reference to FIG. 10D, the user may then enable (e.g., activate or install) Special-Purpose VAS 2. Since the concurrency rules engine forbids concurrent enablement of the Special-Purpose VAS 1 and Special-Purpose VAS 2 (e.g., as reflected in the policy tables shown in FIGS. 9A and 9B), Special-Purpose VAS 1 can be deactivated (e.g., disabled, deleted, or uninstalled) from the NMD. Deactivation of Special-Purpose VAS 1 can accord with the "first in, first out" prioritization rules, since the Special-Purpose VAS 2 has been most recently selected by the user for enablement.

At a later time, the user may choose to enable General VAS 3, which violates concurrency policies that do not permit the concurrent enablement of General VAS 2 and General VAS 3. In this scenario, because General VAS 3 has been selected by the user more recently than General VAS 2 (as shown in the priority row), General VAS 2 is deactivated and General VAS 3 is activated, as shown in FIG. 10E.

At this stage, the Native VAS, Special-Purpose VAS 2, and General VAS 3 are all concurrently enabled on the NMD.

Next, at a later time, as reflected in FIG. 10F, the user re-enables (e.g., re-installs or re-activates) General VAS 1. This configuration violates a concurrency restriction (e.g., as shown in the policy table of FIG. 9B), which permits forbids concurrent enablement of any additional VASes if General VAS 1 and General VAS 3 are both concurrently enabled. As such, as a result of this concurrency restriction, Special-Purpose VAS 2 is disabled, and General VAS 1 and General VAS 2 are enabled.

Finally, the user may choose to re-enable General VAS 2. Because this violates a concurrency restriction (e.g., as shown in the policy table of FIG. 9B, General VAS 2 cannot be concurrently enabled with General VAS 1+General VAS 2), both General VAS 1 and General VAS 2 are disabled, leaving only General VAS 2 and the Native VAS concurrently enabled on the NMD.

The process flow illustrated in FIGS. 10A-10G reflects one example for explanation purposes only. As will be understood by one of ordinary skill in the art, the particular concurrency restrictions, prioritization rules, and implementations of enablement or disablement of particular VASes can take many forms.

Figure 11:
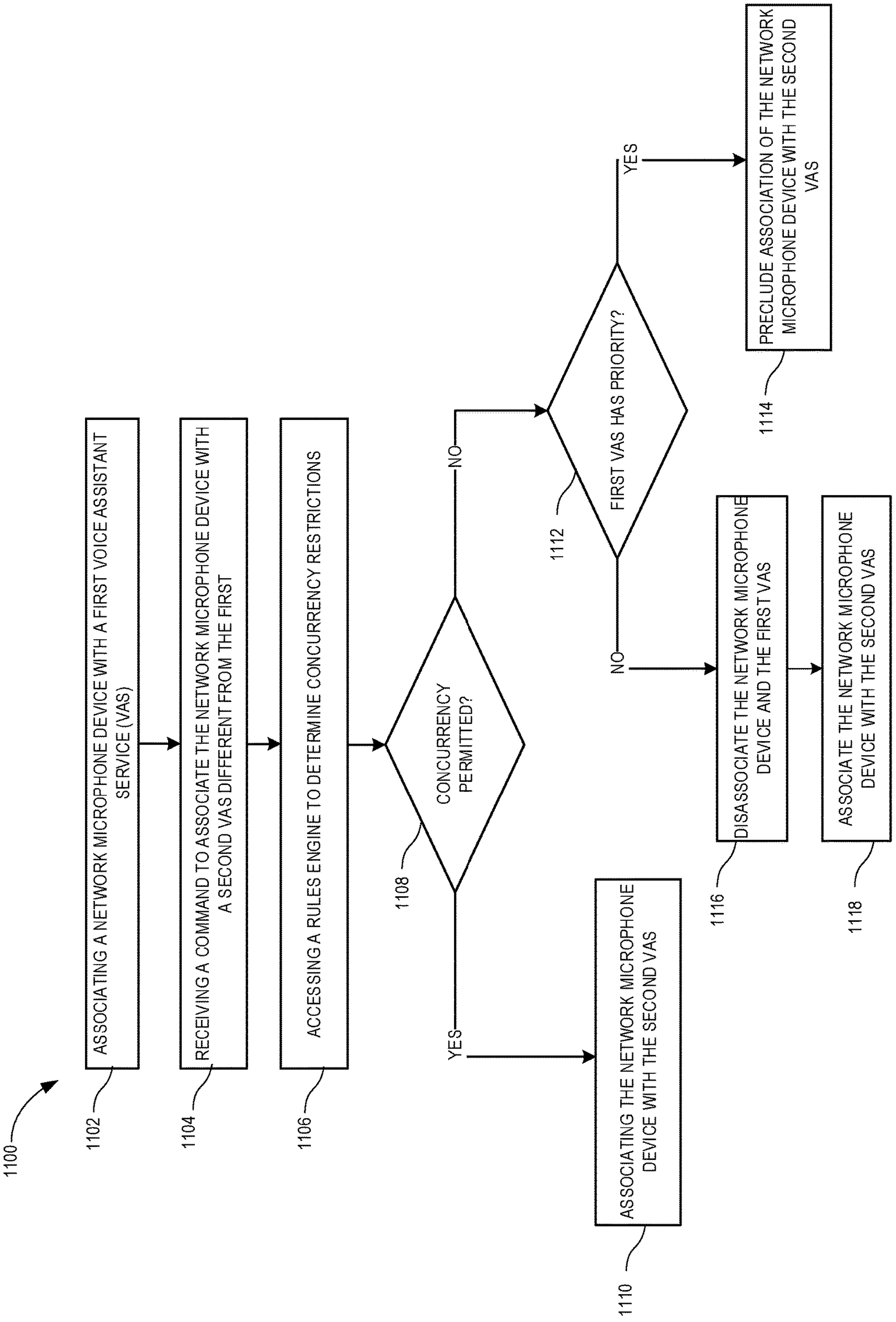
FIG. 11 is a flow diagram of a method for managing concurrency of voice assistant services.

FIG. 11 is an example method 1100 for managing interactions between a network microphone device and multiple VASes. Various examples of method 1100 include one or more operations, functions, and actions illustrated by blocks 1102 through 1118. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

Method 1100 begins at block 1102, which involves associating a network microphone device (NMD) with a first voice assistant service (VAS). Such association can include, for example, (i) downloading, installing, and/or software on the NMD to enable the NMD to operably communicate with the first VAS; and/or (ii) enabling a wake-word engine configured to detect one or more wake words associated with the first VAS such that the wake-word engine processes voice input captured by the NMD.

At block 1104, method 1100 involves receiving a command to associate the NMD with a second VAS different from the first. Such a command can be received, for example, over a network from a control device in response to a user selection. In one example, the first VAS can be an AMAZON VAS, and the second VAS can be a GOOGLE VAS. At block 1106, the method includes accessing a rules engine to determine concurrency restrictions. In various examples, the rules engine can include a set of rules, policies, or other restrictions (or criteria or algorithms for generating such rules or restrictions) that limit concurrent activation of certain VASes on a single NMD or among multiple NMDs within a single media playback system. The rules engine can be stored locally on the NMD or can be stored remotely and accessed via a network. In some examples, the NMD can transmit information to one or more remote computing devices (e.g., the identity of the first VAS, the second VAS, and any other relevant information), and the remote computing device(s) can access the rules engine and return any restrictions to the NMD via transmission over a network.

In decision block 1108, if concurrency is permitted, the method proceeds to block 1110 to associate the NMD with the second VAS. In this instance, there is no restriction with respect to concurrent activation of the first VAS and the second VAS, and so the NMD is permitted to concurrently activate both VASes.

If, in decision block 1108, concurrency is not permitted, the method proceeds to decision block 1112. If the first VAS has priority, then the method 1100 terminates in precluding associating of the NMD with the second VAS. For example, if the first VAS is a native VAS, a last-in VAS, or otherwise has priority over the second VAS, then the NMD maintains association with the first VAS and precludes association of the NMD with the second VAS. In some instances, an indication of this result can be output to the user, for example via graphical representation displayed on a control device, via audible output via the NMD or other device, or other such indication that the requested association of the second VAS has been precluded.

Returning to block 1112, if the first VAS does not have priority, then in block 1116 the NMD is disassociated from the first VAS, and in block 1118 the NMD is associated with the second VAS. Disassociating the first VAS can include, for example: (i) disabling, deactivating, or uninstalling software from the NMD that facilitates communication between the NMD and the first VAS; or (ii) disabling or deactivating one or more wake-word engines configured to detect wake word(s) associated with the first VAS. In some instances, an indication of this result can be output to the user, for example via graphical representation via a control device, audible output via the NMD or other device, or other such indication that the second VAS has been associated and the first VAS has been disabled or otherwise disassociated.

IV. Conclusion

The above discussions relating to playback devices, controller devices, playback zone configurations, voice assistant services, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The present technology is illustrated, for example, according to various aspects described below. Various examples of aspects of the present technology are described as numbered examples for convenience. These are provided as examples and do not limit the present technology. It is noted that any of the dependent examples may be combined in any combination, and placed into a respective independent example. The other examples can be presented in a similar manner.

Example 1. A network microphone device comprising: one or more microphones; one or more processors; and one or more computer-readable media storing instructions that, when executed by the one or more processors, cause the one or more processors to perform operations comprising: associating the network microphone device with a first voice assistant service (VAS); receiving a command to associate the network microphone device with a second VAS different from the first; after receiving the command, accessing a rules engine to determine concurrency restrictions; and based at least in part on the determination of the concurrency restrictions, restricting concurrency by: (i) disassociating the network microphone device and the first VAS, and associating the network microphone device with the second VAS; or (ii) precluding associating the network microphone device with the second VAS.

Example 2. The network microphone device of any one of the Examples herein, wherein the first VAS is associated with a first wake word, and the second VAS is associated with a second wake word different from the first, and wherein associating the network microphone device with the first VAS comprises activating a first wake-word engine configured to detect the first wake word in sound data captured via the one or more microphones.

Example 3. The network microphone device of any one of the Examples herein, wherein the concurrency restrictions are based at least in part on similarity between the first wake word and the second wake word.

Example 4. The network microphone device of any one of the Examples herein, wherein the concurrency restrictions are based at least in part on the identity of the first VAS and the identity of the second VAS.

Example 5. The network microphone device of any one of the Examples herein, wherein the concurrency restrictions are based at least in part on the number of total VASes associated with the network microphone device.

Example 6. The network microphone device of any one of the Examples herein, wherein restricting concurrency comprises precluding associating the network microphone device with the second VAS, the operations further comprising: receiving a command to associate the network microphone device with a third voice assistant service (VAS) different from the first VAS and different from the second VAS; after receiving the command, accessing the rules engine to determine concurrency restrictions; and based at least in part on the determination of the concurrency restrictions, associating the network microphone device with the third VAS while maintaining association between the network microphone device and the first VAS.

Example 7. The network microphone device of any one of the Examples herein, wherein accessing the rules engine comprises: transmitting a request to one or more remote computing devices, wherein the request comprises identification of the first VAS and the second VAS; and after transmitting the request, receiving state information corresponding to the concurrency restrictions.

Example 8. The network microphone device of any one of the Examples herein, wherein the rules engine includes limitations to associating the network microphone device with one or more VASes, wherein the limitations comprise at least one of (i) a maximum number of VASes that can be associated with the network microphone device, and (ii) an indication of whether particular VASes may be concurrently associated with the network microphone device.

Example 9. A method, comprising: associating a network microphone device with a first voice assistant service (VAS); receiving a command to associate the network microphone device with a second VAS different from the first; after receiving the command, accessing a rules engine to determine concurrency restrictions; and based at least in part on the determination of the concurrency restrictions, restricting concurrency by: (i) disassociating the network microphone device and the first VAS, and associating the network microphone device with the second VAS; or (ii) precluding associating the network microphone device with the second VAS.

Example 10. The method of any one of the Examples herein, wherein the first VAS is associated with a first wake word, and the second VAS is associated with a second wake word different from the first, and wherein associating the network microphone device with the first VAS comprises activating a first wake-word engine configured to detect the first wake word in sound data captured via one or more microphones of the network microphone device.

Example 11. The method of any one of the Examples herein, wherein the concurrency restrictions are based at least in part on similarity between the first wake word and the second wake word.

Example 12. The method of any one of the Examples herein, wherein the concurrency restrictions are based at least in part on the identity of the first VAS and the identity of the second VAS.

Example 13. The method of any one of the Examples herein, wherein the concurrency restrictions are based at least in part on the number of total VASes associated with the network microphone device.

Example 14. The method of any one of the Examples herein, wherein restricting concurrency comprises precluding associating the network microphone device with the second VAS, the method further comprising: receiving a command to associate the network microphone device with a third VAS different from the first VAS and different from the second VAS; after receiving the command, accessing the rules engine to determine concurrency restrictions; and based at least in part on the determination of the concurrency restrictions, associating the network microphone device with the third VAS while maintaining association between the network microphone device and the first VAS.

Example 15. The method of any one of the Examples herein, wherein the accessing the rules engine comprises: transmitting a request to one or more remote computing devices, wherein the request comprises identification of the first VAS and the second VAS; and after transmitting the request, receiving state information corresponding to the concurrency restrictions.

Example 16. The method of any one of the Examples herein, wherein the rules engine includes limitations to associating the network microphone device with one or more VASes, wherein the limitations comprise at least one of (i) a maximum number of VASes that can be associated with the network microphone device, and (ii) an indication of whether particular VASes may be concurrently associated with the network microphone device.

Example 17. One or more non-transitory computer-readable media storing instructions that, when executed by one or more processors of a network microphone device, cause the network microphone device to perform operations comprising: associating a network microphone device with a first voice assistant service (VAS); receiving a command to associate the network microphone device with a second VAS different from the first; after receiving the command, accessing a rules engine to determine concurrency restrictions; and based at least in part on the determination of the concurrency restrictions, restricting concurrency by: (i) disassociating the network microphone device and the first VAS, and associating the network microphone device with the second VAS; or (ii) precluding associating the network microphone device with the second VAS.

Example 18. The computer-readable media of any one of the Examples herein, wherein the first VAS is associated with a first wake word, and the second VAS is associated with a second wake word different from the first, and wherein associating the network microphone device with the first VAS comprises activating a first wake-word engine configured to detect the first wake word in sound data captured via one or more microphones of the network microphone device.

Example 19. The computer-readable media of any one of the Examples herein, wherein the concurrency restrictions are based at least in part on similarity between the first wake word and the second wake word.

Example 20. The computer-readable media of any one of the Examples herein, wherein the concurrency restrictions are based at least in part on the identity of the first VAS and the identity of the second VAS.

Example 21. The computer-readable media of any one of the Examples herein, wherein the concurrency restrictions are based at least in part on the number of total VASes associated with the network microphone device.

Example 22. The computer-readable media of any one of the Examples herein, wherein restricting concurrency comprises precluding associating the network microphone device with the second VAS, the operations further comprising: receiving a command to associate the network microphone device with a third voice assistant service (VAS) different from the first VAS and different from the second VAS; after receiving the command, accessing the rules engine to determine concurrency restrictions; and based at least in part on the determination of the concurrency restrictions, associating the network microphone device with the third VAS while maintaining association between the network microphone device and the first VAS.

Example 23. The computer-readable media of any one of the Examples herein, wherein the accessing the rules engine comprises: transmitting a request to one or more remote computing devices, wherein the request comprises identification of the first VAS and the second VAS; and after transmitting the request, receiving state information corresponding to the concurrency restrictions.

Example 24. The computer-readable media of any one of the Examples herein, wherein the rules engine includes limitations to associating the network microphone device with one or more VASes, wherein the limitations comprise at least one of (i) a maximum number of VASes that can be associated with the network microphone device, and (ii) an indication of whether particular VASes may be concurrently associated with the network microphone device.

The invention claimed is:

1. A network microphone device comprising:

one or more microphones;

one or more processors; and one or more computer-readable media storing instructions that, when executed by the one or more processors, cause the one or more processors to perform operations comprising:

associating the network microphone device with a first voice assistant service (VAS);

receiving a command to associate the network microphone device with a second VAS different from the first;

after receiving the command, accessing a rules engine to determine first concurrency restrictions;

based at least in part on the determination of the first concurrency restrictions, restricting concurrency by precluding associating the network microphone device with the second VAS;

receiving a command to associate the work microphone device with a third VAS different from the first VAS and different from the second VAS;

after receiving the command, accessing the rules engine to determine second concurrency frictions; and based at least in part on the determination of the second concurrency restrictions, associating the network microphone device with the third VAS while maintaining association between the network microphone device and the first VAS.

2. The network microphone device of claim 1, wherein the first VAS is associated with a first wake word, and the second VAS is associated with a second wake word different from the first, and wherein associating the network microphone device with the first VAS comprises activating a first wake-word engine configured to detect the first wake word in sound data captured via the one or more microphones.

3. The network microphone device of claim 2, wherein the first concurrency restrictions are based at least in part on similarity between the first wake word and the second wake word.

4. The network microphone device of claim 1, wherein the first concurrency restrictions are based at least in part on the identity of the first VAS and the identity of the second VAS.

5. The network microphone device of claim 1, wherein the first concurrency restrictions are based at least in part on the number of total VASes associated with the network microphone device.

6. The network microphone device of claim 1, wherein accessing the rules engine to determine first concurrency restrictions comprises:

transmitting a request to one or more remote computing devices, wherein the request comprises identification of the first VAS and the second VAS; and after transmitting the request, receiving state information corresponding to the first concurrency restrictions.

7. The network microphone device of claim 1, wherein the rules engine includes limitations to associating the network microphone device with one or more VASes, wherein the limitations comprise at least one of (i) a maximum number of VASes that can be associated with the network microphone device, and (ii) an indication of whether particular VASes may be concurrently associated with the network microphone device.

8. The network microphone device of claim 1, wherein after associating the network microphone device with the third VAS while maintaining association between the network microphone device and the first VAS, the network microphone device concurrently activates both a first wake-word engine configured to detect a first wake word associated with the first VAS and a third wake word engine configured to detect a third wake word associated with the third VAS.

9. The network microphone device of claim 1, wherein after associating the network microphone device with the third VAS while maintaining association between the network microphone device and the first VAS, the network microphone device is configured to direct a user voice input to either of the first VAS or the third VAS.

10. A method, comprising:

associating a network microphone device with a first voice assistant service (VAS);

receiving a command to associate the network microphone device with a second VAS different from the first;

after receiving the command, accessing a rules engine to determine first concurrency restrictions;

based at least in part on the determination of the concurrency restrictions, restricting concurrency by precluding associating the network microphone device with the second VAS;

receiving a command to associate the network microphone device with a third VAS different from the first VAS and different from the second VAS;

after receiving the command, accessing the rules engine to determine second concurrency restrictions; and based at least in part on the determination of the second concurrency restrictions, associating the network microphone device with the third VAS while maintaining association between the network microphone device and the first VAS.

11. The method of claim 10, wherein the first VAS is associated with a first wake word, and the second VAS is associated with a second wake word different from the first, and wherein associating the network microphone device with the first VAS comprises activating a first wake-word engine configured to detect the first wake word in sound data captured via one or more microphones of the network microphone device.

12. The method of claim 11, wherein the first concurrency restrictions are based at least in part on similarity between the first wake word and the second wake word.

13. The method of claim 10, wherein the first concurrency restrictions are based at least in part on the identity of the first VAS and the identity of the second VAS.

14. The method of claim 10, wherein the first concurrency restrictions are based at least in part on the number of total VASes associated with the network microphone device.

15. The method of claim 10, wherein the accessing the rules engine to determine first concurrency restrictions comprises:

transmitting a request to one or more remote computing devices, wherein the request comprises identification of the first VAS and the second VAS; and after transmitting the request, receiving state information corresponding to the first concurrency restrictions.

16. The method of claim 10, wherein the rules engine includes limitations to associating the network microphone device with one or more VASes, wherein the limitations comprise at least one of (i) a maximum number of VASes that can be associated with the network microphone device, and (ii) an indication of whether particular VASes may be concurrently associated with the network microphone device.

17. One or more non-transitory computer-readable media storing instructions that, when executed by one or more processors of a network microphone device, cause the network microphone device to perform operations comprising:

associating a network microphone device with a first voice assistant service (VAS);

receiving a command to associate the network microphone device with a second VAS different from the first;

after receiving the command, accessing a rules engine to determine first concurrency restrictions; and based at least in part on the determination of the concurrency restrictions, restricting concurrency by precluding associating the network microphone device with the second VAS;

receiving a command to associate the network microphone device with a third VAS different from the first VAS and different from the second VAS;

after receiving the command, accessing the rules engine to determine second concurrency restrictions; and based at least in part on the determination of the second concurrency restrictions, associating the network microphone device with the third VAS while maintaining association between the network microphone device and the first VAS.

18. The computer-readable media of claim 17, wherein the first VAS is associated with a first wake word, and the second VAS is associated with a second wake word different from the first, and wherein associating the network microphone device with the first VAS comprises activating a first wake-word engine configured to detect the first wake word in sound data captured via one or more microphones of the network microphone device.

19. The computer-readable media of claim 18, wherein the first concurrency restrictions are based at least in part on similarity between the first wake word and the second wake word.

20. The computer-readable media of claim 17, wherein the first concurrency restrictions are based at least in part on the identity of the first VAS and the identity of the second VAS.

21. The computer-readable media of claim 17, wherein the first concurrency restrictions are based at least in part on the number of total VASes associated with the network microphone device.

22. The computer-readable media of claim 17, wherein the accessing the rules engine to determine first concurrency restrictions comprises:

transmitting a request to one or more remote computing devices, wherein the request comprises identification of the first VAS and the second VAS; and after transmitting the request, receiving state information corresponding to the first concurrency restrictions.

23. The computer-readable media of claim 17, wherein the rules engine includes limitations to associating the network microphone device with one or more VASes, wherein the limitations comprise at least one of (i) a maximum number of VASes that can be associated with the network microphone device, and (ii) an indication of whether particular VASes may be concurrently associated with the network microphone device.

* * * * *